(12) United States Patent
Kawakami et al.

(10) Patent No.: US 8,487,563 B2
(45) Date of Patent: Jul. 16, 2013

(54) DRIVE MOTOR CONTROL APPARATUS FOR VEHICLE, MOTOR CONTROL SYSTEM, METHOD FOR CORRECTING ROTATION ANGLE OF MOTOR, PROGRAM FOR PERFORMING THE SAME, ROTATION DETECTING APPARATUS

(75) Inventors: Eiichiro Kawakami, Chiryu (JP); Shigenori Mori, Handa (JP); Jyunji Miyachi, Okazaki (JP)

(73) Assignee: Denso Corporation, Kariya (JP)

( * ) Notice: Subject to any disclaimer, the term of this patent is extended or adjusted under 35 U.S.C. 154(b) by 345 days.

(21) Appl. No.: 12/927,833

(22) Filed: Nov. 24, 2010

(65) Prior Publication Data
US 2011/0127938 A1 Jun. 2, 2011

(30) Foreign Application Priority Data

| Nov. 27, 2009 | (JP) | 2009-270016 |
| Jun. 23, 2010 | (JP) | 2010-142736 |
| Oct. 27, 2010 | (JP) | 2010-240998 |
| Oct. 27, 2010 | (JP) | 2010-240999 |

(51) Int. Cl.
*H02P 6/16* (2006.01)
*H02P 6/06* (2006.01)

(52) U.S. Cl.
CPC ............... *H02P 6/06* (2013.01)
USPC ...... 318/400.13; 318/757; 318/799; 318/800; 318/801

(58) Field of Classification Search
CPC .................................................. H02P 6/06
USPC ............................. 318/400.13, 757, 799–801
See application file for complete search history.

(56) References Cited

U.S. PATENT DOCUMENTS

| 5,539,293 | A  | * | 7/1996  | Randall et al. ............... 318/616 |
| 5,896,283 | A  |   | 4/1999  | Usami |
| 6,278,388 | B1 |   | 8/2001  | Kushihara |
| 7,221,116 | B2 | * | 5/2007  | Nakai et al. .................. 318/266 |
| 7,548,039 | B2 | * | 6/2009  | Oomura et al. ............... 318/788 |
| 2006/0033643 | A1 | | 2/2006 | Okamuro et al. |
| 2006/0042074 | A1 | | 3/2006 | Stork et al. |
| 2007/0044548 | A1 | | 3/2007 | Ishizuka et al. |
| 2008/0265831 | A1 | | 10/2008 | Imai et al. |
| 2009/0295375 | A1 | | 12/2009 | Oohira |

FOREIGN PATENT DOCUMENTS

| JP | 61-147107 | 7/1986 |
| JP | 63-111408 | 5/1988 |
| JP | 8-035857  | 2/1996 |
| JP | 10-170531 | 6/1998 |

(Continued)

*Primary Examiner* — Bentsu Ro
*Assistant Examiner* — David Luo
(74) *Attorney, Agent, or Firm* — Harness, Dickey & Pierce, PLC

(57) ABSTRACT

A drive motor control apparatus for a vehicle, wherein the vehicle has a motor and rotation detecting unit. In the apparatus, the first difference computing unit computes one of multiple first differences every time an actual detected angle of rotation of the motor becomes a corresponding representative angle during the one cycle. The first difference indicates an advancing amount of an estimated angle relative to the actual detected angle. The second difference computing unit computes multiple second differences based on the first differences of the one cycle. The second differences are adjusted in accordance with a degree of acceleration and deceleration of the motor. The adjusted second differences are used for correcting the actual detected angle of rotation of the motor.

59 Claims, 22 Drawing Sheets

FOREIGN PATENT DOCUMENTS

| | | |
|---|---|---|
| JP | 10-215504 | 8/1998 |
| JP | 2004-92683 | 3/2004 |
| JP | 2004-205345 | 7/2004 |
| JP | 2006-29937 | 2/2006 |
| JP | 2006-64704 | 3/2006 |
| JP | 2006-262589 | 9/2006 |
| JP | 2007-33412 | 2/2007 |
| JP | 2007-78538 | 3/2007 |
| JP | 2007-187021 | 7/2007 |
| JP | 2007-248435 | 9/2007 |
| JP | 2008-185406 | 8/2008 |
| JP | 2008-271740 | 11/2008 |
| JP | 2009-145305 | 7/2009 |
| JP | 2010-19825 | 1/2010 |

\* cited by examiner

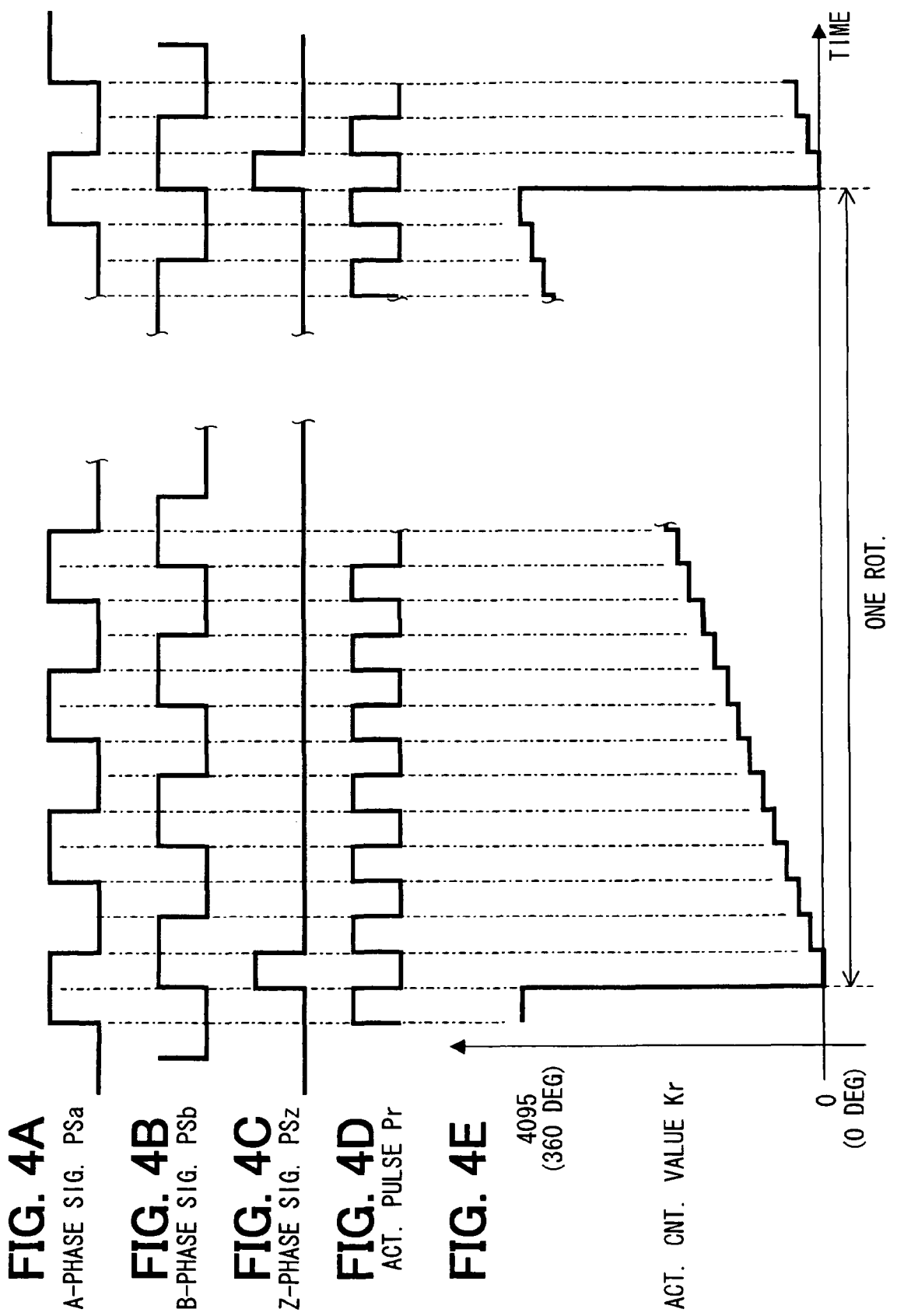

Z-PHASE SIG. PSz

EST. PULSE Pp

EST. CNT. VALUE Kp

FIG. 6A

| 0 | 0 | 0 | 0 | 0 | 1 | 1 | 0 | 1 | 1 | 1 | 0 | 0 | 1 | 0 | 1 | 1 | 0 | 1 | 0 |

CNT. VALUE OF BASIC PULSES OF ONE CYC. ($28250_{10}$)

FIG. 6B

DIVISION RESULT ← : → (DIGITS RIGHT OF DECIMAL POINT: NEGLECTED)

| 0 | 0 | 0 | 0 | 0 | 1 | 1 | 0 | 1 | 1 | 1 | 0 | 0 | 1 | 0 | 1 | 1 | 0 | 1 | 0 |

RESULT OF SHIFT OPERATION

↓         ↓
[6]     (0.896973)

FIG. 6C reg1 | 1 | 1 | 1 | 0 | 0 | 1 | 0 | 1 | 1 | 0 | 1 | 0 | = 3674: TOTAL NUMBER OF OUTPUT OF EST. PULSE Pp7 reg2 | 0 | 0 | 0 | 1 | 1 | 0 | 1 | 0 | 0 | 1 | 1 | 0 | = 422: TOTAL NUMBER OF OUTPUT OF EST. PULSE Pp6

→ EST. PULSE Pp7: 14 TIMES
→ EST. PULSE Pp6: ONCE

FIG. 6D reg1 | 1 | 1 | 1 | 0 | 0 | 1 | 0 | 1 | 1 | 0 | 1 | 0 | reg2 | 0 | 0 | 0 | 1 | 1 | 0 | 1 | 0 | 0 | 1 | 1 | 0 |

→ EST. PULSE Pp7: 57 TIMES
→ EST. PULSE Pp6: 6 TIMES

FIG. 6E reg1 | 1 | 1 | 1 | 0 | 0 | 1 | 0 | 1 | 1 | 0 | 1 | 0 | reg2 | 0 | 0 | 0 | 1 | 1 | 0 | 1 | 0 | 0 | 1 | 1 | 0 |

→ EST. PULSE Pp7: 114 TIMES
→ EST. PULSE Pp6: 13 TIMES

FIG. 8A

| ACT. DET. ANGLE (ACT. CNT. VALUE Kr) | 45 DEG | 90 DEG | 135 DEG | 180 DEG | 225 DEG | 270 DEG | 315 DEG | 360 DEG |
|---|---|---|---|---|---|---|---|---|
| 1ST DIFF. (Kp-Kr) | AT 45 DEG [a1] | AT 90 DEG [a2] | AT 135 DEG [a3] | AT 180 DEG [a4] | AT 225 DEG [a5] | AT 270 DEG [a6] | AT 315 DEG [a7] | AT 360 DEG [a8] |
| 2ND DIFF. | IN SEC. OF 0 TO 45 DEG [b1=a1-0] | IN SEC. OF 45 TO 90 DEG [b2=a2-a1] | IN SEC. OF 90 TO 135 DEG [b3=a3-a2] | IN SEC. OF 135 TO 180 DEG [b4=a4-a3] | IN SEC. OF 180 TO 225 DEG [b5=a5-a4] | IN SEC. OF 225 TO 270 DEG [b6=a6-a5] | IN SEC. OF 270 TO 315 DEG [b7=a7-a6] | IN SEC. OF 315 TO 360 DEG [b8=a8-a7] |
| ADJ. VALUE | IN SEC. OF 0 TO 45 DEG [c1] | IN SEC. OF 45 TO 90 DEG [c2] | IN SEC. OF 90 TO 135 DEG [c3] | IN SEC. OF 135 TO 180 DEG [c4] | IN SEC. OF 180 TO 225 DEG [c5] | IN SEC. OF 225 TO 270 DEG [c6] | IN SEC. OF 270 TO 315 DEG [c7] | IN SEC. OF 315 TO 360 DEG [c8] |
| LEARN VALUE (ADJ. 2ND DIFF.) | IN SEC. OF 0 TO 45 DEG [d1=b1-c1] | IN SEC. OF 45 TO 90 DEG [d2=b2-c2] | IN SEC. OF 90 TO 135 DEG [d3=b3-c3] | IN SEC. OF 135 TO 180 DEG [d4=b4-c4] | IN SEC. OF 180 TO 225 DEG [d5=b5-c5] | IN SEC. OF 225 TO 270 DEG [d6=b6-c6] | IN SEC. OF 270 TO 315 DEG [d7=b7-c7] | IN SEC. OF 315 TO 360 DEG [d8=b8-c8] |

FIG. 8B

| ACT. DET. ANGLE (ACT. CNT. VALUE Kr) | 45 DEG | 90 DEG | 135 DEG | 180 DEG | 225 DEG | 270 DEG | 315 DEG | 360 DEG |
|---|---|---|---|---|---|---|---|---|
| 1ST DIFF. (Kp-Kr) | a1= -1 | a2= -3 | a3= -4 | a4= +2 | a5= +1 | a6= +4 | a7= +3 | a8= +2 |
| 2ND DIFF. | b1= -1 | b2= -2 | b3= -1 | b4= +6 | b5= -1 | b6= +3 | b7= -1 | b8= -1 |
| ADJ. VALUE | c1= 0 | c2= 0 | c3= +1 | c4= 0 | c5= 0 | c6= +1 | c7= 0 | c8= 0 |
| LEARN VALUE | d1= -1 | d2= -2 | d3= -2 | d4= +6 | d5= -1 | d6= +2 | d7= -1 | d8= -1 |

FIG. 9

| 1ST DIFF. AT 360 DEG [a8] | ADJ. VALUE FOR SEC. OF 0 TO 45 DEG [c1] | ADJ. VALUE FOR SEC. OF 45 TO 90 DEG [c2] | ADJ. VALUE FOR SEC. OF 90 TO 135 DEG [c3] | ADJ. VALUE FOR SEC. OF 135 TO 180 DEG [c4] | ADJ. VALUE FOR SEC. OF 180 TO 225 DEG [c5] | ADJ. VALUE FOR SEC. OF 225 TO 270 DEG [c6] | ADJ. VALUE FOR SEC. OF 270 TO 315 DEG [c7] | ADJ. VALUE FOR SEC. OF 315 TO 360 DEG [c8] |
|---|---|---|---|---|---|---|---|---|
| +1 (−1) | 0 | 0 | 0 | +1 (−1) | 0 | 0 | 0 | 0 |
| +2 (−2) | 0 | 0 | +1 (−1) | 0 | 0 | +1 (−1) | 0 | 0 |
| +3 (−3) | 0 | +1 (−1) | 0 | 0 | +1 (−1) | 0 | +1 (−1) | 0 |
| +4 (−4) | 0 | +1 (−1) | 0 | +1 (−1) | 0 | +1 (−1) | 0 | +1 (−1) |
| +5 (−5) | 0 | +1 (−1) | +1 (−1) | +1 (−1) | +1 (−1) | +1 (−1) | +1 (−1) | +1 (−1) |
| +6 (−6) | 0 | +1 (−1) | +1 (−1) | +1 (−1) | +1 (−1) | +1 (−1) | +1 (−1) | +1 (−1) |
| +7 (−7) | 0 | +1 (−1) | +1 (−1) | +1 (−1) | +1 (−1) | +1 (−1) | +1 (−1) | +1 (−1) |
| +8 (−8) | +1 (−1) | +1 (−1) | +1 (−1) | +1 (−1) | +1 (−1) | +1 (−1) | +1 (−1) | +1 (−1) |
| +9 (−9) | +1 (−1) | +1 (−1) | +1 (−1) | +2 (−2) | +1 (−1) | +1 (−1) | +1 (−1) | +1 (−1) |
| +10 (−10) | +1 (−1) | +1 (−1) | +2 (−2) | +1 (−1) | +2 (−2) | +2 (−2) | +1 (−1) | +1 (−1) |
| ... | | | | | | | | |

FIG. 14

| ACT. DET. ANGLE (ACT. CNT. VALUE Kr) | 45 DEG | 90 DEG | 135 DEG | 180 DEG | 225 DEG | 270 DEG | 315 DEG | 360 DEG |
|---|---|---|---|---|---|---|---|---|
| 1ST DIFF. (Kp-Kr) | AT 45 DEG [a1] | AT 90 DEG [a2] | AT 135 DEG [a3] | AT 180 DEG [a4] | AT 225 DEG [a5] | AT 270 DEG [a6] | AT 315 DEG [a7] | AT 360 DEG [a8] |
| 2ND DIFF. | IN SEC. OF 0 TO 45 DEG [b1=a1-0] | IN SEC. OF 45 TO 90 DEG [b2=a2-a1] | IN SEC. OF 90 TO 135 DEG [b3=a3-a2] | IN SEC. OF 135 TO 180 DEG [b4=a4-a3] | IN SEC. OF 180 TO 225 DEG [b5=a5-a4] | IN SEC. OF 225 TO 270 DEG [b6=a6-a5] | IN SEC. OF 270 TO 315 DEG [b7=a7-a6] | IN SEC. OF 315 TO 360 DEG [b8=a8-a7] |
| ADJ. VALUE | IN SEC. OF 0 TO 45 DEG [c1] | IN SEC. OF 45 TO 90 DEG [c2] | IN SEC. OF 90 TO 135 DEG [c3] | IN SEC. OF 135 TO 180 DEG [c4] | IN SEC. OF 180 TO 225 DEG [c5] | IN SEC. OF 225 TO 270 DEG [c6] | IN SEC. OF 270 TO 315 DEG [c7] | IN SEC. OF 315 TO 360 DEG [c8] |
| ACC. ADJ. VALUE | IN SEC. OF 0 TO 45 DEG [e1] | IN SEC. OF 45 TO 90 DEG [e2] | IN SEC. OF 90 TO 135 DEG [e3] | IN SEC. OF 135 TO 180 DEG [e4] | IN SEC. OF 180 TO 225 DEG [e5] | IN SEC. OF 225 TO 270 DEG [e6] | IN SEC. OF 270 TO 315 DEG [e7] | IN SEC. OF 315 TO 360 DEG [e8] |
| LEARN VALUE (ADJ. 2ND DIFF.) | IN SEC. OF 0 TO 45 DEG [d1=b1 -c1+e1] | IN SEC. OF 45 TO 90 DEG [d2=b2 -c2+e2] | IN SEC. OF 90 TO 135 DEG [d3=b3 -c3+e3] | IN SEC. OF 135 TO 180 DEG [d4=b4 -c4+e4] | IN SEC. OF 180 TO 225 DEG [d5=b5 -c5-e5] | IN SEC. OF 225 TO 270 DEG [d6=b6 -c6+e6] | IN SEC. OF 270 TO 315 DEG [d7=b7 -c7+e7] | IN SEC. OF 315 TO 360 DEG [d8=b8 -c8+e8] |

FIG. 16

| ACC. CASE | e1 | e2 | e3 | e4 | e5 | e6 | e7 | e8 |
|---|---|---|---|---|---|---|---|---|
| -1% | -1 | 0 | 0 | 0 | 0 | 0 | 0 | 1 |
| -2% | -2 | -1 | 0 | 0 | 0 | 0 | 1 | 2 |
| -3% | -3 | -2 | -1 | 0 | 0 | 1 | 2 | 3 |
| -4% | -4 | -2 | -1 | 0 | 0 | 1 | 2 | 4 |
| -5% | -5 | -3 | -1 | 0 | 0 | 1 | 3 | 5 |
| -6% | -6 | -4 | -2 | 0 | 0 | 2 | 4 | 6 |
| -7% | -6 | -4 | -2 | 0 | 0 | 2 | 4 | 6 |
| -8% | -7 | -5 | -2 | 0 | 0 | 2 | 5 | 7 |
| -9% | -8 | -6 | -3 | 0 | 0 | 3 | 6 | 8 |
| -10% | -9 | -6 | -3 | 0 | 0 | 3 | 6 | 9 |

TIME CHANGE RATE

NOTE: FOR DECELERATION CASE, REVERSE SIGNS IN TABLE

FIG. 17

| ACT. DET. ANGLE (ACT. CNT. VALUE Kr) | 45 DEG | 90 DEG | 135 DEG | 180 DEG | 225 DEG | 270 DEG | 315 DEG | 360 DEG |
|---|---|---|---|---|---|---|---|---|
| 1ST DIFF. (Kp-Kr) | a1= -1 | a2= -3 | a3= -4 | a4= +2 | a5= +1 | a6= +4 | a7= +3 | a8= +2 |
| 2ND DIFF. | b1= -1 | b2= -2 | b3= -1 | b4= +6 | b5= -1 | b6= +3 | b7= -1 | b8= -1 |
| ADJ. VALUE | c1= 0 | c2= 0 | c3= +1 | c4= 0 | c5= 0 | c6= +1 | c7= 0 | c8= 0 |
| ACC. ADJ. VALUE | e1= -4 | e2= -2 | e3= -1 | e4= 0 | e5= 0 | e6= +1 | e7= +2 | e8= +4 |
| LEARN VALUE | d1= -5 | d2= -4 | d3= -3 | d4= +6 | d5= -1 | d6= +3 | d7= +1 | d8= +3 |

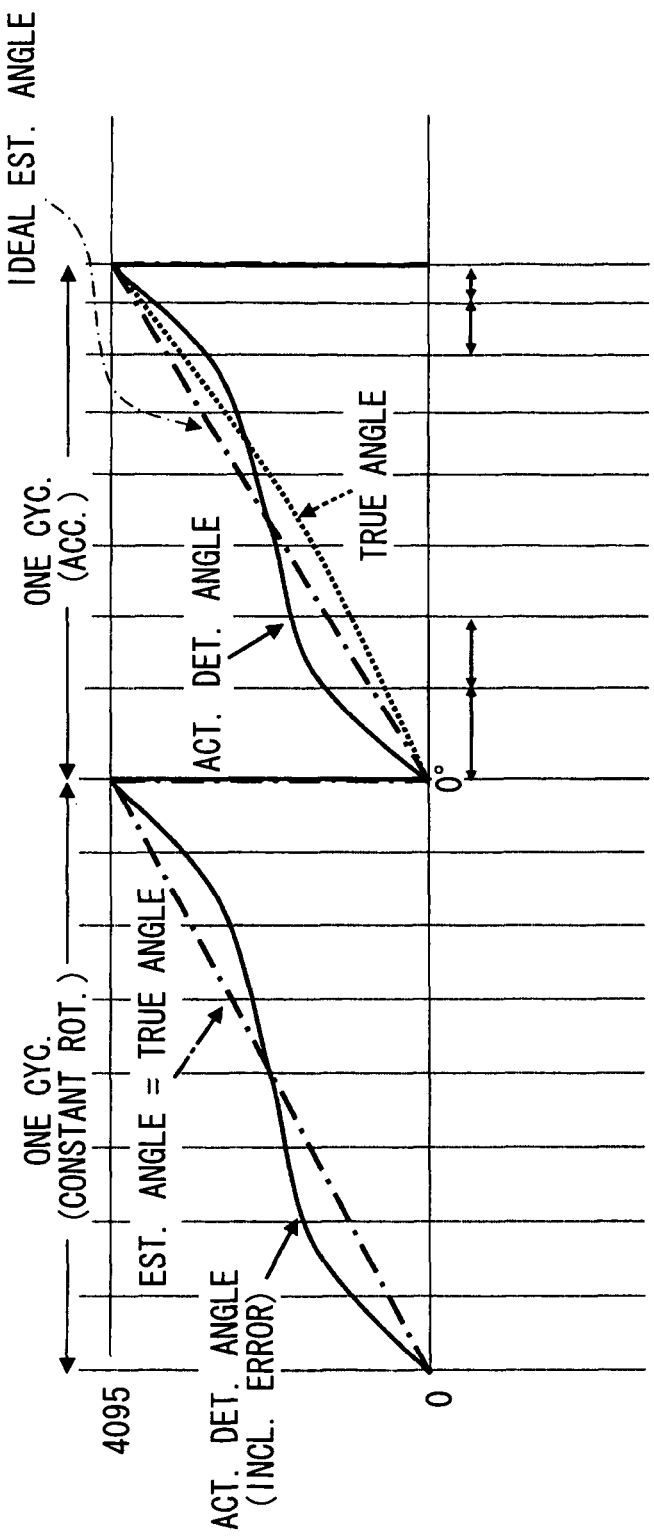

FIG. 19A

| ACT. DET. ANGLE | 45 DEG | 90 DEG | 135 DEG | 180 DEG | 225 DEG | 270 DEG | 315 DEG | 360 DEG |
|---|---|---|---|---|---|---|---|---|
| ACT. CNT. VALUE Kr | Kr45 | Kr90 | Kr135 | Kr180 | Kr225 | Kr270 | Kr315 | Kr360 |
| EST. CNT. VALUE Kp | Kp45 | Kp90 | Kp135 | Kp180 | Kp225 | Kp270 | Kp315 | Kp360 |
| 2ND DIFF. | IN SEC. OF 0 TO 45 DEG [{Kp45-0} -{Kr45-0} =b1] | IN SEC. OF 45 TO 90 DEG [{Kp90 -Kp45} -{Kr90 -Kr45}]=b2] | IN SEC. OF 90 TO 135 DEG [{Kp135 -Kp90} -{Kr135 -Kr90}]=b3] | IN SEC. OF 135 TO 180 DEG [{Kp180 -Kp135} -{Kr180 -Kr135}]=b4] | IN SEC. OF 180 TO 225 DEG [{Kp225 -Kp180} -{Kr225 -Kr180}]=b5] | IN SEC. OF 225 TO 270 DEG [{Kp270 -Kp225} -{Kr270 -Kr225}]=b6] | IN SEC. OF 270 TO 315 DEG [{Kp315 -Kp270} -{Kr315 -Kr270}]=b7] | IN SEC. OF 315 TO 360 DEG [{Kp360 -Kp315} -{Kr360 -Kr315}]=b8] |
| TOTAL OF 2ND DIFF. | TOTAL OF SECOND DIFFERENCES OF ONE CYCLE [b1+b2+b3+b4+b5+b6+b7+b8] | | | | | | | |
| ADJ. VALUE | IN SEC. OF 0 TO 45 DEG [c1] | IN SEC. OF 45 TO 90 DEG [c2] | IN SEC. OF 90 TO 135 DEG [c3] | IN SEC. OF 135 TO 180 DEG [c4] | IN SEC. OF 180 TO 225 DEG [c5] | IN SEC. OF 225 TO 270 DEG [c6] | IN SEC. OF 270 TO 315 DEG [c7] | IN SEC. OF 315 TO 360 DEG [c8] |
| LEARN VALUE (ADJ. 2ND DIFF.) | IN SEC. OF 0 TO 45 DEG [d1=b1-c1] | IN SEC. OF 45 TO 90 DEG [d2=b2-c2] | IN SEC. OF 90 TO 135 DEG [d3=b3-c3] | IN SEC. OF 135 TO 180 DEG [d4=b4-c4] | IN SEC. OF 180 TO 225 DEG [d5=b5-c5] | IN SEC. OF 225 TO 270 DEG [d6=b6-c6] | IN SEC. OF 270 TO 315 DEG [d7=b7-c7] | IN SEC. OF 315 TO 360 DEG [d8=b8-c8] |

FIG. 19B

| ACT. DET. ANGLE | 45 DEG | 90 DEG | 135 DEG | 180 DEG | 225 DEG | 270 DEG | 315 DEG | 360 DEG |
|---|---|---|---|---|---|---|---|---|
| ACT. CNT. VALUE Kr | 511 | 1023 | 1535 | 2047 | 2559 | 3071 | 3583 | 4095 |
| EST. CNT. VALUE Kp | 510 | 1020 | 1531 | 2049 | 2560 | 3075 | 3586 | 4097 |
| 2ND DIFF. | b1= −1 | b2= −2 | b3= −1 | b4= +6 | b5= −1 | b6= +3 | b7= −1 | b8= −1 |
| TOTAL OF 2ND DIFF. | b1+b2+b3+b4+b5+b6+b7+b8= +2 | | | | | | | |
| ADJ. VALUE | c1= 0 | c2= 0 | c3= +1 | c4= 0 | c5= 0 | c6= +1 | c7= 0 | c8= 0 |
| LEARN VALUE | d1= −1 | d2= −2 | d3= −2 | d4= +6 | d5= −1 | d6= +2 | d7= −1 | d8= −1 |

DRIVE MOTOR CONTROL APPARATUS FOR VEHICLE, MOTOR CONTROL SYSTEM, METHOD FOR CORRECTING ROTATION ANGLE OF MOTOR, PROGRAM FOR PERFORMING THE SAME, ROTATION DETECTING APPARATUS

CROSS REFERENCE TO RELATED APPLICATION

This application is based on and incorporates herein by reference Japanese Patent Application No. 2009-270016 filed on Nov. 27, 2009, Japanese Patent Application No. 2010-142736 filed on Jun. 23, 2010, Japanese Patent Application No. 2010-240998 filed on Oct. 27, 2010, and Japanese Patent Application No. 2010-240999 filed on Oct. 27, 2010.

BACKGROUND

1. Field of the Disclosure

The present disclosure relates to a drive motor control apparatus for a vehicle, a motor control system, a method for correcting a rotation angle of a motor, a program for performing the correcting method, and a rotation detecting apparatus.

2. Description of Related Art

For example, a drive motor control apparatus for controlling a motor of a vehicle having the motor as a drive power source, such as an electric vehicle, a hybrid vehicle, an electric train, is described in JP-A-H10-215504 and U.S. Pat. No. 5,896,283 which are incorporated by reference. The above drive motor control apparatus is configured to detect a rotation angle of the motor and to control energization of the motor based on the detection result. More specifically, the above drive motor control apparatus controls a drive device, such as an inverter, for energizing the motor.

JP-A-H10-215504 and U.S. Pat. No. 5,896,283 describe a control device provided with a resolver that serves as a rotation angle sensor for detecting the rotation angle of the motor. The resolver is a known rotation angle detecting sensor having a stator and a rotor that rotates synchronously with the rotation of an output shaft of the motor. The resolver outputs a rotation detection signal in accordance with a change of reluctance between the rotor and the stator based on the position of the rotor. In other words, the resolver outputs the rotation detection signal in accordance with the rotation angle of the motor. Note that in the description below, the stator and the rotor of the resolver are referred to as a "resolver stator" and a "resolver rotor" in order to distinguish from the stator and the rotor of the motor.

A specific configuration of the resolver will be described with an example of a two-phase resolver, which has phases different from each other by an electrical rotation angle of 90 degrees, and which outputs two rotation detection signals. The two-phase resolver has a primary coil provided to one of the resolver rotor and the resolver stator, and has a secondary coil provided to the other one. An energization signal of a constant frequency is supplied to the primary coil, and the secondary coil outputs two rotation detection signals, which are made by modulating the amplitude of the energization signal, and which have phases different from each other by 90 degrees.

The resolver outputs the rotation detection signal of an analog signal. Thus, when the rotation angle of the motor is detected 14 using the resolver, a resolver digital converter (RDC) is used in combination with the resolver, in general. Typically, the RDC converts the rotation detection signal from the resolver into angle data that is digital data indicating the rotation angle of motor. Then, the drive motor control apparatus controls energization of the motor based on the angle data from the RDC.

Note that, in a realistic condition, the two rotation detection signals outputted from the resolver have equivalent amplitudes and, are not offset from each other. Also, furthermore, the two rotation detection signals have the phase difference of a control value (90 degrees in the above example). The RDC functions idealistically when the rotation detection signals received from the resolver satisfy the above idealistic condition, and thereby the RDC provides a proper degree of detection accuracy of the rotation angle.

Also, in addition to the resolver, the rotation angle sensor for sensing the rotation angle of the motor includes, for example, an incremental encoder, which outputs a signal (or a pulse) for the rotation of the motor by a certain angle, and which outputs another signal (or another pulse) for the one rotation of the motor. Also, the rotation angle sensor may be an absolute encoder that outputs angle data indicating a rotation angle when the motor rotates a certain angle rotation. For example, the rotation angle sensor may be a sensor that includes a vertical Hall element and a magnetic resistance element (MRE) as described in JP-A-2008-185406 and US-A-2009-0295375, which are incorporated by reference. The above sensor outputs a signal in accordance with the rotation angle. As above, there are various kinds of the rotation angle sensors.

For example, in practice, the resolver may output the rotation detection signals that are different from the above idealistic signals due to various causes, such as "manufacturing variation" of the resolver. As a result, the two-phase resolver signals may have different amplitudes, the offset, or the phase error. In other words, the rotation detection signals from the resolver may include an error caused by the manufacturing variation. The "manufacturing variation" includes variation in the shape of the resolver rotor, the feature of each coil of the resolver, or the gap between the resolver rotor and the resolver stator.

If the rotation detection signals from the resolver include errors as above, angle data outputted from the RDC may accordingly include errors, and thereby a degree of detection accuracy of the rotation angle may deteriorate disadvantageously. Specifically, in the above deterioration state, even when the motor rotates at a constant speed, the angle data from the RDC becomes non-proportional to time, and thereby having a non-linear feature.

Because the drive motor control apparatus controls the energization of the motor based on the rotation angle of the motor known from the angle data of the RDC, the energization of the motor may be inappropriate for the actual rotation angle of the motor, and thereby causing degraded control accuracy of the motor.

For example, even when a vehicle drives at a constant speed, and also the driver does not change the accelerator pedal operation (or does not change the force for pressing the pedal), the vehicle may be accelerated or decelerated in a fore-and-aft direction unwantedly. The above unwanted phenomenon happens in the following process. Because angle data from the RDC includes the error, the angle data indicates a rotation angle different from the actual rotation angle of the motor. Thus, generated torque of the motor may be changed erroneously when the above erroneous data is used for the control of the motor. Thus, even when the driver does not change the accelerator pedal operation, the vehicle may be accelerated or decelerated erroneously. Thus, occupants of the vehicle including the driver may feel uneasy, as a result.

Also, the rotation angle sensor other than the resolver may have the erroneous detection signal issues caused by the manufacturing variation similar to the resolver, and thereby the other rotation angle sensor may have disadvantages similar to the resolver.

SUMMARY

The present disclosure is made in view of the above disadvantages. Thus, it is an objective of the present disclosure to address at least one of the above disadvantages.

To achieve the objective of the present disclosure, there is provided a drive motor control apparatus for a vehicle, wherein the vehicle has a motor and rotation detecting means. The motor provides a drive power of the vehicle. The rotation detecting means outputs reference angle information every time the motor rotates a reference angle, and the rotation detecting means outputs actual detected angle information every time the motor rotates a constant unit angle that is smaller than the reference angle. The reference angle information indicates rotation of the motor by the reference angle. The reference angle indicates an angle computed by dividing 360 degrees by a positive integer n. The actual detected angle information indicates an actual detected angle of rotation of the motor measured based on output timing, at which the reference angle information is outputted. The drive motor control apparatus controls energization of the motor by using the reference angle information and the actual detected angle information. The drive motor control apparatus includes correcting means. The correcting means corrects an error of the actual detected angle information in order to output corrected angle information that indicates a corrected angle of rotation of the motor measured based on the output timing of the reference angle information. The correcting means is configured to control the energization of the motor based on the corrected angle information, wherein the correcting means includes time estimating means, angle estimating means, first difference computing means, second difference computing means, adjusting means, and output processing means. The time estimating means measures duration of, one cycle of the reference angle information every time the reference angle information is outputted. The duration is measured between a previous time, at which the reference angle information is previously outputted, and a current time, at which the reference angle information is currently outputted. The time estimating means computes an estimated time, which is required for the motor to rotate the unit angle in subsequent rotation of the motor, based on the duration. The angle estimating means computes an estimated angle of rotation of the motor, which is measured based on the output timing of the reference angle information, every time the estimated time elapses under an assumption that the motor rotates the unit angle while the estimated time elapses. The angle estimating means outputs estimated angle information that indicates the estimated angle. The first difference computing means computes one of a plurality of first differences of a plurality of representative angles every time the actual detected angle indicated by the actual detected angle information becomes a corresponding one of the plurality of representative angles during the one cycle of the reference angle information. The plurality of representative angles includes a final angle that corresponds to a final, value of the actual detected angle. The one of the plurality of first differences indicates an advancing amount of the estimated angle relative to the actual detected angle. The second difference computing means computes a plurality of second differences of a plurality of angular sections based on the plurality of first differences of the plurality of representative angles of the one cycle. One of the plurality of angular sections is defined between an initial value of the actual detected angle at the output timing of the reference angle information and a minimum representative angle of the plurality of representative angles. The other one of the plurality of angular sections is defined between adjacent ones of the plurality of representative angles. Each of the plurality of second differences indicates an exceeding amount of an increase amount of the estimated angle relative to an increase amount of the actual detected angle within a corresponding one of the plurality of angular sections. The second difference computing means stores each of the plurality of second differences of the plurality of angular sections in a storage part in association with the corresponding one of the plurality of angular sections. The adjusting means adjusts the plurality of second differences of the plurality of angular sections of the one cycle, which is stored in the storage part, in accordance with a degree of acceleration and deceleration of the motor. The output processing means executes an initialization process, an output updating process, and a correcting process. In initialization process, a value of the corrected angle information is set to the initial value when the reference angle information is outputted. In the output updating process, the value of the corrected angle information is increased by a certain value, which corresponds to the unit angle, based on the output timing of the reference angle information every time the actual detected angle information is outputted. In the correcting process, the certain value used in the output updating process is changed such that an increase amount of the value of the corrected angle information, which is increased while the actual detected angle indicated by the actual detected angle information changes within each of the plurality of angular sections, is increased by a corresponding one of the plurality of second differences, which is adjusted by the adjusting means.

To achieve the objective of the present disclosure, there is also provided a motor control system for a vehicle, wherein the motor control system includes a motor, a rotation sensor, and a controller. The motor provides a drive power. The rotation sensor is configured to outptit reference angle information every time the motor rotates a reference angle. The rotation sensor is configured to output actual detected angle information every time the motor rotates constant unit angle that is smaller than the reference angle. The actual detected angle information indicates an actual detected angle of rotation of the motor measured based on output timing, at which the reference angle information is outputted. The controller is coupled to the rotation sensor and the motor. The controller receives the actual detected angle information and the reference angle information from the rotation sensor. The controller outputs a control command of controlling energization to the motor, wherein the controller includes an estimated pulse generator, a counter, and a memory. The estimated pulse generator is coupled to the rotation sensor. The estimated pulse generator measures duration of one cycle of the reference angle information every time the reference angle information is outputted. The duration is measured between a previous time, at which the reference angle information is previously outputted, and a current time, at which the reference angle information is currently outputted. The estimated pulse generator computes an estimated time, which is required for the motor to rotate the unit angle in subsequent rotation of the motor, based on the duration. The estimated pulse generator generates an estimated pulse based on the estimated time. The counter is coupled to the rotation sensor and the estimated pulse generator. The counter computes an estimated angle of rotation of the motor, which is measured based on the output timing of the reference angle information, by counting the estimated pulse every time the counter receives the estimated pulse under an assumption that the motor rotates the unit angle while the estimated time elapses. The counter outputs estimated angle information that indicates the estimated angle. The memory stores therein a plurality of first differences of a plurality of representative angles. One of the plurality of first differences of the plurality of representative angles is stored every time the actual detected angle indicated by the actual detected angle information becomes a corresponding one of the plurality of representative angles during the one cycle of the reference angle information. The plurality of representative angles includes a final angle that corresponds to a final value of the actual detected angle. The one of the plurality of first differences indicates an advance amount of the estimated angle relative to the actual detected angle. The memory further stores therein a plurality of second differences of a plurality of angular sections. The plurality of second differences is computed based on the plurality of first differences of the plurality of representative angles stored in the memory. One of the plurality of angular sections is defined between an initial value of the actual detected angle at the output timing of the reference angle information and a minimum representative angle of the plurality of representative angles. The other one the plurality of angular sections is defined between adjacent ones of the plurality of representative angles. Each of the plurality of second differences indicates an exceeding amount of an increase amount of the estimated angle relative to an increase amount of the actual detected angle within a corresponding one of the plurality of angular sections. The memory further stores therein a plurality of learning values of the plurality of angular sections. The plurality of learning values is computed by adjusting the plurality of second differences stored in the memory in accordance with one of the plurality of first differences computed at the final angle. The controller outputs an initialization command, an output updating command, and a correcting command. In initialization command, a value of corrected angle information, which indicates a corrected angle of rotation of the motor, is set to the initial value when the reference angle information is outputted. In the output updating command, the value of the corrected angle information by a certain value, which corresponds to the unit angle, is increased based on the output timing of the reference angle information every time the actual detected angle information is outputted. In the correcting command, an increase amount of the value of the corrected angle information, which is increased while the actual detected angle changes within each of the plurality of angular sections, is increased by a corresponding one of the plurality of learning values of the plurality of angular sections stored in the memory. The controller outputs the control command, which is computed based on the corrected angle information, to the motor.

To achieve the objective of the present disclosure, there is also provided a motor control system for a vehicle, wherein the motor control system includes a motor, a rotation sensor, and a controller. The motor provides a drive power. The rotation sensor is configured to output reference angle information every time the motor rotates a reference angle, the rotation sensor is configured to output actual detected angle information every time the motor rotates a constant unit angle that is smaller than the reference angle. The actual detected angle information indicates an actual detected angle of rotation of the motor measured based on output timing, at which the reference angle information is outputted. The controller is coupled to the motor and the rotation sensor. The controller has therein a memory. The controller is configured to measure duration of one cycle of the reference angle information every time the reference angle information, is outputted. The duration is measured between a previous time, at which the reference angle information is previously outputted, and a current time, at which the reference angle information is currently outputted. The controller computes an estimated time, which is required for the motor to rotate the unit angle in subsequent rotation of the motor, based on the duration. The controller is configured to compute estimated angle information every time the estimated time elapses under an assumption that the motor rotates the unit angle while the estimated time elapses. The estimated angle information indicates an estimated angle of rotation of the motor measured based on the output timing of the reference angle information. The controller is configured to compute one of a plurality of first differences of a plurality of representative angles every time the actual detected angle indicated by the actual detected angle information becomes a corresponding one of the plurality of representative angles during the one cycle of the reference angle information. The one of the plurality of first differences indicates a difference between the estimated angle and the actual detected angle. The controller is configured to compute a plurality of second differences of a plurality of angular sections based on the plurality of first differences of the plurality of representative angles. One of the plurality of angular sections is defined between an initial value of the actual detected angle at the output timing of the reference angle information and a minimum representative angle of the plurality of representative angles. The other one of the plurality of angular sections is defined between adjacent ones of the plurality of representative angles. Each of the plurality of second differences indicates a difference between an increase amount of the actual detected angle and an increase amount of the estimated angle within a corresponding one of the plurality of angular sections. The controller is configured to store each of the plurality of second differences in the memory in association with the corresponding one of the plurality of angular sections. The controller is configured to compute a plurality of learning values by adjusting the plurality of second differences in accordance with a degree of acceleration and deceleration of the motor. The controller is configured to initialize a value of the corrected angle information, which indicates a corrected angle of rotation of the motor, when the controller receives the reference angle information. The controller is configured to increase the value of the corrected angle information by a value corresponding to the unit angle every time the actual detected angle information is outputted. The controller is configured to increase an increase amount of the value of the corrected angle information within each of the plurality of angular sections by a value indicated by a corresponding one the plurality of learning values. The controller is configured to control the motor based on the corrected angle information.

To achieve the objective of the present disclosure, there is also provided a computer-readable medium having computer-executable instructions for performing a method. In the method, reference angle information is obtained from a rotation sensor every time a motor rotates a reference angle. Actual detected angle information is obtained from the rotation sensor every time the motor rotates a constant unit angle that is smaller than the reference angle. The actual detected angle information indicates an actual detected angle of rotation of the motor measured based on output timing, at which the reference angle information is outputted. Duration, of one cycle of the reference angle information is measured every time the reference angle information is outputted. The duration is measured between a previous time, at which the reference angle information is previously outputted, and a current time, at which the reference angle information is currently outputted. An estimated time, which is required for the motor to rotate the unit angle in subsequent rotation of the motor, is estimated based on the duration. Estimated angle information is computed every time the estimated time elapses under an assumption that the motor rotates the unit angle while the estimated time elapses. The estimated angle information indicates an estimated angle of rotation of the motor measured based on the output timing of the reference angle information. One of a plurality of first differences is computed every time the actual detected angle indicated by the actual detected angle information becomes a corresponding one of a plurality of representative angles during the one cycle of the reference angle information. The plurality of representative angles includes a final angle that corresponds to a final value of the actual detected angle. The one of the plurality of first differences indicates a difference between the estimated angle and the actual detected angle. A plurality of second differences of a plurality of angular sections is computed based on the plurality of first differences of the plurality of representative angles. One of the plurality of angular sections is defined between an initial value of the actual detected angle at the output timing of the reference angle information and a minimum representative angle of the plurality of representative angles. The other one of the plurality of angular sections is defined between adjacent ones of the plurality of representative angles. Each of the plurality of second differences indicates a difference between an increase amount of the actual detected angle and an increase amount of the estimated angle within a corresponding one of the plurality of angular sections. Each of the plurality of second differences is stored in a storage part in association with the corresponding one of the plurality of angular sections. The plurality of second differences stored in the storage part is adjusted in accordance with a degree of acceleration and deceleration of the motor. A value of corrected angle information to the initial value is initialized when the reference angle information is outputted. The corrected angle information indicates a corrected angle of rotation of the motor. The corrected angle information is computed every time the actual detected angle information is outputted by increasing an increase amount of the value of the corrected angle information, which is increased while the actual detected angle changes within each of the plurality of angular sections, by a value indicated by a corresponding one of the adjusted plurality of second differences stored in the storage part.

To achieve the objective of the present disclosure, there is also provided a method for correcting a rotation angle of a motor. In the method, reference angle information is obtained from a rotation sensor every time a motor rotates a reference angle. Actual detected angle information is obtained from the rotation sensor every time the motor rotates a constant unit angle that is smaller than the reference angle. The actual detected angle information indicates an actual detected angle of rotation of the motor measured based on output timing, at which the reference angle information is outputted. Duration of one cycle of the reference angle information is measured every time the reference angle information is outputted. The duration is measured between a previous time, at which the reference angle information is previously outputted, and a current time, at which the reference angle information is currently outputted. An estimated time, which is required for the motor to rotate the unit angle in subsequent rotation of the motor, is estimated based on the duration. Estimated angle information is computed every time the estimated time elapses under an assumption that the motor rotates the unit angle while the estimated time elapses. The estimated angle information indicates an estimated angle of rotation of the motor measured based on the output timing of the reference angle information. One of a plurality of first differences is computed every time the actual detected angle indicated by the actual detected angle information becomes a corresponding one of a plurality of representative angles during the one cycle of the reference angle information. The plurality of representative angles includes a final angle that corresponds to a final value of the actual detected angle. The one of the plurality of first differences indicates a difference between the estimated angle and the actual detected angle. A plurality of second differences of a plurality of angular sections is computed based on the plurality of first differences of the plurality of representative angles. One of the plurality of angular sections is defined between an initial value of the actual detected angle at the output timing of the reference angle information and a minimum representative angle of the plurality of representative angles. The other one of the plurality of angular sections is defined between adjacent ones of the plurality of representative angles. Each of the plurality of second differences indicates a difference between an increase amount of the actual detected angle and an increase amount of the estimated angle within a corresponding one of the plurality of angular sections. Each of the plurality of second differences is stored in a storage part in association with the corresponding one of the plurality of angular sections. The plurality of second differences stored in the storage part is adjusted in accordance with a degree of acceleration and deceleration of the motor. A value of corrected angle information to the initial value is initialized when the reference angle information is outputted. The corrected angle information indicates a corrected angle of rotation of the motor. The corrected angle information is computed every time the actual detected angle information is outputted by increasing an increase amount of the value of the corrected angle information, which is increased while the actual detected angle changes within each of the plurality of angular sections, by a value indicated by a corresponding one of the adjusted plurality of second differences stored in the storage part.

To achieve the objective of the present disclosure, there is also provided a rotation detecting apparatus for detecting rotation of a motor that provides a drive power of a vehicle, wherein the rotation detecting apparatus sending a control signal to an external control unit that controls energization of the motor, the rotation detecting apparatus including a rotation sensor, and an error correcting device. The rotation sensor outputs reference angle information every time the motor rotates a predetermined reference angle. The rotation sensor outputs actual detected angle information, every time the motor rotates a unit angle that is smaller than the reference angle. The actual detected angle information indicates an actual detected angle of rotation of the motor measured based on output timing, at which the reference angle information is outputted. The error correcting device is configured to correct an error of the actual detected angle information in order to output corrected angle information that indicates a corrected angle of rotation of the motor measured based on the output timing of the reference angle information. The error correcting device includes an estimated pulse generator, an estimated pulse counter, a first difference computing device, a second difference computing device, an adjusting device, and an output processing device. The estimated pulse generator is configured to measure duration of one cycle of the reference angle information every time the reference angle information is outputted. The duration is measured between a previous time, at which the reference angle information is previously outputted, and a current time, at which the reference angle information is currently outputted. The estimated pulse generator is configured to compute an estimated time, which is required for the motor to rotate the unit angle in subsequent rotation of the motor, based on the duration. The estimated pulse generator is configured to generate an estimated pulse having a pulse width that is equivalent to the estimated time. The estimated pulse counter is configured to count the estimated pulse in order to compute estimated angle information indicating an estimated angle of rotation of the motor measured based on the output timing of the reference angle information. The estimated pulse counter outputs the estimated angle information. The first difference computing device is configured to compute one of a plurality of first differences every time the actual detected angle indicated by the actual detected angle information becomes a corresponding one of a plurality of representative angles during the one cycle of the reference angle information. The plurality of representative angles includes a final angle that corresponds to a final value of the actual detected angle. The one of the plurality of first differences indicates an advancing amount of the estimated angle relative to the actual detected angle. The second difference computing device is configured to compute a plurality of second differences of a plurality of angular sections based on the plurality of first differences computed for the plurality of representative angles of the one cycle. The plurality of angular sections is defined between adjacent ones of a plurality of angles that includes the plurality of representative angles and an angle that corresponds to an initial value of the actual detected angle measured at the output timing of the reference angle information. Each of the plurality of second differences indicates a difference between an increase amount of the actual detected angle and an increase amount of the estimated angle within a corresponding one of the plurality of angular sections. The second difference computing device is configured to store each of the plurality of second differences in a storage part in association with the corresponding one of the plurality of angular sections. The adjusting device is configured to compute a plurality of learning values by adjusting the plurality of second differences of the one cycle stored in the storage part in accordance with a degree of acceleration and deceleration of the motor. The output processing device is configured to execute an initialization process, an output updating process, and a correcting process. In the initialization process, a value of the corrected angle information is set to the initial value, when the reference angle information is outputted. In the output updating process, the value of the corrected angle information is increased by a certain value, which corresponds to the unit angle, every time the actual detected angle information is outputted. In the correcting process, the certain value used in the output updating process is changed in order to increase an increase amount of the value of the corrected angle information, which is increased while the actual detected angle changes within each of the plurality of angular sections, by an increase amount indicated by a corresponding one of the plurality of learning values.

To achieve the objective of the present disclosure, there is also provided a rotation detecting apparatus for detecting rotation of a motor that provides a drive power of a vehicle, wherein the rotation detecting apparatus includes actual detected angle computing means, estimated angle computing means, first difference computing means, second difference computing means, learning value computing means, and correcting means. The actual detected angle computing means computes actual detected angle information based on reference angle information and unit rotation angle information. The actual detected angle computing means receives the reference angle information every time the motor rotates a predetermined reference angle. The actual detected angle computing means receives the unit rotation angle information every time the motor rotates a unit angle smaller than the reference angle. The unit angle is computed based on a predetermined resolution value. The actual detected angle information indicates an actual detected angle of rotation of the motor measured based on reference timing, at which the reference angle information is received. The estimated angle computing means measures duration of one cycle of receiving the reference angle information. The estimated angle computing means computes estimated angle information, which indicates an estimated angle of rotation of the motor, based on the duration and the predetermined resolution value. The estimated angle is measured based on the reference timing of the reference angle information. The first difference computing means computes a first difference every time the duration elapses. The first difference indicates a difference between the estimated angle information and the actual detected angle information. The second difference computing means computes a plurality of second differences of the one cycle. Each of the plurality of second differences indicates a difference between an increase amount of the estimated angle information and an increase amount of the actual detected angle information within a corresponding one of a plurality of angular sections defined in the one cycle. The learning value computing means computes a plurality of learning values by adjusting the plurality of second differences of the one cycle in accordance with the first difference. The learning value computing means stores the plurality of learning values in a storage part in association with the plurality of angular sections. The correcting means corrects the actual detected angle information such that a change amount of the actual detected angle information, which is changed while the actual detected angle indicated by the actual detected angle information changes within each of the plurality of angular sections, is further changed by an amount indicated by a corresponding one of the plurality of learning values. The correcting means outputs the corrected actual detected angle information as corrected angle information that indicates a corrected rotation angle of the motor.

BRIEF DESCRIPTION OF THE DRAWINGS

The disclosure, together with additional objectives, features and advantages thereof, will be best understood from the following description, the appended claims and the accompanying drawings in which:

FIG. 4A is an explanatory diagram illustrating an A-phase signal;

FIG. 4B is an explanatory diagram illustrating a B-phase signal;

FIG. 4C is an explanatory diagram illustrating a Z-phase signal;

FIG. 4D is an explanatory diagram illustrating an actual pulse Pr generated by the error correcting portion based on the phase signals;

FIG. 4E is an explanatory diagram illustrating a count value (actual count value Kr);

FIGS. 6A to 6E are explanatory diagrams for explaining a division method of the first embodiment;

FIGS. 8A and 8B are explanatory diagrams for explaining a procedure of obtaining a learning value;

FIG. 9 is an explanatory diagram for explaining a distribution rule for determining adjustment values;

FIG. 14 is an explanatory diagram illustrating a procedure of obtaining a learning value according to the second embodiment of the present disclosure;

FIG. 16 is an explanatory diagram for explaining a map for determining acceleration adjustment values;

FIG. 17 is an explanatory diagram for explaining a computation example for computing the learning value of the second embodiment;

FIG. 18 is an explanatory diagram for explaining a principle of the disclosure;

FIGS. 19A and 19B are explanatory diagrams for explaining a procedure of obtaining a learning value of modification;

DETAILED DESCRIPTION OF PREFERRED EMBODIMENTS

Embodiments of the present disclosure applied to a drive motor control apparatus for a vehicle will be described below. The drive motor control apparatus of the present embodiments is mounted to an electric vehicle serving as the vehicle, and the drive motor-control apparatus controls a drive motor that provides a drive power of the electric vehicle.

First Embodiment

Figure 1:
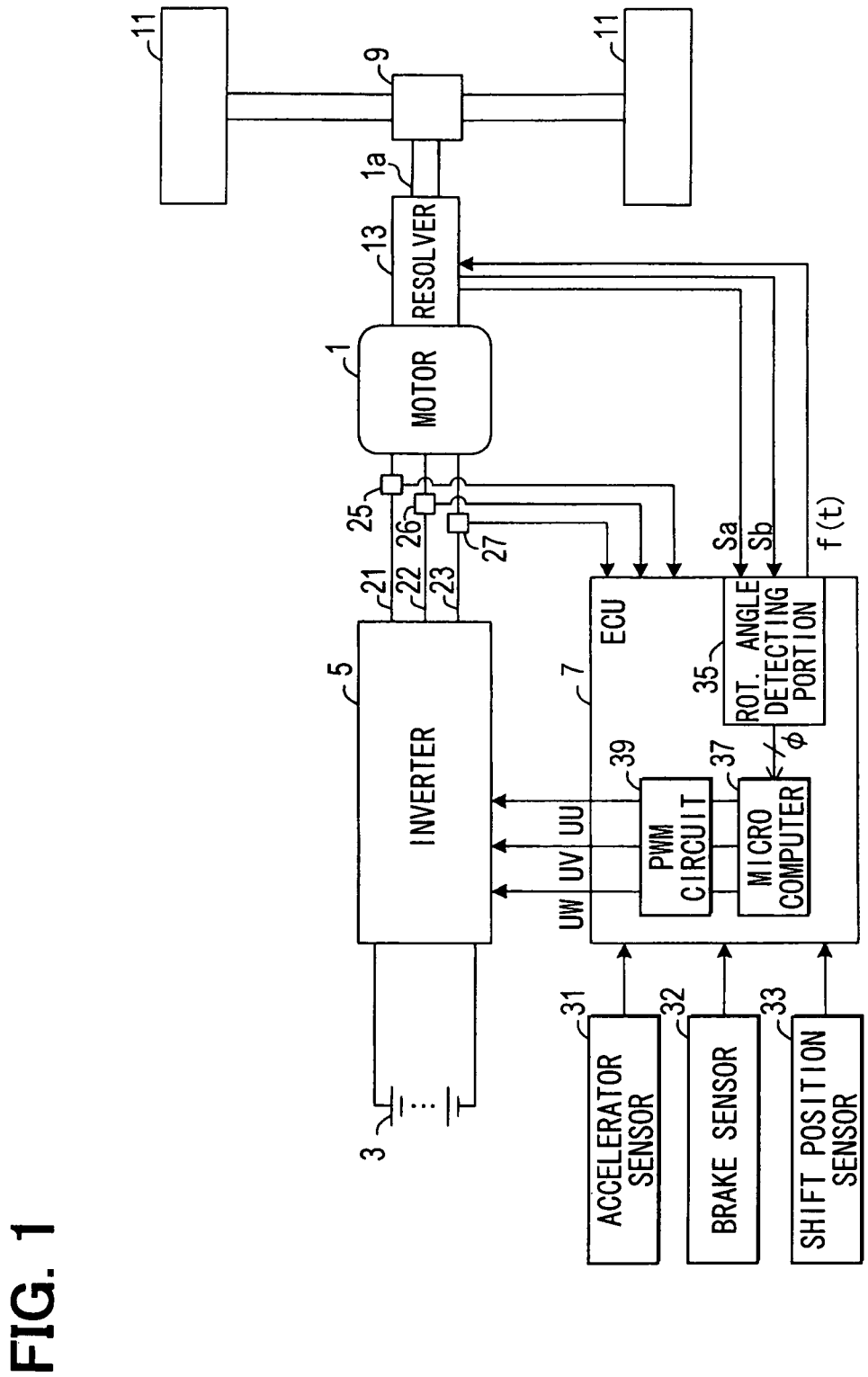
FIG. 1 is a diagram illustrating a control system of an electric vehicle of according to the first embodiment of the present disclosure.

Firstly, FIG. 1 is a diagram illustrating a control system of an electric vehicle according to the first embodiment of the present disclosure.

As shown in FIG. 1, the electric vehicle of the present embodiment includes a drive motor 1 (also referred to as, the motor 1), a battery 3, an inverter 5, and a drive motor control apparatus (or an ECU) 7. More specifically, the motor 1 is an alternating current synchronous motor, and the battery 3 is a direct-current power source. The inverter 5 converts a direct-current output voltage of the battery 3 into a three-phase alternating current, and the inverter 5 drives the motor 1 by using U-phase, V-phase, and W-phase of the above three-phase alternating electric current. The ECU 7 controls the motor 1 through the inverter 5. The motor 1 has an output shaft 1a that is connected with left and right drive wheels 11 through a differential gear 9.

The inverter 5 includes six switching elements and a drive circuit, typically. For example, the above switching elements are made of an IGBT (insulated gate bipolar transistor), and the drive circuit drives the switching elements. The drive circuit receives pulse width modulation signals UU, UV, UW from the ECU 7, and the drive circuit turns on and off the switching elements based on the pulse width modulation signals UU, UV, UW in order to convert the direct-current of the battery 3 into the three-phase alternating current.

Furthermore, the output shaft 1a of the motor 1 is provided with a resolver 13 that serves as a sensor for sensing a rotation angle of the motor 1. More specifically, the resolver 13 senses the rotation angle of the rotor of the motor 1. The resolver 13 includes a resolver stator and a resolver rotor. The resolver rotor is rotatably received within the resolver stator, and is fixed to the output shaft 1a of the motor 1 such that the resolver rotor is rotatable with the output shaft 1a.

The resolver 13 is configured such that a reluctance between the resolver rotor and the resolver stator varies with a rotational position of the resolver rotor (corresponding to a rotation angle of the motor 1). The resolver 13 outputs two rotation detection signals Sa, Sb. More specifically, an amplitude of the rotation detection signal Sa, Sb changes in a sinusoidal manner (or in a sine-wave shape) in accordance with the change of the reluctance. In other words, the amplitude of the rotation detection signal Sa, Sb changes in the sinusoidal manner in accordance with the rotation angle of the motor 1. Also, one of the two rotation detection signals Sa, Sb is an electrical angle of 90 degrees out of phase of the other one of the signals Sa, Sb.

More specifically, the resolver stator of the resolver 13 has a primary coil and two secondary coils. By supplying the primary coil with energization signals f(t) having a constant frequency, a rotation detection signal Sa (=f(t)·sin θ) and a rotation detection signal Sb (=f(t)·cos θ) are outputted from the respective secondary coils as the rotation detection signals in accordance with the rotation angle of the motor 1. More specifically, the rotation detection signal Sa has a waveform that is made by modifying the amplitude of the energization signal f(t) by sin θ. Also, the rotation detection signal Sb has a waveform that is made by modifying the amplitude of the energization signal f(t) by cos θ. The above resolver 13 is described in JP-A-2007-33412, JP-A-2008-271740 and US-A-2008-0265831, which are incorporated by reference in this embodiment.

θ indicates an angle that is an integer multiple of the rotation angle of the motor (multiplied by a positive integer n), and θ indicates an electrical rotation angle (electrical angle of rotation) of the resolver 13. Also, n indicates a number of times of sequence of θ per one rotation of the motor, and is also referred to as an angular ratio, in general. In other words, n is, a ratio of the electrical angle relative to mechanical angle.

Also, in the description below, the "rotation" of the resolver 13 indicates the electrical rotation of the resolver rotor unless otherwise specified instead of the mechanical rotation of the resolver rotor. Also, a "cycle" or "one cycle" of the resolver 13 indicates a period for one electrical rotation of the resolver 13 unless otherwise specified. As a result, the rotation angle of the resolver 13 indicates the electrical rotation angle of the resolver 13.

The resolver 13 of the present embodiment is configured such that one cycle of the reluctance change between (a) the resolver rotor and (b) the resolver stator corresponds to one rotation of the resolver rotor. In the above, the one cycle of the reluctance change indicates one cycle of the rotation detection signals Sa, Sb or one cycle of sin θ and cos θ, which are fundamental components. Also, the one rotation of the resolver rotor indicates the one mechanical rotation or one rotation of the motor 1. In summary, the electrical angle of the rotation detection signals Sa, Sb coincides with the mechanical angle of the resolver rotor, resulting in that the angular ratio is 1.

The above configuration of the resolver 13 having the angular ratio of 1 is just one example, and the resolver 13 is not limited to the above configuration. For example, the resolver 13 may alternatively be configured such that the rotation detection signals Sa, Sb for N cycles (N is an integer equal to or greater than 2) correspond to the one rotation of a resolver rotor. In other words, in the above alternative configuration, the angular ratio is N. As a result, for example, in a case of a resolver having the angular ratio of 2, the rotation angle of the resolver 13 changes in a range from 0 degree to 720 degrees during one rotation of the motor 1. In other words, every half turn (half-rotation) of the motor 1 corresponds to one rotation of the resolver 13. The rotation angle of the motor 1 per one rotation of the resolver 13 corresponds to a reference angle. For example, the reference angle corresponds to a mechanical angle of rotation of the motor 1.

Furthermore, as shown in FIG. 1, electric current supply lines 21, 22, 23 of the respective phases connect the inverter 5 with the motor 1, and each of the electric current supply lines 21, 22, 23 is provided with a respective electric current sensor 25, 26, 27. The electric current sensor 25 detects a U-phase electric current level of the motor 1 and correspondingly output a U-phase electric current signal. Similarly, the electric current sensor 26 detects a V-phase electric current level of the motor 1 and correspondingly outputs a V-phase electric current signal. The electric current sensor 27 detects a W-phase electric current level of the motor 1 and correspondingly outputs a W-phase electric current signal. Then, each electric current signal from the electric current sensors 25 through 27 is fed to the ECU 7.

Furthermore, the electric vehicle is equipped with various sensors for detecting an operational state of the electric vehicle, such as an accelerator sensor 31, a brake sensor 32, and a shift position sensor 33.

For example, the accelerator sensor 31 is connected to an accelerator pedal (not shown) that is operated by the driver of the vehicle, and the accelerator sensor 31 outputs an accelerator pedal position signal that corresponds to a depressing amount of the accelerator pedal. The brake sensor 32 is connected to a brake pedal (not shown) that is operated by the driver, and the brake sensor 32 outputs a brake oil pressure signal that corresponds to a depressing amount of the brake pedal. The shift position sensor 33 is connected to a gear shift lever (not shown) operated by the driver, and detects a selected position of the gear shift lever between "drive (forward)", "neutral", "reverse", and "parking" in order to output the shift position signal.

Signals from the sensors 31 through 33 (the accelerator pedal position signal, the brake oil pressure signal, the shift position signal) are fed to the ECU 7 as the vehicle operational data.

The ECU 7 provides the resolver 13 with the energization signals f(t), and receives the rotation detection signals Sa, Sb outputted from the resolver 13. More specifically, the ECU 7 includes a rotation angle detecting portion 35, a microcomputer 37, and a pulse width modulation (PWM) circuit 39. The rotation angle detecting portion 35 outputs digital data φ (referred to also as angle data φ), which corresponds to the rotation angle of the motor 1, based on the fed rotation detection signals Sa, Sb. The microcomputer 37 is made of CPU, ROM, RAM, and I/O circuit. Note that the angle data φ outputted by the rotation angle detecting portion 35 indicates the rotation angle of the resolver 13 but may not directly indicate the rotation angle of the motor 1. However, in the present embodiment, because the angular ratio of the resolver 13 is 1, the angle data φ from the rotation angle detecting portion 35 directly indicates the rotation angle of the motor 1.

The pulse width modulation circuit 39 generates pulse width modulation signals UU, UV, UW based on control signal from the microcomputer 37 correspondingly to each phase of the three-phase alternating electric current. Also, the pulse width modulation circuit 39 outputs the pulse width modulation signals UU, UV, UW to the inverter 5. As a result, the inverter 5 supplies the motor 1 with the three-phase alternating electric current having U-phase, V-phase, and W-phase.

The microcomputer 37 receives the angle data φ from the rotation angle detecting portion 35 as a detection value of the rotation angle of the motor 1. Typically, the microcomputer 37 computes a rotational speed (rotational speed) of the motor 1 based on a change amount of the angle data φ per unit time.

The microcomputer 37 drives the inverter 5 based on (a) rotation information of the motor 1, such as the rotation angle and the rotational speed, and (b) signals from the electric current sensors 25 through 27 also from the sensors 31 through 33 in order to cause the motor 1 to generate desired torque in accordance with an operational state of the vehicle. Control of the motor 1 will be briefly described below.

The microcomputer 37 computes a required amount of the torque to be generated by the motor 1 based on (a) the rotation angle and the rotational speed of the motor 1 and (b) the vehicle operational data (the accelerator pedal position signal, the brake oil pressure signal, and the shift position signal). Then, the microcomputer 37 computes an electric current command vector, which is used for energizing the motor 1, based on the required amount by using a vector operation. Subsequently, the microcomputer 37 outputs a control signal to the pulse width modulation circuit 39 based on the above computation result in order to cause the motor 1 to generate the required amount of the torque. Furthermore, in the above, the microcomputer 37 feed-back controls the control signal to the pulse width modulation circuit 39 based on at least two electric current signals (for example, the U-phase electric current signal and the W-phase electric current signal) from the electric current sensors 25 through 27 such that each electric current of the three-phase current to the motor 1 coincides with a target value. As a result, the microcomputer 37 feed-back controls the pulse width modulation signals UU, UV, UW from the pulse width modulation circuit 39 to the inverter 5, accordingly.

Figure 2:
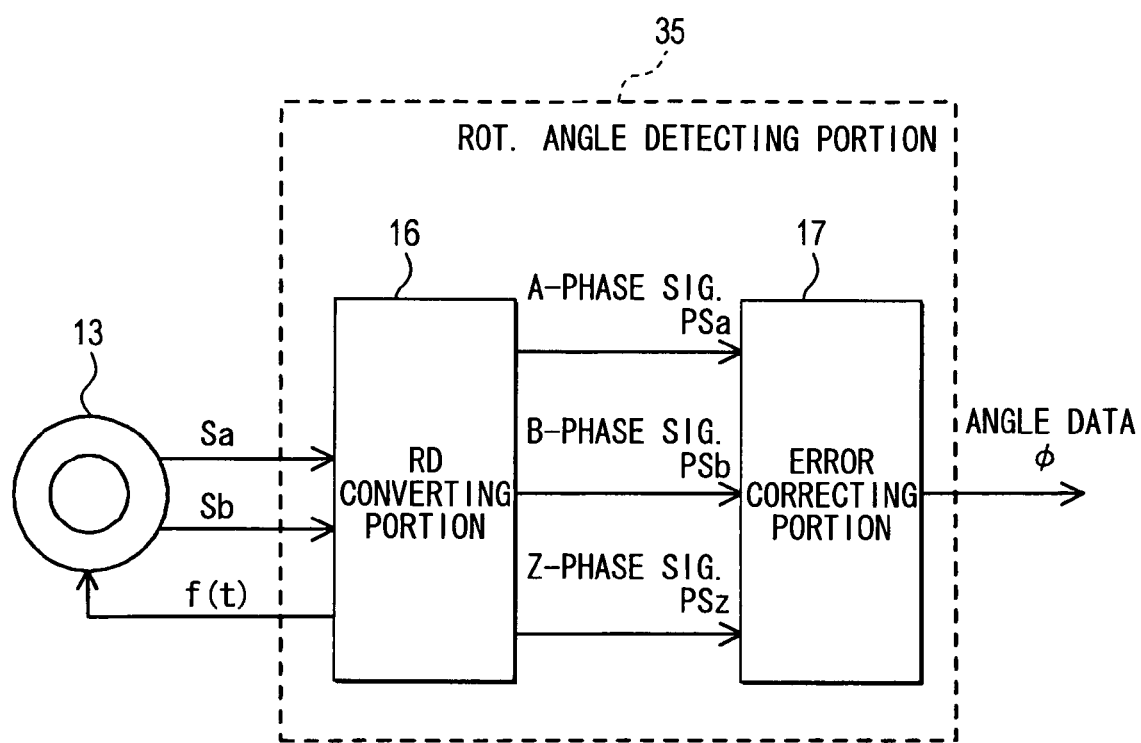
FIG. 2 is a diagram illustrating a schematic configuration of a resolver and a rotation angle detecting portion according to the first embodiment.
Figure 3:
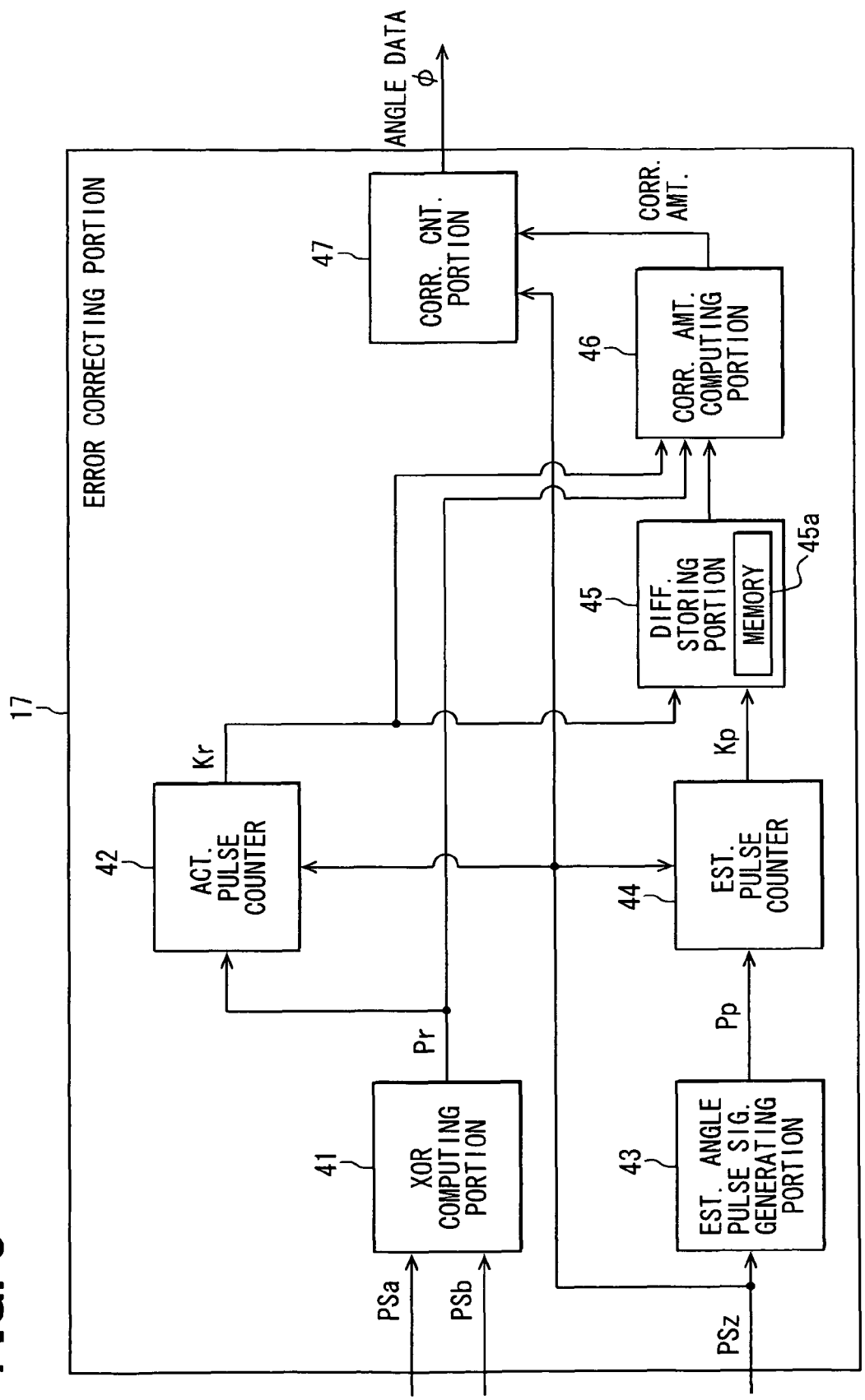
FIG. 3 is a diagram illustrating a configuration of an error correcting portion of the first embodiment.

Next, a configuration of the rotation angle detecting portion 35 will be described with reference to FIG. 2 and FIG. 3. FIG. 2 is a diagram illustrating a schematic configuration of the resolver 13 and the rotation angle detecting portion 35, and FIG. 3 is a diagram illustrating a configuration of an error correcting portion 17 of the rotation angle detecting portion 35.

A method of detecting the rotation angle of the motor 1 will be briefly described below.

FIG. 2 shows the resolver 13 (rotation detecting means), and also shows an RD converting portion 16 (rotation detecting means) and the error correcting portion 17 (correcting means), both of which constitute the rotation angle detecting portion 35. More specifically, the error correcting, portion 17, as shown in FIG. 3, includes an exclusive-OR computing portion 41 (rotation detecting means), an actual pulse counter 42 (rotation detecting means), an estimated angle pulse signal generating portion 43 (time estimating means), an estimated pulse counter 44 (angle estimating means), a difference storing portion 45 (first difference computing means, second difference computing means, adjusting means), a correction amount computing portion 46 (output processing means), and a corrected count portion 47 (output processing means). Said second difference is also called as "advance rate difference" in this disclosure.

As shown in FIG. 2, the rotation angle of the motor 1 detected by the resolver 13 is fed to the RD converting portion 16 as the rotation detection signals Sa, Sb. The RD converting portion 16 outputs an A-phase signal PSa (unit rotation angle information), a B-phase signal PSb (unit rotation angle information), and a Z-phase signal PSz (reference angle information) to the error correcting portion 17 based on the fed rotation detection signals Sa, Sb. Then, as shown in FIG. 3, firstly, the exclusive-OR computing portion 41 (rotation detecting means) of the error correcting portion 17 receives the A-phase signal PSa and the B-phase signal PSb, and generates an actual pulse Pr based thereon. Then, the generated actual pulse Pr and the Z-phase signal PSz are fed to the actual pulse counter 42, and the actual pulse counter 42 computes an actual count value. Kr (actual detected angle information) that indicates an actual detected angle of rotation of the motor 1. Simultaneously, the estimated angle pulse signal generating portion 43 (time estimating means) generates an estimated pulse Pp based on the Z-phase signal PSz. Also, the estimated pulse counter 44 (angle estimating means) computes an estimated count value Kp (estimated angle information), which indicates an estimated angle of rotation, of the motor 1, based on the estimated pulse Pp and the Z-phase signal PSz. Then, the actual count value Kr and the estimated count value Kp, both of which are computed based on the output timing of the Z-phase signal PSz as above, are fed to the difference storing portion 45 (first difference computing means, second difference computing means, adjusting means). The difference storing portion 45 computes learning values dx based on the actual count value Kr and the estimated count value Kp, and stores the learning value in a memory 45a. Then, the correction amount computing portion 46 (output processing means) and the corrected count portion 47 (output processing means) correct the actual count value Kr by using the stored learning values dx in order to compute a corrected count value φ (corrected angle information) that indicates a corrected angle of rotation of the motor 1 and outputs the corrected count value φ.

More specifically, the rotation detecting means (the resolver 13, the RD converting portion 16, the exclusive-OR computing portion 41, the actual pulse counter 42) outputs the Z-phase signal PSz (reference angle information) every time the motor 1 rotates a reference angle, and the rotation detecting means outputs the actual count value Kr (actual detected angle information) every time the motor 1 rotates a constant unit angle that is smaller than the reference angle. The reference angle information PSz indicates rotation of the motor 1 by the reference angle. The reference angle indicates an angle computed by dividing 360 degrees by a positive integer n. The actual detected angle information Kr indicates the actual detected angle of rotation of the motor 1 measured based on output timing (reference timing), at which the reference angle information PSz is outputted. The drive motor control apparatus controls energization of the motor 1 by using the reference angle information PSz and the actual detected angle information Kr. The drive motor control apparatus includes the error correcting portion 17 (correcting means). The correcting means 17 corrects an error of the actual detected angle information Kr in order to output corrected angle information φ that indicates a corrected angle of rotation of the motor 1 measured based on the output timing of the reference angle information PSz. The correcting means 17 is configured to control the energization of the motor 1 based on the corrected angle information φ, wherein the correcting means 17 includes time estimating means 43, angle estimating means 44, first difference computing means 45, second difference computing means 45, adjusting means 45, and output processing means 46, 47.

The estimated angle pulse signal generating portion (time estimating means) 43 measures duration T of one cycle of the Z-phase signal PSz every time the Z-phase signal PSz (reference angle information) is outputted. In the above, the duration T is measured between (a) a previous time, at which the Z-phase signal PSz is previously outputted, and (b) a current time, at which the Z-phase signal PSz is currently outputted. Then, the estimated angle pulse signal generating portion 43 computes an estimated time ΔT, which is required for the motor 1 to rotate the resolution angle (unit angle) in subsequent rotation of the motor 1, based on the duration T.

The estimated pulse counter 44 (angle estimating means) computes an estimated angle of rotation of the motor 1, which is measured based on the output timing of the Z-phase signal PSz, every time the estimated time ΔT, which is estimated by the estimated angle pulse signal generating portion 43 (time estimating means), elapses under the assumption that the motor 1 rotates the resolution angle (unit angle) while the estimated time ΔT elapses. Then, the estimated pulse counter 44 outputs the estimated count value Kp (estimated angle information) that indicates the estimated angle of the rotation of the motor 1.

One of the multiple first differences is computed for each of the multiple representative angles (45 degrees, 90 degrees, 135 degrees, 180 degrees, 225 degrees, 270 degrees, 315 degrees, 360 degrees that is the final value of the actual count value Kr) whenever the actual detected angle of the rotation of the motor 1 indicated by the actual count value Kr (actual detected angle information) becomes a corresponding one of the multiple representative angles during the one cycle of the Z-phase signal PSz (reference angle information). The first difference indicates an advancing amount of the estimated angle indicated by the estimated count value Kp (estimated angle information) relative to the actual detected angle indicated by the actual count value Kr (actual detected angle information).

The multiple second differences of the multiple angular sections are computed based on the multiple first differences of the multiple representative angles of the one cycle computed by the first difference computing means. One of the multiple angular sections is defined between (a) an initial value of the actual detected angle indicated by the actual count value Kr at the output timing of the Z-phase signal PSz (reference angle information) and (b) a minimum representative angle (for example, 45 degrees) of the representative angles. Also, the other one of the multiple angular sections is defined between adjacent representative angles. Each of the multiple second differences indicates an exceeding amount of an increase amount of the estimated angle indicated by the estimated count value Kp (estimated angle information) relative to an increase amount of the actual detected angle indicated by the actual count value Kr (actual detected angle information) within a corresponding angular section that corresponds to the each second difference. Then, each of the second differences of the multiple angular sections is stored in the second difference table (storage part) in association with the corresponding angular section.

The adjusting means adjusts the multiple second differences of the plurality of angular sections of the one cycle, which is stored in the storage part 45a, in accordance with a degree of acceleration and deceleration of the motor 1. The corrected count portion 47 (output processing means) executes an initialization process, an output updating process, and a correcting process. In initialization process, a corrected count value (value of the corrected angle information φ) is set to the initial value or 0 when the Z-phase signal PSz (reference angle information) is outputted. In the output updating process, the corrected count value φ is increased by a certain value, which corresponds to the unit angle, based on the output timing of the Z-phase signal PSz (reference angle information) every time the actual count value Kr (actual detected angle information) is outputted. In the correcting process, the certain value (correction amount) used in the output updating process is changed such that an increase amount of the corrected count value (corrected angle information φ), which is increased while the actual detected angle indicated by the actual detected angle information Kr changes within each of the plurality of angular sections, is increased by a corresponding one of the second differences, which is adjusted by the adjusting means. In other words, the correction amount is changed such that the increase amount of the corrected count value φ, which is increased while the actual detected angle changes within each of the angular sections defined between (a) the initial angle (0 degree) and (b) the minimum representative angle (45 degrees), or between (a) one representative angle and (b) the next representative angle, is increased by the corresponding learning value (adjusted second difference) that corresponds to the angular section.

Hereinafter, firstly, a procedure for computing the learning value dx (x indicates a positive integer) used for correcting the actual count value Kr that indicates the actual, detected angle of the rotation angle of the motor 1 will be described. Subsequently, another procedure for correcting the actual count value Kr by using the learning value dx will be described.

As shown in FIG. 2, the rotation angle detecting portion 35 includes the RD converting portion 16 and the error correcting portion 17. The RD converting portion 16 provides the resolver 13 with the energization signal f(t). Simultaneously, the RD converting portion 16 receives the rotation detection signals Sa, Sb from the resolver 13 and outputs the A-phase signal PSa, the B-phase signal PSb, and the Z-phase signal PSz, which indicate the rotation angle of the motor 1 (more specifically, the rotation angle of the resolver 13), based on the rotation detection signals Sa, Sb.

The RD converting portion 16 is a digital tracking RDC (Resolver Digital Converter), and is not shown. The RD converting portion 16 converts the rotation detection signals Sa, Sb fed from the resolver 13 into digital data (hereinafter referred to as "actual detected data") that indicates the rotation angle of the resolver 13. The method of the above conversion is described in JP3365063, JP3442316 and U.S. Pat. No. 6,278,388, which are incorporated by reference in this embodiment.

Also, the RD converting portion 16 internally has an encoder emulator that converts the above actual detected data into pulse signals (A-phase signal PSa, B-phase signal PSb, Z-phase signal, PSz), which have a format similar to the signals outputted by an incremental encoder. An example of each pulse signal are shown in FIG. 4A to FIG. 4C.

As shown in FIG. 4A to FIG. 4C, each of the A-phase signal PSa (unit rotation angle information) and the B-phase signal PSb (unit rotation angle information) is a pulse 20, signal, and the pulse is made every time the resolver 13 rotates a predetermined angle. The phase of the A-phase signal PSa and the phase of the B-phase signal PSb are different from each other by 90 degrees. The Z-phase signal PSz (reference angle information) is a pulse signal that specifies a starting point (0 degree) of detection of the angle, and the pulse is generated every time the resolver 13 makes one rotation.

It should be noted that the error correcting portion 17 computes an exclusive-OR (XOR) of the A-phase signal PSa and the B-phase signal PSb based on the A-phase signal PSa and the B-phase signal PSb, and the actual pulse Pr (see FIG. 4D) is generated in accordance with the computation result. The number of pulse edges (including leading edges and trailing edges) of the actual pulse Pr, which edges are made during one rotation of the resolver 13, indicates a resolution R of the RD converting portion 16. In other words, the number of pulse edges of the actual pulse Pr during one rotation of the resolver 13 indicates the resolution of the angle detection.

Specifically, the resolution of the RD converting portion 16 of the present embodiment corresponds to, for example, 12 bits (0 through 4095). Thus, when the resolver 13 rotates from 0 degree to 360 degrees to make one rotation, 2048 actual pulses Pr are generated, and thereby the number of the generated pulse edges is 4096.

An interval between (a) timing, at which one edge of the actual pulse Pr is generated, and (b) the other timing, at which the next edge of the actual pulse Pr is generated, is defined as a pulse width. In the above definition, the rotation angle of the resolver 13 equivalent to the above pulse width indicates a minimum angle detectable by the resolver 13. The angle of the actual rotation of the motor 1 that corresponds to the one pulse width is a "unit angle". In the present embodiment, the resolver rotation angle per one pulse width of the actual pulse Pr corresponds to 360/4096 degrees, and the above angle of 360/4096 degrees is referred to as a resolution angle. In other words, the resolution angle is computed by the following equation.

"360 degrees"/"angular ratio of resolver 13"/"Resolution of RD converting portion 16"

In an ideal condition, the rotation detection signals Sa, Sb outputted by the resolver 13 have mutually equal amplitudes, also are not offset from each other, and are difference from each other in phase by 90 degrees. However, in reality, due to various causes, such as manufacturing variation, the rotation detection signals Sa, Sb from the resolver 13 are different from the above ideal signals, and thereby have errors caused by, for example, the manufacturing variation. Thus, the actual detected data internally made by the RD converting portion 16 may include errors, and thereby the A-phase signal PSa and the B-phase signal PSb made based on the erroneous signals Sa, Sb may result in erroneous signals.

In the present embodiment, the rotation angle detecting portion 35 internally has the error correcting portion 17 that is configured to correct the detection result made by the RD converting portion 16. The error correcting portion 17 receives each of the A-phase, B-phase, and Z-phase signals from the RD converting portion 16, and generates angle data φ based on the received phase signals. Thus, the angle data φ has limited error (or no error) that is caused by the manufacturing variation of the resolver 13. Then, the angle data φ generated by the error correcting portion 17 is fed to the microcomputer 37.

More specifically, as shown in FIG. 3, the error correcting portion 17 includes the exclusive-OR computing portion 41, the actual pulse counter 42, the estimated angle pulse signal generating portion 43, the estimated pulse counter 44, the difference storing portion 45, the correction amount computing portion 46, and the corrected count portion 47.

The exclusive-OR computing portion 41 computes the exclusive-OR of the A-phase signal PSa and the B-phase signal PSb, and generates the actual pulse Pr (see FIG. 4D) in accordance with the computation result.

The actual pulse counter 42 receives the actual pulse Pr generated by the exclusive-OR computing portion 41, and counts the actual pulse Pr. More specifically, the actual pulse counter 42 detects the leading edges and the trailing edges of the actual pulse Pr, and increments a count value every time the edge is detected. Then, the actual pulse counter 42 outputs the count value as the actual count value Kr.

The actual pulse counter 42 also receives the Z-phase signal PSz in addition to the above actual pulse Pr. The actual pulse counter 42 is configured to reset the actual count value Kr to 0 at timing of the leading edge of the Z-phase signal PSz (or when the Z-phase signal PSz rises). In other words, the actual pulse counter 42 counts the actual pulse Pr based on the pulse edge rising timing of the Z-phase signal PSz. Thus, the actual count value Kr becomes 0 at the pulse edge rising timing of the Z-phase signal PSz.

FIG. 4E shows an example of the actual count value Kr relative to the actual pulse Pr. As shown in FIG. 4E, the actual count value Kr is reset to 0 at the pulse edge rising timing of the Z-phase signal PSz, and subsequently, the actual count value Kr is incremented every time the edges of the actual pulse Pr is generated. In the present embodiment, the resolution of the RD converting portion 16 corresponds to 12 bits, and thereby the actual count value Kr indicates a value from 0 through 4095 while the resolver 13 rotates from 0 degrees to 360 degrees to make one rotation.

The estimated angle pulse signal generating portion 43 estimates a time required for the rotation by a resolution angle (unit angle) based on a pulse interval T of the Z-phase signal PSz and the resolution R of the RD converting portion 16 at the pulse edge rising timing of the Z-phase signal PSz. Then, the estimated angle pulse signal generating portion 43 generates the estimated pulse Pp having a pulse width equivalent to the above estimated time. The above estimated pulse Pp represents a pulse that is estimated to be made in the subsequent rotation of the motor 1. In other words, the estimated angle pulse signal generating portion (time estimating means) 43 measures duration T of one cycle of the Z-phase signal PSz every time the Z-phase signal PSz (reference angle information) is outputted. In the above, the duration T is measured between (a) a previous time, at which the Z-phase signal PSz is previously outputted, and (b) a current time, at which the Z-phase signal PSz is currently outputted. In the above, the previous time immediately precedes the current time. Then, the estimated angle pulse signal generating portion 43 computes an estimated time ΔT, which is required for the motor 1 to rotate the resolution angle (unit angle) in subsequent rotation of the motor 1, based on the duration T.

Specifically, at every pulse edge rising timing of the Z-phase signal PSz, the pulse interval of the preceding Z-phase signal PSz is measured. In other words, at every pulse edge rising timing of the Z-phase signal PSz, the pulse interval between (a), the previous pulse edge rising timing and (b) the current pulse edge rising timing is measured. The pulse interval corresponds to an actual one cycle duration that the resolver 13 has just required to make the preceding one rotation. Then, the measured one cycle duration is divided by the resolution (4096 in the present embodiment) of the resolver 13 to provide time that corresponds to the unit resolution of the resolver 13. In other words, by dividing the measured one cycle duration by the resolution of the resolver 13, it is possible to obtain time required for the motor 1 to make the rotation of the unit angle. Then, the estimated pulse Pp having the pulse width (estimated pulse width) equivalent to the time (estimated time) of the unit resolution is generated.

Figure 5A:
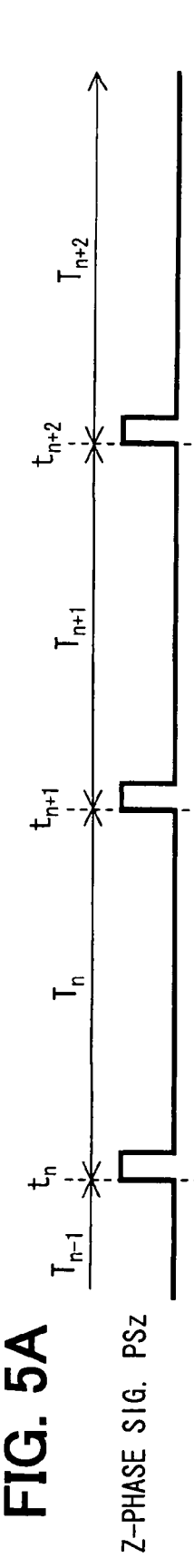
FIG. 5A is an explanatory diagram illustrating a Z-phase signal outputted by an RD converting portion.
Figure 5B:
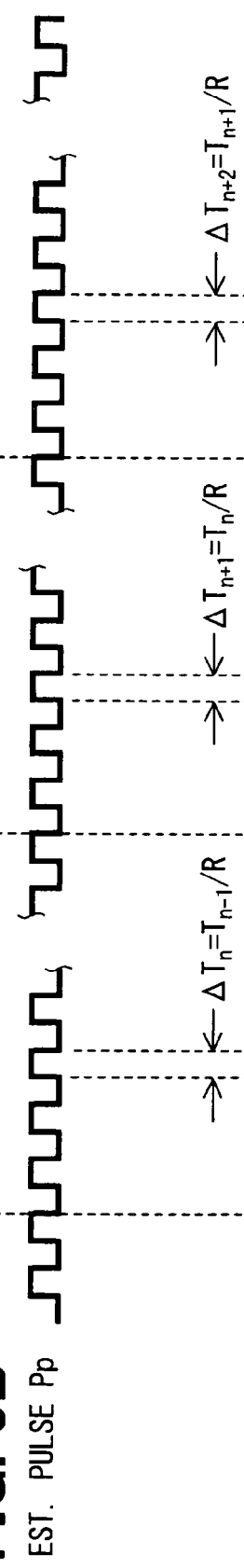
FIG. 5B is an explanatory diagram illustrating an estimated pulse Pp generated by the error correcting portion based on the Z-phase signal.

The above computation of the estimated pulse Pp will be detailed with reference to FIGS. 5A and 5B. FIG. 5A illustrates the Z-phase signal PSz, and FIG. 5B illustrates the estimated pulse Pp. In FIGS. 5A and 5B, for example, when the pulse of the Z-phase signal PSz is inputted at time $t_n$, the preceding one cycle duration $T_{n-1}$ of the resolver 13 is measured. Then, the one cycle duration $T_{n-1}$ is divided by the resolution R to obtain an estimated pulse width $\Delta T_n$. Thus, during a period between (a) time $t_n$ and (b) time $t_{n+1}$, at which the next pulse of the Z-phase signal PSz is inputted, the estimated pulse Pp having the pulse width equivalent to the above estimated pulse width $\Delta T_n$ is generated. In other words, during the period between (a) time $t_n$ and (b) time $t_{n+1}$, the estimated pulse Pp is generated such that the pulse edge is generated every time the time equivalent to the estimated pulse width $\Delta T_n$ elapses.

Subsequently, when the pulse of the Z-phase signal PSz is inputted again at time $T_{n+1}$, the preceding one cycle duration $T_n$ of the resolver 13 is measured similarly to the case of time $t_n$. Then, the one cycle duration $T_n$ is divided by the resolution R to obtain the estimated pulse width $\Delta T_{n+1}$. Thus, during a following period between (a) time $t_{n+1}$ and (b) time $T_{n+2}$, at which the next pulse of the Z-phase signal PSz is inputted, the estimated pulse Pp having the pulse width of the above estimated pulse width $\Delta T_{n+1}$ is generated. Thus, the same is true for the case of time $t_{n+2}$.

The division method to obtain the estimated pulse width ΔT may employ, for example, a known shift operation. Specifically, there may be employed a counter that increases by a predetermined cycle shorter than the one cycle duration T in order, to measure the one cycle duration T of the resolver 13 (the pulse interval T of the Z-phase signal PSz). Thus, the counter is capable of obtaining a count value Ctr required for the one cycle duration T. Then, the count value Ctr is right-shifted by the right shift value (12 bits in the present embodiment) corresponding to the resolution R to obtain the estimated pulse width ΔT as a result of the division operation.

However, the division result obtained through the above simple shift operation may not be sufficiently accurate, and thereby the estimated pulse width ΔT may have a lower accuracy in some cases.

Thus, in addition to the shift operation basically executed in the present embodiment, the element of 12 bits, which would be otherwise neglected in the right shift operation, is further considered to generate the estimated pulse Pp with high accuracy. The specific method for generating the estimated pulse Pp will be explained with reference to FIGS. 6A to 6E.

In order to obtain the estimated pulse width ΔT, one cycle duration T of the resolver 13 needs to be measured. In the present embodiment, the measurement of the one cycle duration T is executed by using the counter that uses a basic pulse having, for example, a frequency of 40 MHz (or 25 nsec cycle time) for counting the duration T of the one cycle. Then, as one example, the measurement result is shown as a 15-digit count value in FIG. 6A. The count value is "28250" in a decimal format. In other words, 28250 basic pulses are counted during one rotation of the resolver 13.

Then, the estimated pulse width $\Delta T$ is computed based on the count value. Specifically, the count value "28250" is divided by "4096" in consideration of the resolution of the RD converting portion 16 for 12 bits. More specifically, in the shift operation, the 15-digit count value in FIG. 6A is right shifted by 12 bits as shown in FIG. 6B. As a result, division result of "6" is obtained. The above results indicate that the estimated pulse width $\Delta T$ corresponds to time equivalent to six basic pulses.

However, the division result of "6" obtained through the above shift operation is not an accurate value because the computation result of "6" neglects the element of digits right of the decimal point during the right shift operation, and thereby deteriorating the accuracy. This is apparent from the division result of "6.896973 . . . " obtained by dividing 28250 by 4096. Thus, the division result is actually close to 7 rather than 6.

As a result, every time the estimated pulse Pp, which has the estimated pulse width $\Delta T$ of the time equivalent to six basic pulses, is generated, the neglected digits right of the decimal point (0.896973 . . . ) is accumulated to make an error. Thus, even when the count value of the estimated pulse Pp (the estimated count value Kp) becomes 4095, the resolver 13 might have not yet made one rotation even in the constant-speed rotation.

In the present embodiment, the estimated pulse Pp is more accurately generated under the sufficient consideration of the digits right of the decimal point without neglecting the digits.

As above, the right division result is not "6" but "6.896973 . . . ". Thus, if possible, a time equivalent to 6.896973 . . . times of the basic pulses should be used for the estimated pulse width $\Delta T$. However, it is impossible to output the estimated pulse Pp every time the 6.896973 . . . basic pulses are outputted.

In the present embodiment, (a) an estimated pulse Pp6 having an estimated pulse width $\Delta T$ equivalent to six basic pulses and (b) an estimated pulse Pp7 having an estimated pulse width $\Delta T$ equivalent to seven basic pulses are appropriately and selectively outputted. In other words, the digits positioned on the right of the decimal point of the division result are considered, and thereby the estimated pulse Pp7 is outputted more often than the estimated pulse Pp6 is in total. As a result, the estimated pulse Pp having the estimated pulse width $\Delta T$ equivalent to 6.896973 . . . number of the basic pulses is apparently kept outputted during one rotation of the resolver 13.

In order to achieve the above, firstly, the total number of the estimated pulses Pp7 and the total number of the estimated pulse Pp6 to be outputted during one rotation are computed. Because the total number of the estimated pulses Pp to be outputted during one rotation is 4096, the sum of the number of the estimated pulses Pp7 and the number of the estimated pulses Pp6 needs to coincide with 4096. Firstly, as shown in FIG. 6C, the number "3674" indicated by 12 bits right of the decimal point of the division result is set in, a register (reg) 1 as the number of outputting the estimated pulses Pp7. Then, each bit of 12 bits is reversed and 1 is added thereto to obtain the number "422" (=4096−3674). Thus, the number "422" is set in a register (reg) 2 as the number of outputting the estimated pulses Pp6.

In the above, for example, when the estimated pulses Pp7 are exclusively and continuously outputted by 3674 times, and the estimated pulses Pp6 are exclusively and continuously outputted by 422 times, it is possible to output the estimated pulses Pp in one rotation by the desired number of times. However, in the above output method, the error is gradually accumulated while the estimated pulses Pp7 are kept outputted, and in contrast, the error is gradually reduced after the estimated pulses Pp6 starts outputted subsequently. Thus, the error may become substantially large temporarily.

In other words, the operation result will not be reliable enough when the ratio of the total number of outputting the estimated pulses Pp7 to the total number of the estimated pulses Pp6 merely coincides with 3674:422. In order to suppress the generation of the error over a period of one cycle, it is required to appropriately balance the distribution of the estimated pulses Pp7 and the estimated pulses Pp6. For example, a short sequence of outputting the estimated pulses Pp7 J times and outputting the estimated pulses Pp6 K times may be repeated several times within the one cycle.

Firstly, the basic output ratio of outputting the estimated pulse Pp7 relative to the single output of the estimated pulse Pp6 is determined. Specifically, as shown in FIG. 6C, the basic output ratio is determined based on the number of the digits to the first "1" counted from Most Significant Bit (MSB) or the left most of reg2. In the example of FIG. 6C, the fourth bit from the MSB of reg2 indicates the first "1". Thus, four digits from the MSB are used for the computation of the basic output ratio of the estimated pulses Pp7, Pp6. In the present example, the estimated, pulses Pp7 are outputted 14 times per single output of the estimated pulse Pp6.

Thus, when the basic output ratio is obtained, each of the estimated pulses Pp7, Pp6 is outputted based on the above output ratio. In other words, firstly, the estimated pulse Pp7 is outputted 14 times straight, and subsequently, the estimated pulse Pp6 is outputted once. Then, the estimated pulse Pp7 is again outputted 14 times straight, and subsequently, the estimated pulse Pp6 is again outputted once. Thus, the same is repeated.

However, because the basic output ratio (14:1) is computed based on 4-bit precision, the basic output ratio may be slightly rough. Thus, the precision of the output ratio may be further improved. For example, as shown in FIG. 6D, when the output ratio is determined based on 6-bit precision, the output ratio becomes 57:6. When the output ratio is further precisely computed based on 7-bit precision as shown in FIG. 6E, the output ratio becomes 114:13.

In a case, where the estimated pulses Pp7, Pp6 are outputted by the output ratio of 14:1, which is made based on 4-bit precision, for example, when the estimated pulse Pp7 has been outputted 57 times, the estimated pulse Pp6 has been outputted only 4 times, which is smaller than the number of times "6" in the case with 6-bit precision (FIG. 6D). Thus, this means that the error has occurred.

If the estimated pulses Pp7, Pp6 are kept outputted by the output ratio of 14:1', for example, when the estimated pulse Pp7 has been outputted 112 times, the estimated pulse Pp6 has only been outputted 8 times, which is certainly smaller than the number of times "13" in the case with 7-bit precision (FIG. 6E), resulting in the larger error.

Thus, the basic output ratio (14:1) should not be kept the same during the operation. After outputting the estimated pulses Pp7, Pp6 to some extent, the output ratio needs to be changed. More specifically, when a current output ratio of actually outputted pulses is different from the output ratio with higher precision, the estimated pulses Pp7, Pp6 are outputted such that the current output ratio coincides with the output ratio with the higher precision.

In other words, for example, as shown above, if the estimated pulse Pp6 has been outputted only 4 times when the estimated pulse Pp7 has been outputted 57 times, the output of the estimated pulse Pp7 is temporarily stopped, and the estimated pulse Pp6 is outputted in series until the total number of times of outputting the estimated pulse Pp6 becomes 6, which is the required number in the case with the 6-bit precision. Thus, the ratio of (a) the number of times of outputting of the estimated pulse Pp7 to (b) the number of times of outputting the estimated pulse Pp6 becomes 57:6, which coincides with the output ratio with the 6-bit precision. Then, the estimated pulses Pp7, Pp6 are again outputted based on the basic output ratio of 14:1.

Then, the current output ratio will be next compared with the output ratio (114:13) with 7-bit precision. Thus, the estimated pulses Pp7, Pp6 remain outputted based on the basic output ratio until the number of times of either one of the estimated pulses Pp7, Pp6 becomes the required output number indicated by the output ratio. In other words, the estimated pulses Pp7, Pp6 remain outputted based on the basic output ratio until the estimated pulse Pp7 has been outputted 114 times, or the estimated pulse Pp6 has been outputted 13 times, which ever comes first.

In the present example, the estimated pulse Pp7 has been outputted 114 times before the estimated pulse Pp6 has been outputted 13 times. More specifically, when the estimated pulse Pp7 has become outputted 114 times, the estimated pulse Pp6 has been outputted 10 times. Thus, the current output ratio does not coincide with the output ratio with 7-bit precision. Thus, the output of the estimated pulse Pp7 is temporarily stopped, and the estimated pulse Pp6 is outputted in series until the number of times of the estimated pulse Pp6 is incremented up to 13 times. Thus, the estimated pulse Pp7 has been outputted 114 times, and the estimated pulse Pp6 has been outputted 13 times, which makes the output ratio with 7-bit precision. Then, the estimated pulses Pp7, Pp6 are outputted again based on the basic output ratio of 14:1.

It should be noted that the precision of the output ratio may be improved to any extent. For example, the output ratio may have 7-bit precision as shown in FIGS. 6A to 6E, or have higher precision.

In FIG. 3, the estimated pulse counter 44 receives the estimated pulses Pp generated by the estimated angle pulse signal generating portion 43, and counts the number of the estimated pulses Pp. More specifically, the estimated pulse counter 44 detects the leading edges and the trailing edges of the estimated pulse Pp and increments the count value upon the detection of the edge. Then, the estimated pulse counter 44 outputs the count value as the estimated count value Kp.

In other, words, the estimated pulse counter 44 (angle estimating means) computes an estimated angle of rotation of the motor 1, which is measured based on the output timing of the Z-phase signal PSz, every time the estimated time ΔT, which is estimated by the estimated angle pulse signal generating portion 43 (time estimating means), elapses under the assumption that the motor 1 rotates the resolution angle (unit angle) while the estimated time ΔT elapses. Then, the estimated pulse counter 44 outputs the estimated angle of the rotation of the motor 1 as the estimated count value Kp (estimated angle information).

The estimated pulse counter 44 receives the Z-phase signal PSz in addition to the estimated pulse Pp, and the estimated pulse counter 44 is configured to reset the estimated count value Kp to 0 at the timing of the rise (leading edge) of the pulse of the Z-phase signal PSz. In other words, the estimated pulse counter 44 counts the number of the estimated pulses Pp that begins from zero every time the pulse edge rising timing of the Z-phase signal PSz is generated. Thus, the estimated pulse counter 44 counts the estimated pulses Pp based on the output timing of the Z-phase signal PSz.

Figure 5C:
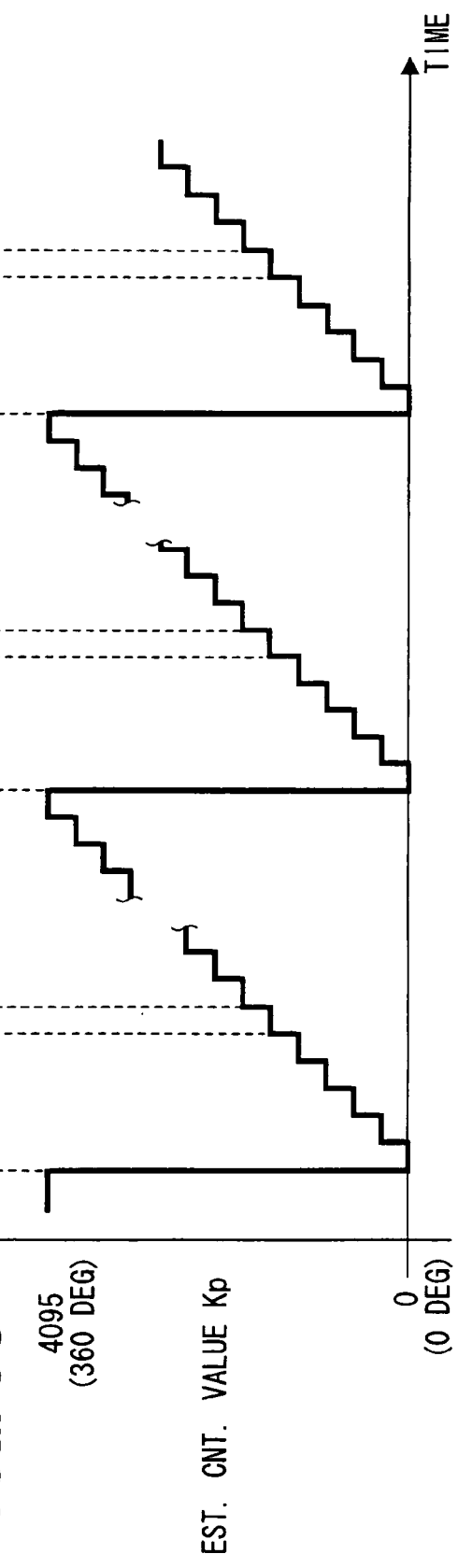
FIG. 5C is an explanatory diagram illustrating a count value (estimated count value Kp)

FIG. 5C shows an output example of the estimated count value Kp based on the estimated pulse Pp. As shown in FIG. 5C, the estimated count value Kp is reset to 0 at the pulse edge rising timing of the Z-phase signal PSz, and subsequently, the estimated count value Kp is incremented at every edge timing of the estimated pulse Pp. In the present embodiment, because the resolution of the RD converting portion 16 is 12 bits, the estimated count value Kp indicates a value in a range from 0 through 4095 during one rotation, in which the resolver 13 rotates from 0 degrees to 360 degrees, if the rotational speed of the motor 1 is constant.

The actual count value Kr (actual detected angle information) indicates an actual detected angle generated based on each phase signal fed by the resolver 13. In contrast, the estimated count value Kp (estimated angle information) indicates the estimated angle that is estimated under the assumption that the resolver 13 rotates the resolution angle every time the estimated pulse width ΔT elapses. In the above, the estimated pulse width ΔT is determined based on the duration T of the preceding one cycle of the resolver 13.

Next, the difference storing portion 45 will be described.

Figure 7:
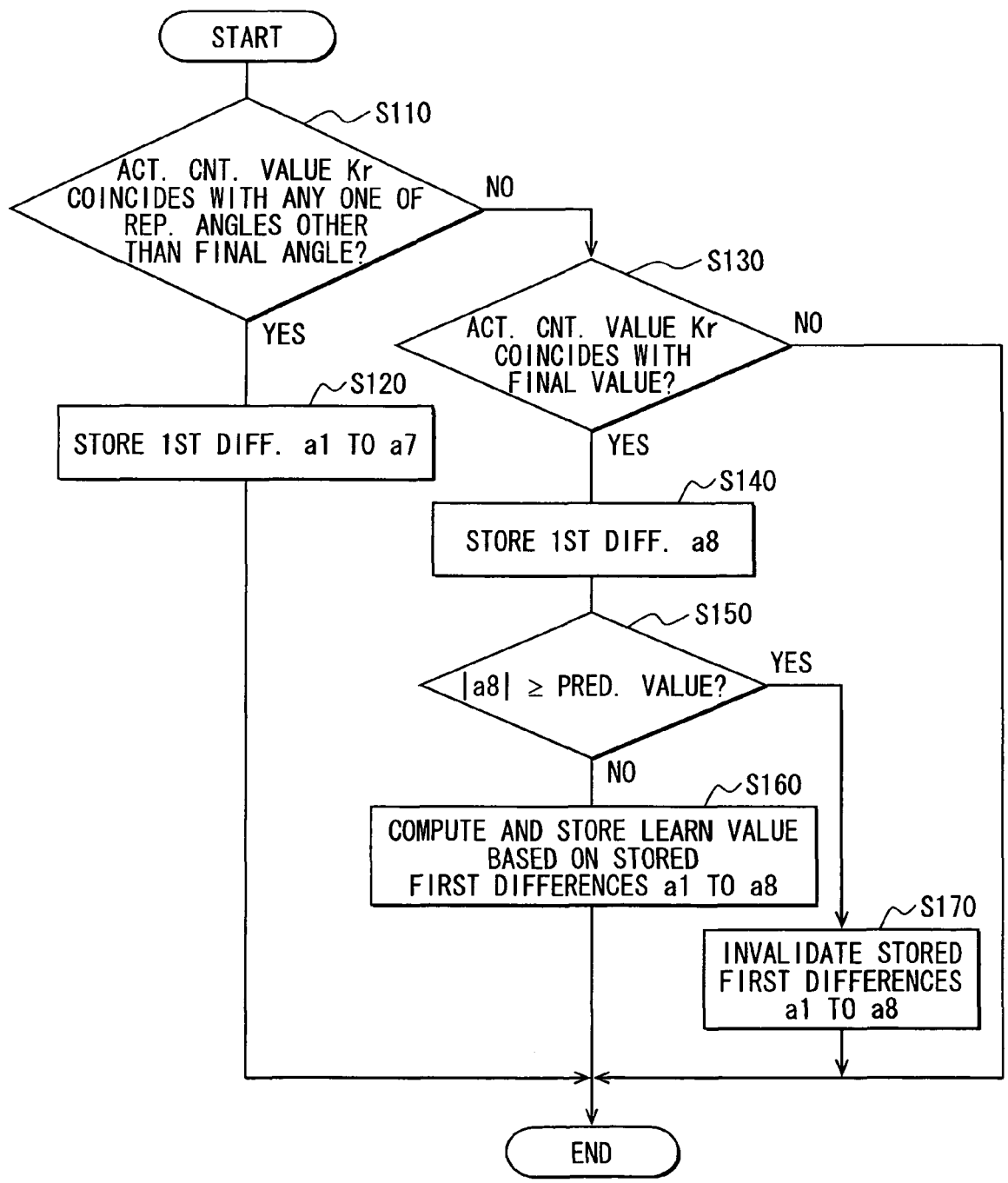
FIG. 7 is a flow chart illustrating a learning process executed by a difference storing portion.

The difference storing portion 45 executes a learning process shown in FIG. 7 every time the actual count value Kr is incremented. In other words, the difference storing portion 45 executes the learning process at every edge timing of the actual pulse Pr.

When the learning process in FIG. 7 is started, the difference storing portion 45 determines at S110 whether a current actual count value Kr coincides with any one of predetermined multiple representative angles, which one is other than the final angle.

In the present embodiment, as shown in the first line in the table of FIG. 8A, the representative angles include eight angles separated by 45 degrees each other. More specifically, the representative angles include 45 degrees, 90 degrees, 135 degrees, 180 degrees, 225 degrees, 270 degrees, 315 degrees, and 360 degrees. In the present embodiment, 360 degrees corresponds to the final angle. It is determined at S110 whether the actual count value Kr corresponds to any one of the representative angles other than the final angle. In other words, it is determined at S110 whether the actual detected angle coincides with any one of 45 degrees, 90 degrees, 135 degrees, 180 degrees, 225 degrees, 270 degrees, and 315 degrees. In the present embodiment, 360 degrees serving as the final angle indicates an angle that is not exactly 360 degrees, but an angle corresponding to the final value (4095) of the actual count value Kr, which precedes the initial value (0) of the actual count value Kr.

At S110, when it is determined that the actual count value Kr corresponds to any one of the representative angles other than 360 degrees, control proceeds to S120.

At S120, a first difference is computed at the representative angle by subtracting the actual count value Kr from the estimated count value Kp. Then, the first difference is stored in the memory 45a (storage part) of the difference storing portion 45 in association with the corresponding representative angle such that the first difference associated with the corresponding representative angle is distinguishable. Then, subsequently, the learning process is ended. Note that, the first difference indicates the advancing amount of the estimated angle indicated by the estimated count value Kp relative to the actual detected angle indicated by the actual count value Kr.

More specifically, the first and second lines in the table of FIG. 8A corresponds, to a first difference storage table of the memory 45a, in which table the eight first differences a1 to a8 are stored in association with the respective representative angles within one cycle (one rotation period) of the resolver 13. The eight first differences a1 to a8 may be referred to as the first differences in one cycle. Then, at S120, the computed first difference is stored in the corresponding one of the storage regions for storing the first differences in the first difference storage table (or the second line in the table in FIG. 8A) based on the representative angle indicated by the current actual detected angle.

When it is determined at S110 that the actual count value Kr does not corresponds to any one of the representative angles other than 360 degrees, control proceeds to S130, where it is determined whether the actual count value Kr coincides with the final value or 4095. In other words, it is determined at S130 whether the actual detected angle is 360 degrees.

When it is determined that the actual count value Kr is not 4095, the learning process is ended. When it is determined that the actual count value Kr is 4095, control proceeds to S140.

At S140, similarly to S120, the current first difference is computed by subtracting the current actual count value Kr from the current estimated count value Kp, and the computed first difference is stored in the corresponding one of the storage regions in the first difference storage table based on the representative angle (or 360 degrees) indicated by the current actual detected angle. Note that the first difference may be positive and negative.

Thus, the first differences a1 to a8 for the latest one cycle have been stored in the first difference storage table at the end of every one cycle, during which the actual count value Kr changes from 0 to 4095 (or every one cycle of the resolver 13). In other words, at S110 to S140, during the one cycle of the Z-phase signal PSz (reference angle information), one of the multiple first differences is computed for each of the multiple representative angles (45 degrees, 90 degrees, 135 degrees, 180 degrees, 225 degrees, 270 degrees, 315 degrees, 360 degrees that is the final value of the actual count value Kr) every time the actual detected angle of the rotation of the motor 1 indicated by the actual count value Kr (actual detected angle information) becomes a corresponding one of the multiple representative angles. The first difference indicates an advancing amount of the estimated angle indicated by the estimated count value Kp (estimated angle information) relative to the actual detected angle indicated by the actual count value Kr (actual detected angle information).

Then, control proceeds to S150, where it is determined whether an absolute value of the first difference a8 currently computed at 360 degrees at S140 is equal to or greater than a predetermined value. When it is determined that the absolute value of the first difference a8 is not equal to or greater than the predetermined, value, control proceeds to S160. In the present embodiment, the predetermined value used in the determination at S150 is, for example, a value equivalent to 10 degrees, and may be computed by the following equation.

predetermined value=4096×10/360

At S160, a learning value used for correcting the actual count value Kr to obtain the angle data ϕ is obtained based on the first differences a1 to a8 stored in the first difference storage table during the current one cycle. Then, the obtained learning value is stored in the memory 45a.

Specifically, the learning value is obtained by the following procedures (1) to (3).

Procedure (1): The third line in the table of FIG. 8A corresponds to a second difference storage table of the memory 45a, in which eight second differences b1 to b8 are stored in the corresponding one of eight angular sections between 0 degree (initial angle) to 360 degrees (final angle) of the actual detected angle. More specifically, each of the second differences b1 to b8 indicates an increase amount of the estimated angle relative to the actual detected angle within the respective angular section. Also, the above eight angular sections include (a) an angular section defined between 0 degree and 45 degrees (minimum representative angle among the representative angles) and (b) angular sections defined by adjacent representative angles.

Then, at S160, the first difference a1, which is one of the first differences a1 to a8, is stored in the second difference storage table to serve as the second difference b1 for the angular section between 0 degree and 45 degrees.

Furthermore, the second difference for each target angular section defined by adjacent representative angles is computed as follows. For example, the first difference of the representative angle, which defines the start of the target angular section, is subtracted from the other first difference of the other representative angle, which defines the end of the target angular section, to compute the second difference for the target angular section. Then, the computed second difference is stored in the second difference storage table.

For example, the second difference b2 for the angular section between 45 degrees and 90 degrees is computed by subtracting the first difference a1 at 45 degrees from the first difference a2 at 90 degrees (see FIG. 8A). Thus, the second difference b2 is computed by the following equation.

$$b2=a2-a1$$

The above is explained in a different way. In an explanation example, the actual count value Kr that corresponds to 45 degrees indicates K0, and the actual count value Kr that corresponds to 90 degrees indicates Kr2. When the actual count value Kr is Kr1 (or when the actual detected angle is 45 degrees), the estimated count value Kp is Kp1. When the actual count value Kr is Kr2 (or when the actual detected angle is 90 degrees), the estimated count value Kp is Kp2. In the above example definition, the following equations are satisfied.

$$a1=Kp1-Kr1$$

$$a2=Kp2-Kr2$$

$$b2=a2-a1=(Kp2-Kr2)-(Kp1-Kr1)=(Kp2-Kp1)-(Kr2-Kr1)$$

As a result, it is apparently known that the second difference b2 indicates the exceeding of an increase amount (Kp2−Kp1) of the estimated angle relative to an increase amount (Kr2−Kr1) of the actual detected angle within the angular section defined between 45 degrees and 90 degrees.

Similarly, for example, the second difference b8 of the angular section between 315 degrees and 360 degrees is computed by subtracting the first difference a7 at 315 degrees from the first difference a8 at 360 degrees as shown by the following equation.

$$b8=a8-a7$$

In other words, in the procedure (1) executed at S160 of FIG. 7, the multiple second differences of the multiple angular sections are computed based on the multiple first differences of the multiple representative angles of the one cycle computed in the procedure (first difference computing means) at S110 to S140 in FIG. 7. One of the multiple angular sections is defined between (a) an initial value of the actual detected angle indicated by the actual count value Kr at the output timing of the Z-phase signal PSz (reference angle information) and (b) 45 degrees (minimum representative angle) of the representative angles. Also, the other one of the multiple angular sections is defined between adjacent representative angles. Each of the multiple second differences indicates an exceeding amount of an increase amount of the estimated angle indicated by the estimated count value Kp (estimated angle information) relative to an increase amount of the actual detected angle indicated by the actual count value Kr (actual detected angle information) within a corresponding angular section that corresponds to the each second difference. Then, each of the second differences of the multiple angular sections is stored in the second difference table (storage part) in association with the corresponding angular section.

Procedure (2): Subsequently, there will be described a method, in which the second differences of each of the multiple angular sections for the one cycle stored the procedure (1) (second difference computing means) in the second difference storage table (storage part) is adjusted in accordance with a degree of acceleration and deceleration of the motor 1. At S160, the second differences b1 to b8 stored in the second difference storage table during the procedure (1) are adjusted by adjustment values in order to obtain the learning value. More specifically, the adjustment values are determined based on the first difference a8 by using a distribution rule (map) shown in FIG. 9. As described above, the first difference a8 is stored in the first difference storage table and corresponds to 360 degrees that serves as the final angle.

As shown in FIG. 9, the distribution rule defines the adjustment values c1 to c8 such that the first difference a8 for the angular section of the final angle is uniformly distributed as the adjustment values c1 to c8 for the second differences b1 to b8 of each angular section. Also, the distribution rule defines the adjustment values c1 to c8 based on the value of the first difference a8. Note that, values enclosed by brackets "(" and ")" in the table (distribution rule) in FIG. 9 indicate the values for the case, where the first difference a8 corresponds to a negative value. Each enclosed value is made by merely converting a positive value of the first difference a8 to an equivalently negative value.

For example, when a8 equal to +8, the value (+8) is uniformly distributed into eight angular sections, and thereby each divided value (+1) serves as, each of the adjustment values c1 to c8 for the second differences b1 to b8. In other words, if the value of the first difference a8 is an integral multiple of 8, the quotient made by dividing the value of the first difference a8 by 8 serves as each of the adjustment values c1 to c8.

For example, when the value of the first difference a8 corresponds to any one of +1 to +7, it is impossible to obtain an integer by dividing the value of the first difference a8 by the number of the angular sections (8). As a result, each of the values (+1) of the first difference a8 is dispersedly and uniformly distributed in the angular sections to make appropriate adjustment values as shown in FIG. 9.

For example, when the value of the first difference a8 is +9, each adjustment value cx (x represents an integer from 1 to 8) is made by adding the adjustment value cx for the case of "a8=+8" to the adjustment value cx for the case of "a8=+1". Also, although not shown in FIG. 9, for example, when the value of the first difference a8 is +17, each adjustment value cx is made by adding the adjustment value cx (+2 for any x) for the case of "a8=+16" to the adjustment value cx for the case of "a8=+1". In other words, when the first difference a8 indicates "8×h+i" (h is an integer, i is any integer from 1 to 7), each adjustment value cx is made by adding h to each adjustment value cx for the case of "a8=i".

The fourth line of the table in FIG. 8A corresponds to an adjustment value storage table in the memory 45a, in which table the adjustment values c1 to c8 for the second differences b1 to b8 of the respective angular sections are stored. More specifically, the adjustment values c1 to c8 determined based on the first difference a8 by using the distribution rule in FIG. 9 are stored in the adjustment value storage table.

(3) Furthermore, at S160, the learning value dx for each angular section is computed by subtracting the adjustment value cx, which is stored in the adjustment value storage table through the procedure (2), from the second difference bx (x is an integer from 1 to 8), which is stored in the second difference storage table through the procedure (1), as shown by the following equation.

$$dx = bx - cx$$

Then, the computed the learning values d1 to d8 for each angular section is stored in a learning value storage table in the memory 45a as shown in the fifth line of the table in FIG. 8A.

Thus, for example, when the first differences a1 to a8 indicate the values shown in the second line in the table of FIG. 8B, the second differences b1 to b8 for the respective angular sections are calculated through the procedure (1) to be the values shown in the third line in the table of FIG. 8B. Also, the adjustment values c1 to c8 for adjusting the second differences b1 to b8 are computed to be values shown in the fourth line in the table of FIG. 8B though the procedure (2). Because a8 is +2, the adjustment values c3, c6 are calculated to be +1 and the other adjustment values c1, c2, c4, c5, c7, c8 are calculated to be 0 based on the third line in the map of FIG. 9. Furthermore, through the procedure (3), the learning values d1 to d8 for the respective angular sections are calculated to be the values shown in the fifth line in the table of FIG. 8B.

When the above process at S160 is completed, the learning process is ended.

In the above, the learning values d1 to d8 for the respective angular sections stored at S160 indicate the amount of shortage of the actual detected angle relative to the estimated angle for each angular section. In other words, the learning values d1 to d8 indicate an amount, by which the actual detected angle is smaller than the estimated angle that is estimated in the consideration of the rotational speed change of the motor 1. Thereby, in the above, the estimated angle indicates more reliable angle than the actual detected angle, and has a smaller difference from the true angle.

The above is described below. Firstly, as above, the second differences b1 to b8 indicate the exceeding amount of the increase amount of the estimated angle relative to the increase amount of the actual detected angle in each angular section. If the exceeding amount is positive, the increase amount of the estimated angle is greater than the increase amount of the actual detected angle. If the exceeding amount is negative, the increase amount of the estimated angle is less, than the increase amount of the actual detected angle. In other words, the second differences b1 to b8 indicate the amount, by which the actual detected angle is smaller than the estimated angle, which is assumed to be more reliable, in each angular section. For example, if the shortage amount is positive, the actual detected angle is smaller than the estimated angle. In contrast, if the shortage amount is negative, the actual detected angle is greater than the estimated angle. As above, the second difference may be positive and negative.

However, because the estimated angle is currently estimated based on the duration measured in the preceding one cycle, the estimated angle may have an error (estimation error) from the true angle due to the rotational speed change of the motor 1 between the previous cycle and the current cycle.

Figure 10A:
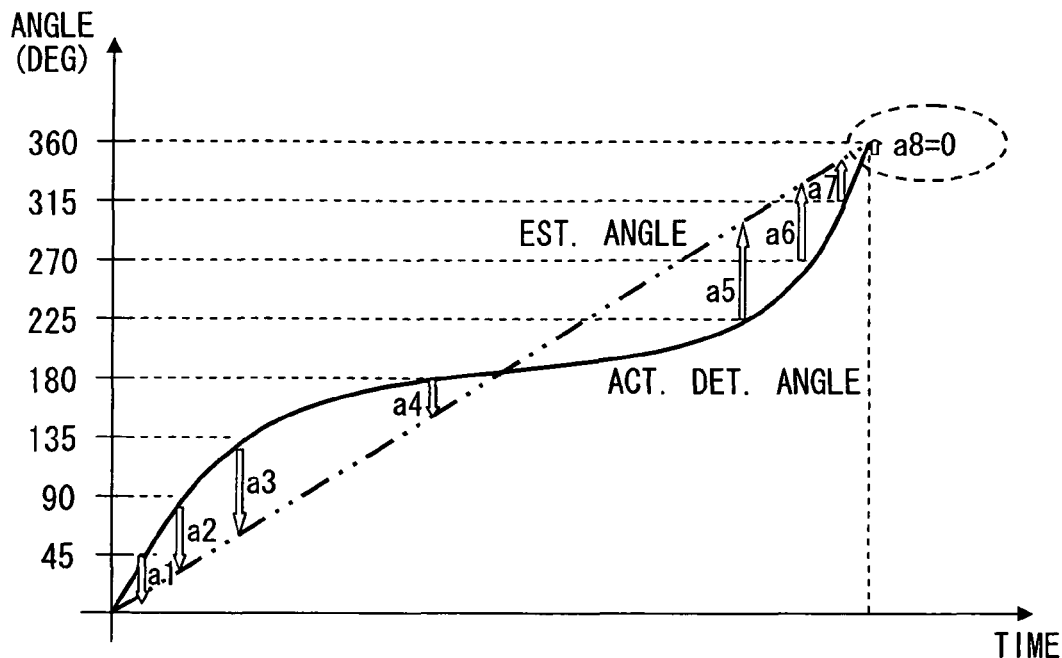
FIG. 10A is an explanatory diagram illustrating a state, where a rotational speed of a motor is constant, resulting in that an estimated angle is appropriate.
Figure 10B:
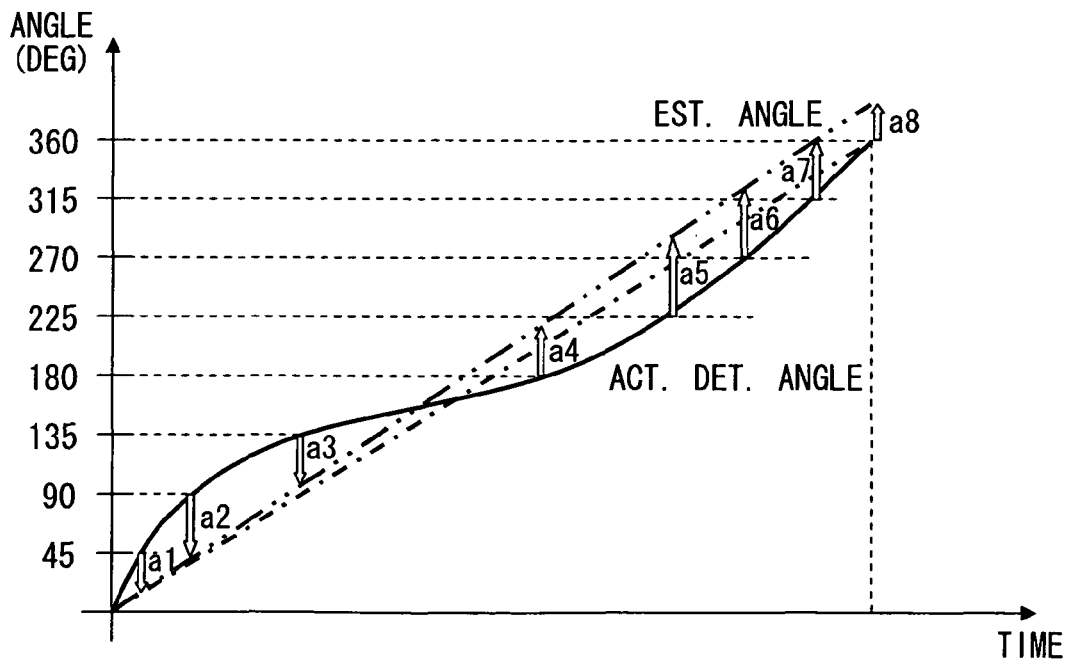
FIG. 10B is an explanatory diagram illustrating a state, where the rotational speed of the motor varies, resulting in that the estimated angle is inappropriate.

More specifically, as shown in FIG. 10A, if the rotational speed of the motor 1 is constant, the estimated angle (dashed and double-dotted line in FIG. 10A) provided by the estimated count value Kp is expected to be appropriate, and thereby the first difference a8 at 360 degrees is 0. However, if the rotational speed of the motor 1 changes, the duration of the preceding one cycle becomes different from the duration of the current one cycle. As a result, as shown in FIG. 10B, the estimated angle (dashed and single-dotted line in FIG. 10B) may deviate from the true angle. In other words, in the above case, the estimation error may occur, and thereby the first difference a8 at 360 degrees may be different from 0. Thus, the first difference a8 indicates an accumulated error (accumulated estimation error) of the estimated angle during one cycle. The above accumulated error is defined as above because it is expected that the absolute value of the estimation error increase proportionally to time, and that the error of the actual detected angle is negligible around the output timing of the Z-phase signal PSz. Note that in the above definition, the rotational speed of the motor 1 is assumed to be constant in one cycle of the resolver 13 even when the motor 1 is actually accelerated and decelerated in the one cycle. In other words, the rotational speed of the motor 1 is assumed to change only in the unit of the one cycle.

Thus, at S160, the first difference a8 at 360 degrees is distributed to each angular section as uniform as possible to make adjustment values. Then, the adjustment values are subtracted from the respective second differences b1 to b8 such that the adjusted second differences for the respective angular sections are computed to indicate the second differences under the assumption that the rotational speed change of the motor 1 does not exist. In other words, each adjusted second difference indicates the shortage amount, by which the actual detected angle is smaller than the estimated angle, which is adjusted by the value based on the rotational speed change of the motor 1, and which corresponds to the true angle shown by the dashed and single-dotted line in FIG. 10B. Thus, the adjusted second difference is stored in the learning value storage table of the memory 45a as the learning values d1 to d8.

More specifically, when the first difference a8 at 360 degrees indicates a positive value, it is assumed that the estimated angle advances the true angle, and thereby the second differences b1 to b8 of each angular section tend to be greater values compared with the second differences for the appropriate estimated angle. Also, the total sum of the second differences b1 to b8 is increased by the amount equivalent to the first difference a8 to be greater than the total sum of the case for the appropriate estimated angle. Thus, each of the second differences b1 to b8 is adjusted such that the total sum of the second differences b1 to b8 is reduced by the amount equivalent to the first difference a8. Then, the adjusted second difference serves as the learning values d1 to d8.

In other words, in the procedures (2) and (3) executed at S160 in FIG. 7, the multiple second differences of the multiple angular sections of the one cycle, which are stored in the second difference storage table (storage part) during the procedure (1) (second difference computing means) executed at S160 in FIG. 7, are adjusted based on the first difference a8 computed at the final angle (360 degrees) of the corresponding one cycle, which is computed in the procedure (first difference computing means) at S110 to S140 in FIG. 7.

In other words, the first difference a8 at 360 degrees coincides with the total sum of the second differences b1 to b8, and when the estimated angle is appropriately estimated, both of the first difference a8 at 360 degrees and the total sum of the second differences b1 to b8 become 0. However, when the estimated angle is inappropriately estimated, and thereby the first difference a8 at 360 degrees becomes a value De that is different from 0, each of the second differences b1 to b8 should be adjusted such that the total sum of the second differences b1 to b8 for eight angular sections is reduced by the amount of De. Then, the above adjusted second differences serve as the learning values d1 to d8.

In other words, in the procedures (2) and (3) executed at S160 in FIG. 7, the multiple second differences of the multiple angular sections of the one cycle, which is stored in the second, difference storage table (storage part) during the procedure (1) at S160 in FIG. 7 (second difference computing means), are adjusted such that the total sum of the multiple second differences of the multiple angular sections becomes zero.

In FIG. 7, when it is determined at S150 that the absolute value of the first difference a at 360 degrees is equal to or greater than the predetermined value, control proceeds to S170, where the first differences a1 to a8 stored in the first difference storage table during the current one cycle are invalidated. In practice, the update of the learning values d1 to d8 based on the first differences a1 to a8 of the current one cycle is prohibited by prohibiting the execution of the procedure at S160. Subsequently, the learning process is ended. In other words, at S150, the first differences computed by the procedure at S110 to S140 in FIG. 7 (first difference computing means) during the one cycle are invalidated when the absolute value of the first difference a8 at 360 degrees, which is computed by the procedure at S110 to S140 in FIG. 7 (first difference computing means) when the actual detected angle indicated by the actual count value Kr becomes 360 degrees (final angle), is equal to or greater than a predetermined value. By executing as above, the update of the second differences stored in the second difference storage table (storage part) used in the procedure in FIG. 12 (correcting process) is prohibited.

Next, the corrected count portion 47 will be described.

The corrected count portion 47 internally has a counter (hereinafter, referred to as a corrected counter). The corrected count portion 47 outputs a corrected count value of the corrected counter, as the angle data φ, to the microcomputer 37.

The corrected count portion 47 executes an initialization process for resetting the corrected count value to be 0, which is an initial value, every time the Z-phase signal PSz rises. In other words, the corrected count value (or the value of the corrected angle information) is initialized to 0 (or an initial value) when the Z-phase signal PSz (reference angle information) is outputted.

Furthermore, after the corrected count portion 47 resets the corrected count value to be 0 in the initialization process, the corrected count portion 47 increments the corrected count value by a value equivalent to a correction amount received from the correction amount computing portion 46 every time the edge (leading edges and trailing edges) of the actual pulse Pr is made. For example, the correction amount computing portion 46 outputs the correction amount indicating the amount, by which the corrected count value of the corrected count portion 47 is to be increased, to the corrected count portion 47 every time the edge of the actual pulse Pr is made.

In other words, the corrected count portion 47 increases the corrected count value by the correction amount fed from the correction amount computing portion 46 every time the edge of the actual pulse Pr is generated. Also, the corrected count portion 47 increases the corrected count value from zero when the Z-phase signal PSz rises. Thus, the corrected count portion 47 increases the corrected count value based on the output timing of the Z-phase signal PSz. Also, the actual count value Kr is outputted to the correction amount computing portion 46 every time the edge (leading edges and trailing edges) of the actual pulse Pr is generated.

Figure 11:
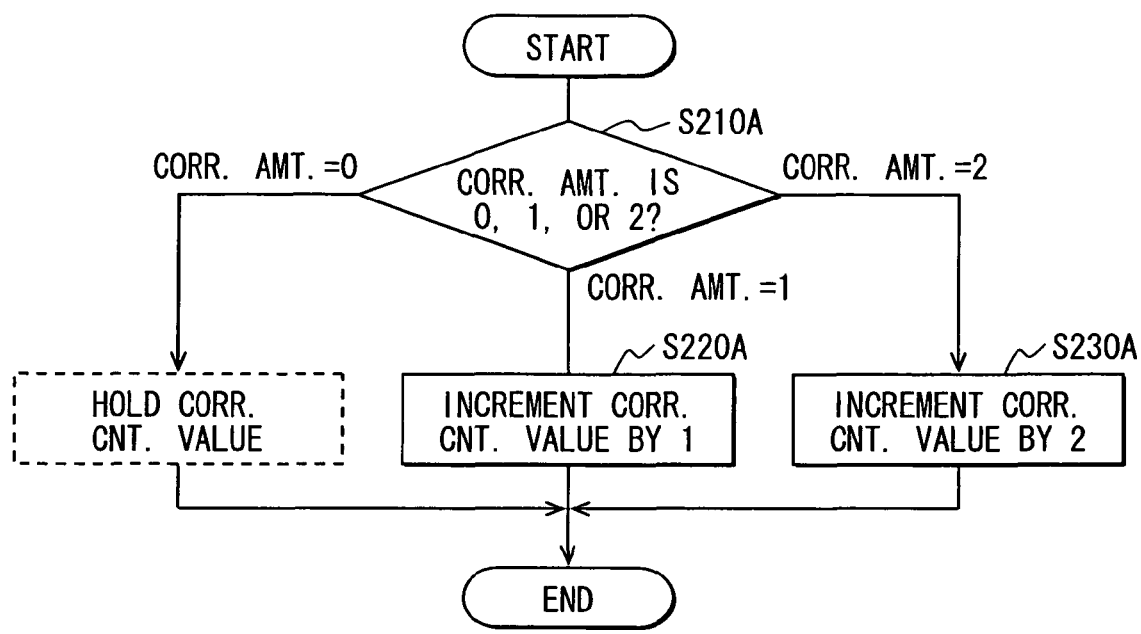
FIG. 11 is a flow chart illustrating an output updating process executed by a corrected count portion.

Specifically, the corrected count portion 47 executes an output updating process shown in FIG. 11 every time the corrected count portion 47 receives the correction amount from the correction amount computing portion 46. In the procedure in FIG. 11, the corrected count value (value of the corrected angle information) is increased by the value, which corresponds to the resolution angle (unit angle), based on the output timing of the Z-phase signal PSz (reference angle information) every time the actual count value Kr (actual detected angle information) is outputted.

In the output updating process, firstly at S210A, it is determined whether a current correction amount fed from the correction amount computing portion 46 indicates 0, 1 or 2. The correction amount of "1" indicates that no correction is to be made. The correction amount of "2" indicates that increase correction is to be made. The correction amount of "0" indicates that decrease correction is to be made. Note that the increase correction means that the increase amount of the corrected count value is made to be greater by 1 than the increase amount of the actual count value Kr. The decrease correction means that the increase amount of the corrected count value is made to be less by 1 than the increase amount of the actual count value Kr.

When it is determined at S210A that the correction amount is 1, control proceeds to S220A, where the corrected count portion 47 increments the corrected count value by 1, and subsequently, the output updating process is ended.

When it is determined at S210A that the correction amount is 2, control proceeds to S230A, where the corrected count portion 47 increments the corrected count value by 2, and subsequently, the output updating process is ended. Thus, in the above case, the corrected count value is increased by 2 while the actual count value Kr is increased by 1. In other words, the increase amount of the corrected count value is greater by 1 than the increase amount of the actual count value Kr.

Also, when it is determined at S210A that the correction amount is 0, the corrected count value is not incremented, and the output updating process is ended. Thus, in the above case, the corrected count value remains the same while the actual count value Kr is increased by 1. In other words, the increase amount of the corrected count value is smaller than the increase amount of the actual count value Kr by 1.

Next, the correction amount computing portion 46 will be described.

The correction amount computing portion 46 outputs the correction amount to the corrected count portion 47 every time the edge of the actual pulse Pr is generated. The correction amount computing portion 46 monitors the actual count value Kr, and sets the correction amount fed to the corrected count portion 47 such that the increase amount of the angle data $\phi$ (or the corrected count value) within each angular section is increased to be greater than the increase amount of the actual count value Kr within the corresponding angular section by the amount equivalent to the learning value for the corresponding angular section stored in the learning value storage table of the memory 45a. More specifically, the angular sections include (a) the angular section, during which the actual count value Kr ranges from 0 degree to 45 degrees, and (b) the angular sections, during which the actual count value Kr changes from a value that corresponds to one of the representative angles to another value that corresponds to the next one of the representative angles. In other words, the angular sections include sections separated by 45 degrees in the one cycle from 0 to 360 degrees. In the above, 45 degrees corresponds to the value (4096×45/360) of the actual count value Kr. Note that, when the adjusted second difference (or the learning value) is negative, the increase amount of the angle data $\phi$ (or the corrected count value) is decreased relative to the increase amount of the actual count value Kr within the corresponding angular section by the amount equivalent to the absolute value of the adjusted second difference (learning value) for the angular section stored in the learning value storage table of the memory 45a.

For example, in the example of the fifth line in the table of FIG. 8B, the learning value d4 is +6 for the angular section between 135 degrees and 180 degrees. In the angular section between 135 degrees and 180 degrees (more specifically, in the angular section of 45-degree that corresponds to a changeable range of the actual count value Kr from (a) the value that corresponds to 135 degrees to (b) the value that corresponds to 180 degrees), the correction amount for the above angular section is set such that the increase amount of the value of the angle data $\phi$ within the angular section is greater by 6 (=d4) than the increase amount of the actual count value Kr in the range of 45 degrees.

The above is more specifically explained with reference to FIG. 12 below. In the below explanation, the resolution for the angle detection is 11 bits (0 through 2047) in order to simplify the explanation. Also, the edge of the actual pulse Pr will be referred to also as an actual pulse edge in the below explanation.

Firstly, in a case of the resolution of 11 bits, the actual pulse edges are generated 256 times for angular section separated by 45 degrees. The number of times of the generated actual pulse edges for each angular section is 256 as computed by the equation of 2048×45/360.

Thus, in order to cause the increase amount of the value of the angle data $\phi$ to be greater by 6, which is the value of d4, than the increase amount (256 times) of the actual count value Kr within the angular section from 135 degrees to 180 degrees, the correction amount is set to 2 by six times, and the correction amount is set to 1 by 250 times while the actual pulse edges are generated 256 times. Note that, if every correction amount is set to 1 by 256 times in the angular section of 45 degrees, the value of the angle data $\phi$ also increases by the amount, by which the actual count value Kr is incremented.

For example, the correction amount may be set to 1 by 250 times in series, and subsequently, the correction amount may be set to 2 by six times in series. In the above setting, the correction amount is set to 2, which is different from 1, by six times out of the 256 times of the output of the correction amounts. However, in the above setting, the learning value d4 is not distributed uniformly over angular section of 45 degrees.

Thus, in the present embodiment, the method similar to the method described in FIG. 6 is employed. In other words, in order to suppress the angle detection error over the angular section of 45 degrees, the correction amount of 1 and the correction amount of 0 or 2 are outputted in an appropriately dispersed manner.

Figure 12:
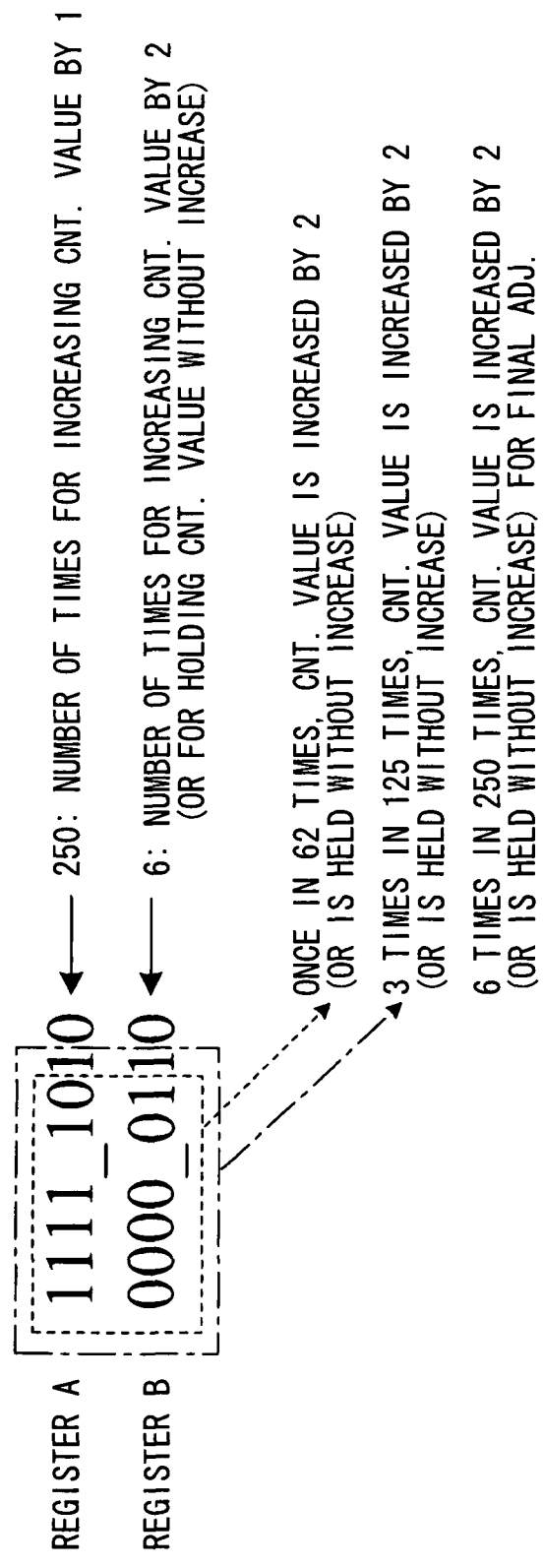
FIG. 12 is an explanatory diagram for explaining a correction amount computing portion.

As shown in FIG. 12, firstly, the absolute value (=6) of the learning value d4 is subtracted from the total output number of times (=256) for the angular section to obtain a value (in the present example, 250), and the obtained value is set in register A of 8 bits. Also, the absolute value (=6) of the learning value d4 is set in register B of 8 bits.

Next, the basic output ratio between the correction amount of 1 and the correction amount of 2 is determined. The basic output ratio shows the number of times, by which the correction amount of 1 is outputted, relative to the single output of the correction amount of 2.

Specifically, as shown by a dotted line in FIG. 12, the basic output ratio is determined based on the number of digits to the first "1" counted from MSB of register B. In the present example, "1" appears firstly at the sixth bits from the MSB of register B, and thereby six digits from the MSB of register A are considered. Thus, the number indicated by the six digits in register A is employed as the output number of times for outputting the correction amount of 1 in the basic output ratio. In other words, when the correction amount of 1 is outputted by 62 times, the correction amount of 2 is once outputted to make the output ratio of 62:1.

When the basic output ratio is obtained through the above calculation, firstly, the correction amount of 1 and the correction amount of 2 are outputted based on the output ratio. In other words, the correction amount of 1 is outputted by 62 times in series, and subsequently, the correction amount of 2 is outputted once. Then, the correction amount of 1 is outputted by 62 times in series, and subsequently, the correction amount of 2 is outputted once, and the same is repeated.

However, because the basic output ratio (62:1) is determined based on 6-bit precision, the basic output ratio (62:1) may be slightly rough. When the output ratio is determined based on 7-bit precision as shown in a dashed and single-dotted line in FIG. 12, the output ratio gives 125 to 3.

Thus, after the correction amount of 1 and the correction amount of 2 are outputted based on the basic output ratio (62:1) to some extent, the current number of times of actually outputted correction amount of 1 and the correction amount of 2 is compared with the output ratio with higher precision. If the output ratio with the higher precision does not correspond to the current output number, the correction amount of 1 and the correction amount of 2 are outputted as required to comply with the output ratio with the higher precision.

In other words, for example, if the correction amount of 2 has only been outputted twice after the correction amount of 1 has been outputted 125 times, the output of the correction amount of 1 is stopped temporarily. Then, the correction amount of 2 is outputted in Series such that the number of times of outputting the correction amount of 2 coincides with 3 times, which is the required number of times for the case with 7-bit precision. As a result, the correction amount of 1 has been outputted 125 times, and the correction amount of 2 has been outputted 3 times. The above output numbers successfully correspond to the output ratio with the 7-bit precision. Then, the correction amount of 1 and the correction amount of 2 are again outputted based on the basic output ratio (62:1).

In the present embodiment, the output number of the correction amount of 1 becomes 250 times before the output number of the correction amount of 2 becomes 6 times, which is the target. More specifically, when the output number of the correction amount of 1 becomes 250 times, the output number of the correction amount of 2 has become 5 times in the above case. Therefore, the output of the correction amount of 1 is prohibited temporarily, and the correction amount of 2 is outputted in series until the output number of the correction amount of 2 reaches 6 times.

As a result, the output ratio of the correction amount of 1 to the correction amount of 2 over the whole angular section of 45 degrees becomes 250 to 6, and thereby the corrected count portion 47 increments the value of the angle data φ (corrected count value) by the increase amount that is greater than the increase amount of the actual count value Kr by 6.

In the above example, the learning value is positive, and the increase amount of the value of the angle data φ within the one angular section is corrected to become greater than the increase amount of the actual count value Kr. However, the learning value may be alternatively negative, and thereby the increase amount of the value of the angle data φ may be corrected to become less than the increase amount of the actual count value Kr. In the above alternative case, "the correction amount of 2" in the above description with reference to FIG. 12 is changed to "the correction amount of 0". In other words, the correction amount computing portion 46 outputs the correction amount of 0; instead of the correction amount of 2, to the corrected count portion 47.

In the procedure shown in FIG. 12, the value of the correction amount used in the output updating process of FIG. 11 is changed such that the increase amount of the corrected count value (value of the corrected angle information), which is increased while the actual detected angle indicated by the actual count value Kr changes within each of the multiple angular sections, is increased by the adjusted second difference (or the learning value), which is stored in the second difference storage table (storage part) in association with corresponding the angular section. More specifically, the multiple angular sections include the angular section, during which the actual detected angle indicated by the actual count value Kr changes from (a) the initial value at the output timing of the Z-phase signal PSz (reference angle information) to (b) 45 degrees (minimum representative angle). Also, the multiple angular sections include the angular sections, during which the actual detected angle changes from one of the representative angles to the next one of the representative angles.

Figure 13:
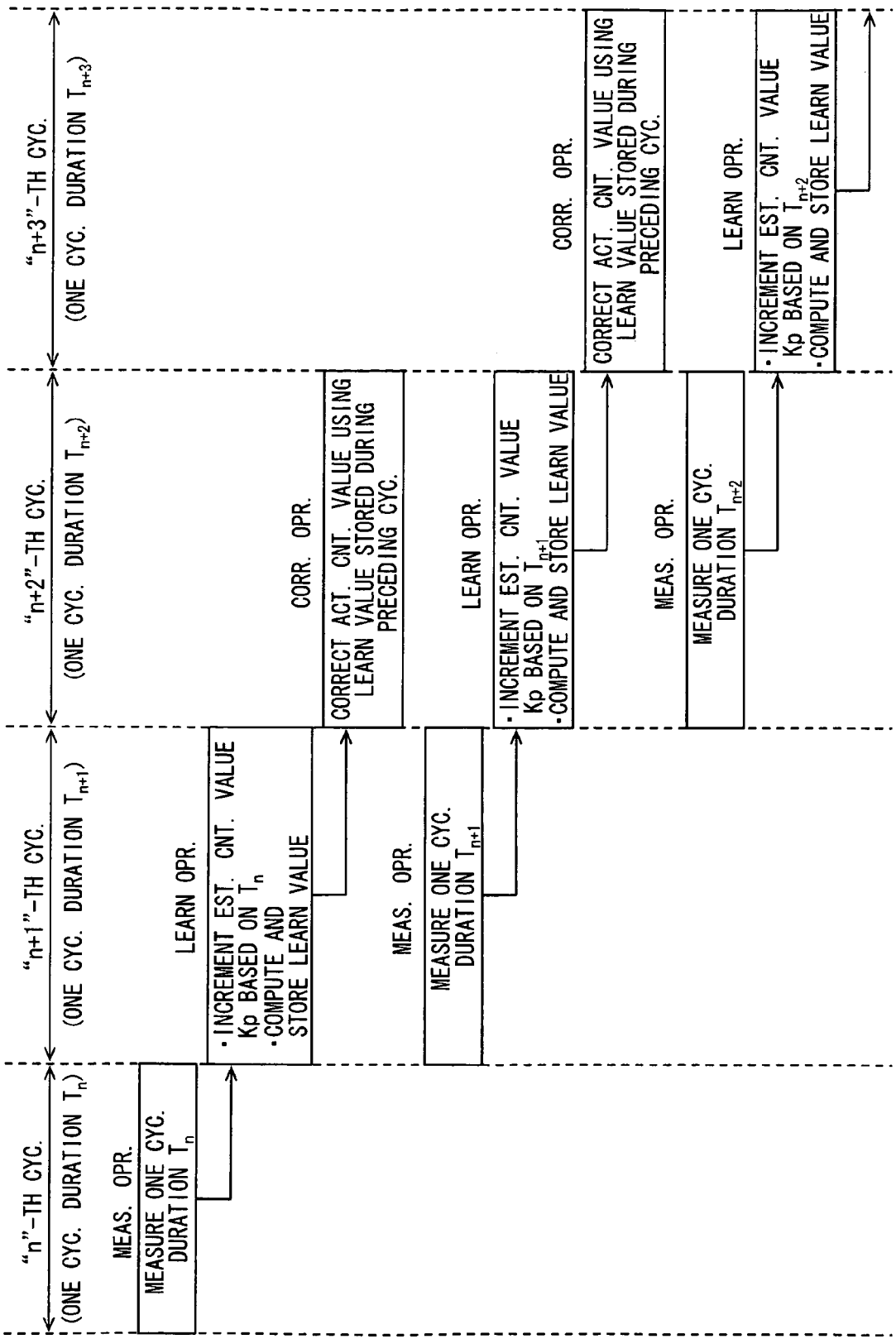
FIG. 13 is an explanatory diagram for explaining a sequence of operation of the error correcting portion.

FIG. 13 illustrates the sequence of the operation of the error correcting portion 17.

As shown in FIG. 13, the operation of the error correcting portion 17 includes measuring operation, learning operation, and correcting operation. The error correcting portion 17 executes one of the measuring operation, the learning operation, and the correcting operation at each cycle similarly to a pipeline processing. In the above pipeline processing, and the cycle corresponds to the interval of outputting the Z-phase signals (or corresponds to one rotation period of the resolver 13).

In the measuring operation, the duration of one cycle is measured.

In the subsequent learning operation, the estimated pulse Pp is generated based on the measured value of the one cycle duration in the previous cycle, and increments the estimated count value Kp based on the estimated pulse Pp; Then, in the learning operation, the first differences a1 to a8 are stored for each representative angle, and the learning values d1 to d8 for the respective angular sections of 45 degrees are determined when the current cycle is ended.

In the subsequent correcting operation, the increase amount of the value of the angle data φ for the angular section is changed (increased and decreased) relative to the increase amount of the actual count value Kr by the amount associated with the corresponding learning value d1 to d8 for the angular section stored at the end of the previous cycle in order to correct the actual count value Kr to output the angle data φ.

Thus, as shown in FIG. 13, for example, the learning values d1 to d8 used in the correcting operation during the "n+2"-th cycle are stored in, the learning operation executed during the previous "n+1"-th cycle. Also, the estimated count value Kp used for determining the learning values d1 to d8 in the learning operation executed during the "n+1"-th cycle is computed based on the one cycle duration $T_n$ measured in the measuring operation executed during the second previous "n"-th cycle.

The error correcting portion 17 is provided to the ECU 7 (drive motor control apparatus) of the present embodiment, and the exceeding amount, of the increase amount of the estimated angle relative to the increase amount of the actual detected angle in the respective angular section is stored as the second differences b1 to b8 that can be positive or negative. For example, the rotation angle of the motor 1 ranging from 0 degree to 360 degrees is divided into 8 angular sections such that the angular sections of the present embodiment are separated from each other by 45 degrees. The first difference a8 at 360 degrees indicates the accumulated error of the estimated angle during one cycle. The adjustment values c1 to c8 for the respective angular sections are computed such that the first difference a8 is distributed to each angular section as uniformly as possible. The adjustment values c1 to c8 are subtracted from the corresponding second differences b1 to b8 in order to compute the adjusted second differences for the angular sections. The adjusted second differences represents the values under the assumption, where there is no rotational speed change of the motor 1, and the total sum of the adjusted second differences is 0. The adjusted second differences for the angular sections serve as the learning values d1 to d8. The learning values d1 to d8 for the respective angular sections represent the shortage amount, by which the actual detected angle is smaller than an estimated angle determined through adjustment of the possible error caused by the rotational speed change of the motor 1.

Thus, the error correcting portion 17 basically increments the value of the angle data φ to be outputted to the microcomputer 37 every time the actual pulse edge is generated such that the value of the angle data φ is changed to coincide with the actual count value Kr that corresponds to the actual detected angle. In the present embodiment, when required, the increase amount of the value of the angle data φ within each of the angular sections of 45-degrees intervals is made greater than the increase amount of the actual count value Kr by the amount indicated by the learning value d1 to d8 of the corresponding angular section. Note that when the learning value is negative, the increase amount of the value of the angle data φ is made smaller by the absolute value of the learning value. More specifically, the above change of the angle data φ is made by switching the value (or the correction amount) between 0 and 2 for changing the value of the angle data φ every time the actual pulse edge is generated. The above operation is made such that the value of the angle data φ coincides with the adjusted estimated angle that is adjusted by the amount caused by the rotational speed change of the motor 1.

In general, there may be some errors in the detection signals caused by various causes. More specifically, due to various causes, such as the manufacturing variation of the resolver 13, the rotation detection signals Sa, Sb outputted from the resolver 13 may include errors. Also, the actual pulse Pr and the actual count value Kr, which are computed based on the A-phase signal PSa and the B-phase signal PSb, may include errors. Furthermore, the rotational speed change during the operation of the motor 1 may cause the error. However, according to the ECU 7 of the present embodiment, the error correcting portion 17 is capable of correcting the above errors if any, and thereby it is possible to generate highly reliable angle data φ. As a result, the above reliable angle data φ is used for controlling the energization of the motor 1 effectively.

As a result, by suppressing the deterioration of the degree of accuracy in detecting the rotation angle, it is possible to achieve effective controllability of the motor 1. Specifically, it is possible to effectively limit the unwanted acceleration of the vehicle, and thereby it is possible to prevent the discomforting of the occupant of the vehicle caused by the unwanted acceleration.

Furthermore, according to the present embodiment, it is possible to effectively simplify the calculation process used for error correction. More specifically, division process as a mathematical calculation, which generally requires large processing load, is not required. Furthermore, in the present embodiment, a correction value is not stored in the memory every resolution for the angle detection (or every resolution angle). As a result, it is possible to effectively suppress the increase in size of the hardware, and specifically, the size of the memory.

Also, in the present embodiment, when the absolute value of the first difference a8 at 360 degrees is equal to or greater than the predetermined value, corresponding to YES at S150 in FIG. 7, the error correcting portion 17 (the difference storing portion 45) invalidates the first differences a1 to a8 stored during the one cycle, and thereby preventing the update of the learning values d1 to d8. Thus, it is Possible to effectively prevent the erroneous correction based on the erroneously updated learning values. More specifically, when the absolute value of the first difference a8 is equal to or greater than the predetermined value, it is assumed that there is a large difference between the estimated angle and the actual detected angle. Thereby, if the learning values d1 to d8 were updated based on the above erroneously-large first differences a1 to a8 of the one cycle, the learning values, d1 to d8 may be erroneously computed. As a result, the angle data φ may not be accurately obtained even when the actual count value Kr is corrected based on the erroneously updated learning values d1 to d8 in the correcting operation during the next cycle.

Next, a correcting principle of correcting means will be described. Note that in the description of the principle, the first difference is computed by subtracting the actual detected angle from the estimated angle.

Firstly, the estimated time estimated by the time estimating means is estimated based on the one cycle duration, which is actually required for the motor 1 to rotate the reference angle in the preceding rotation cycle, every time the reference angle information is outputted. Thus, the estimated time takes effects of the preceding rotational state, and thereby is a reliable value.

The angle estimating means outputs the estimated angle information under the assumption that the motor 1 rotates the unit angle every time the estimated time elapses. The estimated angle information indicates the estimated angle at the time, or indicates the rotation angle measured based on the output timing of the reference angle information. Therefore, the estimated angle information (estimated angle) takes effects of the preceding rotational state, and thereby is reliable information.

The first difference computing means computes the first difference every time the actual detected angle indicated by the actual detected angle information becomes each of the multiple representative angles during one cycle that corresponds to an interval, at which the reference angle information is outputted. The first difference indicates the exceeding amount of the estimated angle indicated by the estimated angle information relative to the actual detected angle. Thus, the first, difference indicates the shortage amount (or delay) of the actual detected angle relative to the estimated angle.

The second difference computing means computes the second differences of the multiple angular sections based on the first differences computed by the first difference computing means for the multiple representative angles in the one cycle. For example, the multiple angular sections include an angular section defined between an initial value of the actual detected angle to the minimum representative angle, and include angular sections defined between adjacent representative angles. As above, the second difference of the actual detected angle and the estimated angle is computed for each of the multiple angular sections, and is stored in the storage part 45a.

More specifically, the second difference indicates the exceeding amount of the increase amount of the estimated angle relative to the increase amount of the actual detected angle in the respective angular section. In other words, the second difference indicates the amount, by which the actual detected angle is smaller than relative to the estimated angle in the respective angular section.

The output processing means sets the value of the corrected angle information to an initial value every time the reference angle information is outputted. Basically, every time the actual detected angle information is outputted (or every time the actual detected angle is advanced by the unit angle), the value of the corrected angle information is increased by a certain value, which corresponds to the unit angle, such that the value of the corrected angle information is changed similar to the change of the actual detected angle. More specifically, the value of the corrected angle information is increased such that the increase amount of the value of the corrected angle information while the actual detected angle changes within the above defined angular section is increased by an amount indicated by the adjusted second difference of the corresponding angular section stored in the storage part. Furthermore, a correcting process is executed such that the certain value is changed every time the actual detected angle, information is outputted. Thus, the value of the corrected angle information is changed to coincide with the estimated angle.

Although the estimated angle is reliable as above, because the estimated angle is estimated based on the past one cycle duration and is increased in proportion to time, the change of the rotational speed of motor 1 (or the acceleration and deceleration) may cause an error of the estimation (or estimation error) from the true angle (actual angle). Therefore, when there is the acceleration and deceleration of the motor 1, the second difference stored in the storage part 45a by the second difference computing means for the respective angular section may not appropriately indicate the difference between the increase amount of the actual detected angle and the increase amount of the true angle at the respective angular sections.

Thus, the adjusting means adjusts the second difference stored in the storage part 45a, which is used by the output processing means during the above correcting process, in accordance with the degree of the acceleration and deceleration of the motor 1. Thus, it is possible to effectively cause the value of the corrected angle information to follow or coincide with the estimated angle that is made in consideration of the acceleration and deceleration of the motor 1. In other words, it is possible to effectively cause the value of the corrected angle information to follow the estimated angle that has small difference from the true angle. As a result, it is possible to effectively limit the influence of acceleration and deceleration of the motor 1.

According to the above embodiments, even when the actual detected angle information outputted by the rotation detecting means includes the error caused by various factors, such as the manufacturing variation of the rotation detecting means, or even when the rotational speed changes during the operation of the motor, the reliable corrected angle information is generated. The corrected angle information is made by the correcting means that corrects the error of the actual detected angle information, and then the corrected angle information is used for the control of energization of the motor. Thereby, it is possible to limit the degradation of the degree of detection accuracy of the rotation angle, and thereby achieving preferable controllability of the motor. Specifically, it is possible to suppress the unwanted acceleration of the vehicle, and thereby preventing the discomforting of the occupant of the vehicle.

Furthermore, according to the above embodiments, it is possible to simplify the calculation process for the correction and thus, it is possible to effectively limit the size of the hardware from increasing.

In a comparison example; a correction value of correcting the actual detected angle information for every unit angle rotation may be computed in a learning process and stored in a memory. Then, in the actual control of the motor, every time the actual detected angle information from rotation detecting means is updated, the correction value stored in the memory in association with the actual detected angle information may be used for correcting the actual detected angle information, and then the corrected actual detected angle information may be outputted as the corrected angle information in the comparison example. However, in the above comparison configuration, a very large memory is required for storing the correction value for every unit angle, and thereby the size of the hardware is increased accordingly. Also, in order to deal with the various operational states (such as a constant-speed operation of the motor, the acceleration of the motor), dedicated correction values for each of the operational states may need to be prepared, or the computation method of the correction may need to be changed for each of the operational states disadvantageously. On contrary to the above, according to the above embodiments, it is possible to avoid the disadvantages.

The adjusting means of the above embodiments provides the relatively simple configuration and still improves the degree of detection accuracy of the rotation angle.

The adjusting means includes the first adjustment value determining means.

The first adjustment value determining means determines the first adjustment value of the second differences for the one cycle stored by the second difference computing means in the storage part based on the first difference a8 computed by the first difference computing means at the final angle during the one cycle, during which the second difference are computed. Each of the first adjustment values is computed such that a total sum of the first adjustment values coincides with the first difference a8 computed at the final angle. Note that the first adjustment value may be positive and negative.

In the process of the adjusting means for adjusting the second differences (hereinafter, referred to also as original second differences) for the one cycle stored in the storage part by the second difference computing means, each of the original second differences is reduced by the amount indicated by the corresponding first adjustment value determined for the second difference.

Next, the principle of the adjusting means will be described.

Firstly, the first difference of each of the multiple representative angles includes an estimation error G caused by acceleration and deceleration of the motor, as shown in equation 1 below. Note that the estimation error G may be positive and negative.

$$\begin{aligned}
\text{first difference} &= \text{estimated angle} - \text{actual detected angle} \quad \text{equation 1}\\
&= (\text{true angle} + \text{estimation error } G) - \\
&\quad \text{actual detected angle} \\
&= (\text{true angle} - \text{actual detected angle}) + \\
&\quad \text{estimation error } G \\
&= \text{angle detection error} + \text{estimation error } G
\end{aligned}$$

Also, in general, a sensor serving as the rotation detecting means does not have an angle detection error (error or the actual detected angle) at and around a starting point of detecting the angle (at and around output timing, at which the reference angle information is outputted).

Thus, when it is assumed that the rotational speed of motor is constant in the one cycle of the reference angle information (or that the rotational speed of the motor changes only with the unit of the one cycle), the estimation error G is caused by the rotational speed change (or the change of the one cycle duration). Thus, the absolute value of the estimation error G is increased in proportion to the time. Thereby, the first difference at the final angle of the actual detected angle immediately before returning to the initial value indicates an accumulated error ΣG of the estimated angle for the one cycle (hereinafter, referred to also as an accumulated estimation error). Thus, the first difference at the final angle indicates the change of the rotational speed of motor (degree of acceleration and deceleration) for the unit of the one cycle.

As above, the first difference corresponds to the accumulated estimation error ΣG caused by the rotational speed change of the unit of one cycle, and the value of the first difference changes with the degree of acceleration and deceleration of the motor. Thus, the adjusting means adjusts the original second difference stored in the storage part in accordance with the first difference at the final angle in the corresponding one cycle such that the value of the corrected angle information is made to coincide with or follow the estimated angle, which considers the rotational speed change of the unit of one cycle, and thereby having small difference from the true angle. Thus, it is possible to effectively limit the value of the corrected angle information from being influenced by the rotational speed change.

The first difference at the final angle computed by the first difference computing means is referred to as "De". The first adjustment value determining means determines each of the first adjustment values for the corresponding second differences for the one cycle such that the total sum of the first adjustment values coincides with De. Thus, the adjusting means subtract De from the total sum of the second differences for the one cycle stored by the second difference computing means in the storage part in an adjusting process using the first adjustment value. Note that when De is negative, "subtraction of De from the total sum" means "addition of the absolute value of De to the total sum".

Then, in the above adjustment using the first adjustment value, the second difference used in the correcting process by the output processing means are adjusted to satisfy the followings two assumptions. Firstly, the increase amount of the estimated angle in the preceding one cycle is assumed to coincide with the increase amount of the actual detected angle. In other words, the increase amount of the estimated angle in the preceding one cycle is assumed to coincide with, the amount equivalent to the reference angle. Secondly, the estimated angle is assumed not to include the estimation error G caused by the rotational speed change of the unit of the one cycle. As a result, the above adjusted second difference that is suitable for the correction of the error of actual detected angle information is obtained. Therefore, it is possible to make the value of the corrected angle information to follow the more reliable estimated angle made in the consideration of the rotational speed change of the unit of one cycle.

Note that, if the absolute value of De corresponds to the unit angle (or to a minimum value), the first adjustment value determining, means sets one of the first adjustment values to De and sets the other first adjustment values to 0. In the above case, the adjusting means subtract De from the corresponding one of the second differences of the one cycle stored in the storage part. In contrast, if the absolute value of De corresponds to a value greater than unit angle, the first adjustment value determining means divides De by N (N is, an integer equal to or greater than 2) to obtain N number of values; and the N number of values serve as N number of first adjustment values.

In the above, the adjusting means divides De into N values, and the adjusting means subtract each of N values from the corresponding one of the N second differences for the one cycle stored by the second difference computing means in the storage part. As a result, it is possible to uniformly distribute the value of De to the second differences of the multiple angular sections. Thus, it is possible to appropriately correct the error of the actual detected angle information over the one cycle.

Furthermore, the first adjustment value determining means may divide the value of De based on a ratio that is similar to an angular occupancy ratio of the angular widths of the respective angular sections. Then, each of the divided values serves as the first adjustment value for adjusting the second difference of the corresponding angular section.

Due to the above, it is possible to uniformly divide the value of De for the correction of the actual detected angle information for the one cycle. For example, there is an example case, where the number of angular sections is K, and the angular widths of the K number of the angular sections are equal to each other. In the above example case, if the absolute value of De is greater than K-times of the value corresponding to the unit angle, the value of De is divided into K number of values as uniformly as possible, and the divided values are made serve as the first adjustment values for the second differences of the respective angular sections.

Note that if De is negative, the values (first adjustment values) obtained by dividing De by N are also negative. In other words, a total sum of the N number of first adjustment values becomes De. When the N number of first adjustment values are negative, "subtraction of the first adjustment value from the second difference" indicates that "addition of the absolute value of the first adjustment value to the second difference".

In the first embodiment, the resolver 13, the RD converting portion 16, the exclusive-OR computing portion 41, and the actual pulse counter 42 correspond to rotation detecting means (rotation sensor); and the error correcting portion 17 corresponds to correcting means. The Z-phase signal PSz corresponds to reference angle information. The A-phase signal PSa and the B-phase signal PSb correspond to unit rotation angle information. The actual count value Kr corresponds to actual detected angle information that indicates the actual detected angle.

The estimated angle pulse signal generating portion 43 corresponds to time estimating means, and the estimated pulse counter 44 corresponds to angle estimating means. The estimated count value Kp corresponds to estimated angle information.

Furthermore, processes at S110 to S140 in FIG. 7 executed by the difference storing portion 45 correspond to first difference computing means. The procedure (1) in S160 in FIG. 7 executed by the difference storing portion 45 corresponds to second difference computing means. The procedures (2) and (3) in S160 in FIG. 7 executed by the difference storing portion 45 corresponds to adjusting means. The procedure (2) corresponds to first adjustment value determining means, and the adjustment values c1 to c8 serve as first adjustment values. Also, process at S150 and S170 in FIG. 7 corresponds to update prohibiting means.

Also, the correction amount computing portion 46 and the corrected count portion 47 correspond to output processing means, and the angle data φ corresponds to corrected angle information.

The initialization process executed by the corrected count portion 47 corresponds to an initialization process executed by the output processing means. Output updating process in FIG. 11 executed by the corrected count portion 47 corresponds to output updating process executed by the output processing means. The process, which the correction amount computing portion 46 outputs the correction amount to the corrected count portion 47 (as described with reference to FIG. 12), corresponds to correcting process executed by the output processing means.

Second Embodiment

In the first embodiment, it is assumed that the rotational speed of the motor 1 remains constant within one cycle even if the acceleration actually changes. Thus, in the first embodiment, the value of the angle data φ is caused to coincide with or to follow the estimated angle, which is an ideal estimated angle indicated by a straight line. For example, the estimated angle is made, under consideration of the rotational speed change within a unit of one cycle, and is indicated by a dashed and single-dotted line shown in the one cycle of the right side in FIG. 18. Also, the estimated angle is proportional to time, and becomes the initial value and the final value at timing similar to timing, at which the actual detected angle also becomes the initial value and the final value.

However, more strictly, because the rotational speed of the motor 1 changes within one cycle, the true angle changes with time to make a curved line. For example, when the motor 1 is accelerated, the true angle changes as shown in a dotted line of the one cycle on right side in FIG. 18.

However, strictly, because the rotational speed of the motor 1 changes within the one cycle, the true angle changes to form a curved line relative to time in a chart. For example, in the acceleration of the motor, the true angle changes as indicated as a dotted line in the one cycle on a right side in FIG. 18. In other words, when the angle is close to the initial value ("0" in FIG. 18), an increase ratio of the true angle (increase ratio as a function of time, and corresponding to a gradient of the waveform in FIG. 18) is smaller than an increase ratio of the ideal estimated angle having a straight line shape. When the angle is at about a middle of the initial value and the final value ("4.095" in FIG. 18), the increase ratio of the true angle generally coincides with the increase ratio of the estimated angle having the straight line shape. When the angle is close to the final value, the increase ratio of the true angle becomes greater than the increase ratio of the true angle ideal estimated angle having the straight line shape.

As a result, when the motor 1 is accelerated, in an angular section of the actual detected angle close to the initial value (0 degree), the increase amount of the ideal estimated angle having the straight line shape indicates a value that is greater than the increase amount of the true angle. Also, in another angular section of the actual detected angle close to the final value (360 degrees), the increase amount of the estimated angle having the straight line shape indicates the value smaller than the increase amount of the true angle. As described in the first embodiment, the estimated angle is used for the computation of the first differences a1 to a8 and the second differences b1 to b8. As a result, in the angular section close to the initial value, the second difference based on the estimated angle having the straight line shape tends to indicate a greater value than the second difference based on the true angle of the ideal case. In contrast, in the other angular section close to the final value, the second difference based on the estimated angle having the straight line shape tends to indicate a smaller value than the second difference based on the true angle in the ideal case. Furthermore, the above is more likely to occur in a more significant manner when the degree of the acceleration becomes larger. For example, the intervals of rotation of 45 degrees become shorter during the acceleration as shown in the right side in FIG. 18. The curved shape of the true angle becomes more remarkable with the increase of the time change rate.

When the motor 1 is decelerated in contrast, the increase amount of the estimated angle having the straight line shape indicates a value that is smaller than the increase amount of the true angle in the angular section of the actual detected angle closer to the initial value. Also, the increase amount of the estimated angle having the straight line shape indicates a value greater than the increase amount of the true angle in the other angular section closer to the final value. Thus, the second difference based on the estimated angle tends to indicate a smaller value than the second difference based on the true angle in the angular section close to the initial value. Also, the second difference based on the estimated angle tends to indicate a greater value than the second difference based on the true angle in the angular section close to the final value. Furthermore, the above is more likely to occur in a more significant manner when the degree of the deceleration becomes larger.

Thus, as shown in FIG. 14 that corresponds to FIG. 8 of the first embodiment, in the ECU 7 in the second embodiment, adjustment values for adjusting the second differences b1 to b8 further include acceleration adjustment values e1 to e8 in addition to the adjustment values c1 to c8 of the first embodiment to obtain the learning values d1 to d8. The acceleration adjustment values e1 to e8 serve as the second adjustment values, and is used for adjusting the respective second differences b1 to b8.

The difference of the second embodiment from the first embodiment will be described below.

Figure 15:
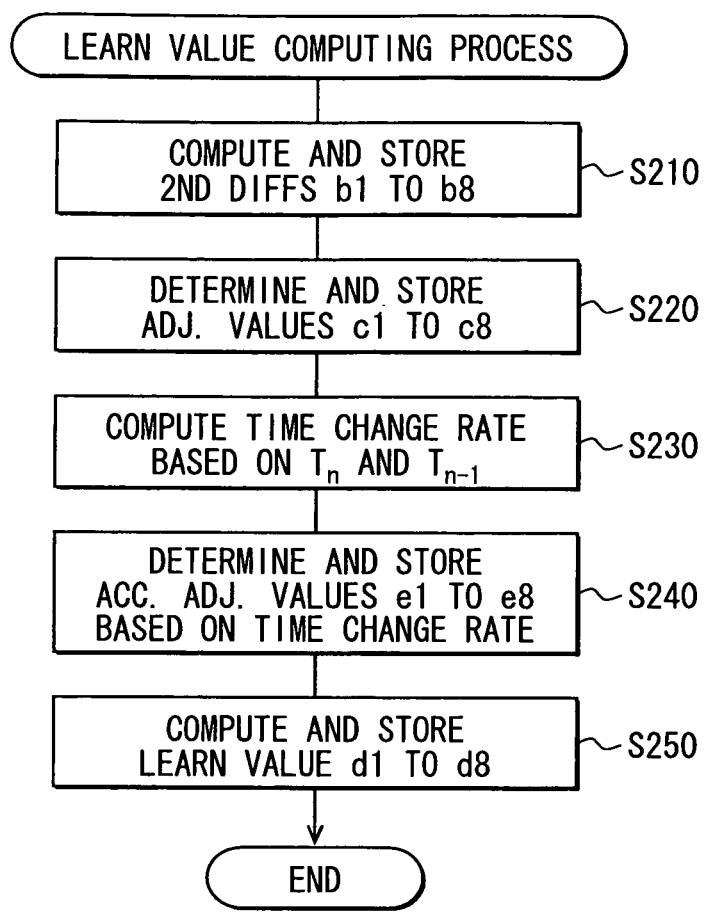
FIG. 15 is a flow chart illustrating a learning value computing process of the second embodiment.

Firstly, the difference storing portion 45 executes a learning value computing process shown in FIG. 15 at S160 in the learning process in FIG. 7.

As shown in FIG. 15, in the learning value computing process, firstly, at S210, the second differences b1 to b8 are computed through the procedure (1), and are stored in the second difference storage table. Then, control proceeds to S220, where the adjustment values c1 to c8 are determined through the procedure (2), and are stored in the adjustment value storage table. In other words, the second differences b1 to b8 and the adjustment values c1 to c8 are computed in the manner similar to that in the first embodiment.

Next, control proceeds to S230, where the estimated angle pulse signal generating portion 43 starts measuring duration of another one cycle upon the generation of the leading edge of the Z-phase signal PSz. When the estimated angle pulse signal generating portion 43 has measured the current one cycle duration, the estimated angle pulse signal generating portion 43 computes a time change rate RATE by using the following equation 2 based on (a) the current one cycle duration $T_n$, which has been currently measured, and (b) the preceding one cycle duration $T_{n-1}$, which was previously measured in the previous cycle. For example, the time change rate RATE indicates a change rate of one cycle duration. In other words, at S230, time change rate RATE of the motor 1 (the degree of the acceleration and deceleration) is determined based on the duration $T_n$ of the one cycle and the other duration $T_{n-1}$ of the preceding one cycle that precedes the one cycle. The duration of the one cycle is measured between (a) the previous time, at which the Z-phase signal. PSz (reference angle information) is previously outputted, and (b) the current time, at which the Z-phase signal PSz is currently outputted. The duration of the preceding one cycle is measured between (a) a further previous time, at which the Z-phase signal PSz is outputted precedingly to the previous time, and (b) the previous time.

$$\text{RATE} = (T_n - T_{n-1})/T_n \qquad \text{equation 2}$$

Then, control proceeds to S240, where the acceleration adjustment values e1 to e8 for adjusting the second differences b1 to b8 of respective angular sections are determined based on the time change rate RATE computed at S230 by using an acceleration adjustment value determination map shown in FIG. 16. Furthermore, in the second embodiment, the memory 45a includes an acceleration adjustment value storage table that stores therein the acceleration adjustment values e1 to e8 as shown in the fifth line of the table shown in FIG. 14. At S240, the acceleration adjustment values e1 to e8 are stored in the acceleration adjustment value storage table.

As shown in FIG. 16, the acceleration adjustment value determination map indicates the acceleration adjustment values e1 to e8 in association with each of the time change rates RATE. At S240, the acceleration adjustment values e1 to e8, which are associated with the time change rate RATE computed at S230, are retrieved from the acceleration adjustment value determination map, and the retrieved acceleration adjustment values e1 to e8 are stored in the acceleration adjustment value storage table.

Note that the time change rate RATE computed by equation 2 indicates a degree of the acceleration and deceleration of the motor 1. Typically, when the motor 1 is accelerated, the time change rate RATE becomes negative, and when the motor 1 is decelerated, the time change rate RATE becomes positive. Furthermore, when the degree of the acceleration and deceleration is greater, the absolute value of the time change rate RATE becomes greater accordingly.

Also, FIG. 16 only shows the acceleration adjustment value determination map of the case, where the motor 1 is accelerated. The acceleration adjustment value determination map of the case, where the motor 1 is decelerated is made by merely reversing the sign of each of the time change rates and the acceleration adjustment values e1 to e8 in FIG. 16 to the opposite sign.

As is apparently known from FIG. 16, when the time change rate RATE is negative (or when the motor 1 is accelerated), the acceleration adjustment values e1 to e8 are determined to satisfy the following conditions. Condition (1): a total sum of the acceleration adjustment values e1 to e8 is zero, and condition (2): the acceleration adjustment values e1 to e8 of the angular sections corresponding to the larger representative angles (closer to the final value) are set to be larger. More specifically, the one acceleration adjustment value (second adjustment value) of one representative angle indicates a value larger than a value of the other acceleration adjustment value of the other representative angle provided that the one representative angle is larger than the other representative angle. In contrast, when the time change rate RATE is positive (or when the motor 1 is decelerated), the acceleration adjustment values e1 to e8 are determined to satisfy the following conditions. Condition (1): a total sum of the acceleration adjustment values e1 to e8 is zero, and condition (2): the acceleration adjustment values e1 to e8 of the angular sections corresponding to the larger representative angles are set to be smaller. More specifically, the one acceleration adjustment value (second adjustment value) of the one representative angle indicates a value smaller than a value of the other acceleration adjustment value of the other representative angle provided that the one representative angle is larger than the other representative angle. Furthermore, a total sum of the absolute values of the acceleration adjustment values e1 to e8 becomes larger with the increase of the absolute value of the time change rate RATE (or with the increase of the detected degree of the acceleration and deceleration of the motor 1).

Furthermore, the angular sections for the second differences are made at equal intervals in the present embodiment. More specifically, there are even-numbered angular sections in the present embodiment. Because of the equal-interval arrangement of angular sections, the acceleration adjustment values e4, e5 for the second differences b4, b5 for the respective center angular sections (two angular sections in the present embodiment) are made to indicate zero. The acceleration adjustment value e1 to e3 are determined, for adjusting the second differences b1 to b3 of the angular sections corresponding to the smaller representative angles than the representative angles of the central angular sections. Also, the acceleration adjustment values e6 to e8 are determined for adjusting the second differences b6 to b8 of the angular sections corresponding to the larger representative angles than the representative angles of the central angular sections. The absolute values of the acceleration adjustment value e1 to e3 are the same with the respective absolute values of the acceleration adjustment values e6 to e8. The signs of the acceleration adjustment values e1 to e3 are opposite from the signs of the respective acceleration adjustment values e6 to e8. In other words, the acceleration adjustment values (second adjustment values) for the multiple second differences of the one cycle stored in the second difference storage table (storage part) during the procedure (1) (second difference computing means) are determined at S240 in FIG. 15 based on the detected time change rate RATE (the degree of acceleration and deceleration) by using the table in FIG. 16.

When determination and storage of the acceleration adjustment values e1 to e8 are ended at S240, control proceeds to S250, where, a learning value dx for each angular section is computed, by using equation 3, based on (a) the second difference bx stored in the second difference storage table at S210, (b) the adjustment value cx stored in the adjustment value storage table at S220, and (c) the acceleration adjustment value ex stored in the acceleration adjustment value storage table at S240 (x indicates an integer from 1 to 8 in the above).

$$dx = bx - cx + ex \quad \text{equation 3}$$

In other words, the adjustment values c1 to c8 are subtracted from the respective second differences b1 to b8, and furthermore the acceleration adjustment values e1 to e8 are added to the respective second differences b1 to b8 in order to obtain the learning values d1 to d8.

Furthermore, the computed learning values d1 to d8 for the respective angular sections are stored, at S250, in the learning value storage table of the memory 45a, and subsequently, the learning value computing process is ended.

Thus, for example, the computation executed in the present embodiment is similar up to the fourth line of the table in FIG. 8B of the first embodiment. In the present embodiment, when the time change rate RATE computed at S230 is "−4%", the acceleration adjustment values e1 to e8 are determined to be the values shown in the fifth line of the table in FIG. 17 based on the acceleration adjustment value determination map in FIG. 16. Thus, the learning values d1 to d8 for respective angular sections become value shown in the sixth line (the last line) of the table in FIG. 17 based on the above equation 3.

In the second embodiment, the second differences b1 to b8 computed similarly to the first embodiment are further adjusted by the acceleration adjustment values e1 to e8 to obtain the learning values d1 to d8. Thus, in a case, where the motor 1 is accelerated in the second embodiment, when the angular section is closer to 0 degree and the degree of acceleration is higher, the second difference is reduced by a larger amount to obtain the learning value compared with the first embodiment. Also, when the angular section is closer to 360 degree and the degree of acceleration is higher, the second difference is increased by a larger amount to obtain the learning value compared with the first embodiment. In contrast, in the other case, where the motor 1 is decelerated in the second embodiment, when the angular section is closer to 0 degrees and the degree of deceleration is higher, the second difference is increased by a larger amount to obtain the learning value compared with the first embodiment. Also, when the angular section is closer to 360 degrees and the degree of deceleration is higher, the second difference is reduced by a larger amount to obtain the learning value compared with the first embodiment.

As a result, the learning values d1 to d8 for the respective angular sections are computed to correspond to ideal second differences that are computed under the assumption that the estimated angle does not include estimation error caused by acceleration and deceleration of the motor 1 within one cycle. In other words, in the second embodiment, the estimated angles used for obtaining the learning values d1 to d8 for the respective angular sections are adjusted based on the influence of the rotational speed change of the motor 1 within the one cycle and also based on the influence of the acceleration and deceleration within one cycle in order to obtain more reliable angles. For example, the estimated angle is made effectively closer to the true angle shown by a dotted line of one cycle on a right side in FIG. 18. As a result, the learning values d1 to d8 for the respective angular sections are computed to show the amount of shortage of the actual detected angles relative to the above reliable estimated angles for respective angular sections.

Thus, it is possible to further effectively improve the accuracy of the angle data φ generated by the error correcting portion 17, and thereby further improving the controllability of the motor 1.

Note that in the second embodiment, process at S220 to S250 in FIG. 15 executed by the difference storing portion 45 corresponds to adjusting means. Process at S220 executed by the difference storing portion 45 corresponds to first adjustment value determining means. Process at S230 and S240 executed by the difference storing portion 45 corresponds to second adjustment value determining means.

Other Embodiment

In the above embodiment, the estimated angle pulse signal generating portion 43 obtains the estimated pulse width ΔT based only on duration T of a latest one cycle (interval T of generating the Z-phase signals) as shown in FIG. 5. For example, the estimated pulse width ΔT corresponds to time required for the motor 1 to make unit angle rotation. However, in the computation of the estimated pulse width ΔT, the rotational speed change of the motor 1 may be additionally considered in order to effectively obtain a further accurate angle data ch.

For example, the estimated angle pulse signal generating portion 43 may compute an estimated value Tp for the duration of the next one cycle based on the two durations of the latest two cycles. More specifically, duration Tb of one cycle is currently measured, and duration Ta of one cycle is previously measured. The previous duration Ta is subtracted from the current duration Tb to obtain a subtraction result (=Tb−Ta). Then, the subtraction result is added to the current duration Tb to obtain a time (=2×Tb−Ta). Thus, in summary, the estimated value Tp for the duration of the next one cycle is computed by the following equation.

$$Tp = 2 \times Tb - Ta$$

Then, the estimated value Tp for one cycle duration is divided by the resolution R to obtain an estimated pulse width ΔT based on the method described in FIG. 6, for example.

$$\Delta T = Tp/R = (2 \times Tb - Ta)/R$$

In other words, in the above, "Tb−Ta" is a value (speed change component) quantitatively indicating a speed change of the motor 1. When the speed change component is considered with the Tb, the estimated value Tp of one cycle duration is obtainable under consideration of the acceleration and deceleration of the motor 1. Thus, by obtaining the estimated pulse width ΔT based on the estimated value Tp, it is possible to obtain highly reliable estimated angle (the estimated count value Kp) accordingly to the operational state despite of the acceleration and deceleration. Thereby, it is possible to further accurate angle data φ.

Although embodiments of the present disclosure are described as above, the present disclosure is not limited to the above embodiments, and thereby it is possible to embody the present disclosure in various forms provided that the various embodiments do not deviate from gist of the disclosure.

For example, the respective angular sections of the above embodiment do not have to be separated by intervals of 45 degrees. However, the respective angular sections may be separated by intervals of other degrees, such as a divisor of 360 degrees. For example, the divisor may be equal to or more than 2 degrees and less than 180 degrees, such as 30 degrees, 60 degrees, 90 degrees, and 120 degrees. Furthermore, the angular sections do not have to be separated by regular intervals of a certain angle. When the respective angular sections are not separated by regular intervals, the value of the first difference a8 at 360 degrees may be divided into multiple values based on the angular occupancy of the each angular section within the total angular width of one cycle. Then, each of the divided values is subtracted from the second difference of the corresponding angular section. For example, when the representative angles are set to three angles of "90 degrees, 270 degrees, and 360 degrees" in a condition, where the first difference a8 at 360 degrees is "−16", the value (−16) of the first difference a8 is divided based on the angular occupancy ratio (1:2:1) of the respective angular sections defined between the representative angles. Thus, the first difference a8 is divided into "−4, −8, and −4". Thus, −4 is subtracted from the second difference of the angular section defined from 0 to 90 degrees. Also, −8 is subtracted from the second difference of the angular section defined from 90 to 270 degrees. Similarly, −4 is subtracted from the second difference of the angular section defined from 270 to 360 degrees.

The first difference a8 at 360 degrees coincides with the total sum of the second differences b1 to b8 of the respective angular sections. As a result, the total sum of the second differences b1 to b8 may be used as the value of the first difference a8 in the distribution rule table in FIG. 9 in the determination of the adjustment values c1 to c8 for respective angular sections during the procedure (2) at S160 in FIG. 1. The above makes the same result with the case of using the value of the first difference a8 for determination. Also, the first difference a8 has been already stored before executing the procedure (2) for determining the adjustment values c1 to c8, as described above. As a result, by using the stored first difference a8 in the procedure (2), it is possible to eliminate the additional process of making the total sum of the second differences b1 to b8.

Alternatively, for example, the value made by "the actual count value Kr—the estimated count value Kp" may be used as the first difference. Note that in the above alternative case, the signs for all of the first differences a1 to a8, the second differences b1 to b8, and the learning values d1 to d8 become opposite from the above embodiments. Thus, in order to make the same computation result with the above embodiments, the correction amount computing portion 46 outputs the correction amount of 2 based on the output ratio in accordance with the absolute value of the learning value when the learning value is negative. In contrast, when the learning value is positive, the correction amount computing portion 46 outputs the correction amount of 0 based on the output ratio in accordance with the value of the learning value.

First Modification

Figure 20:
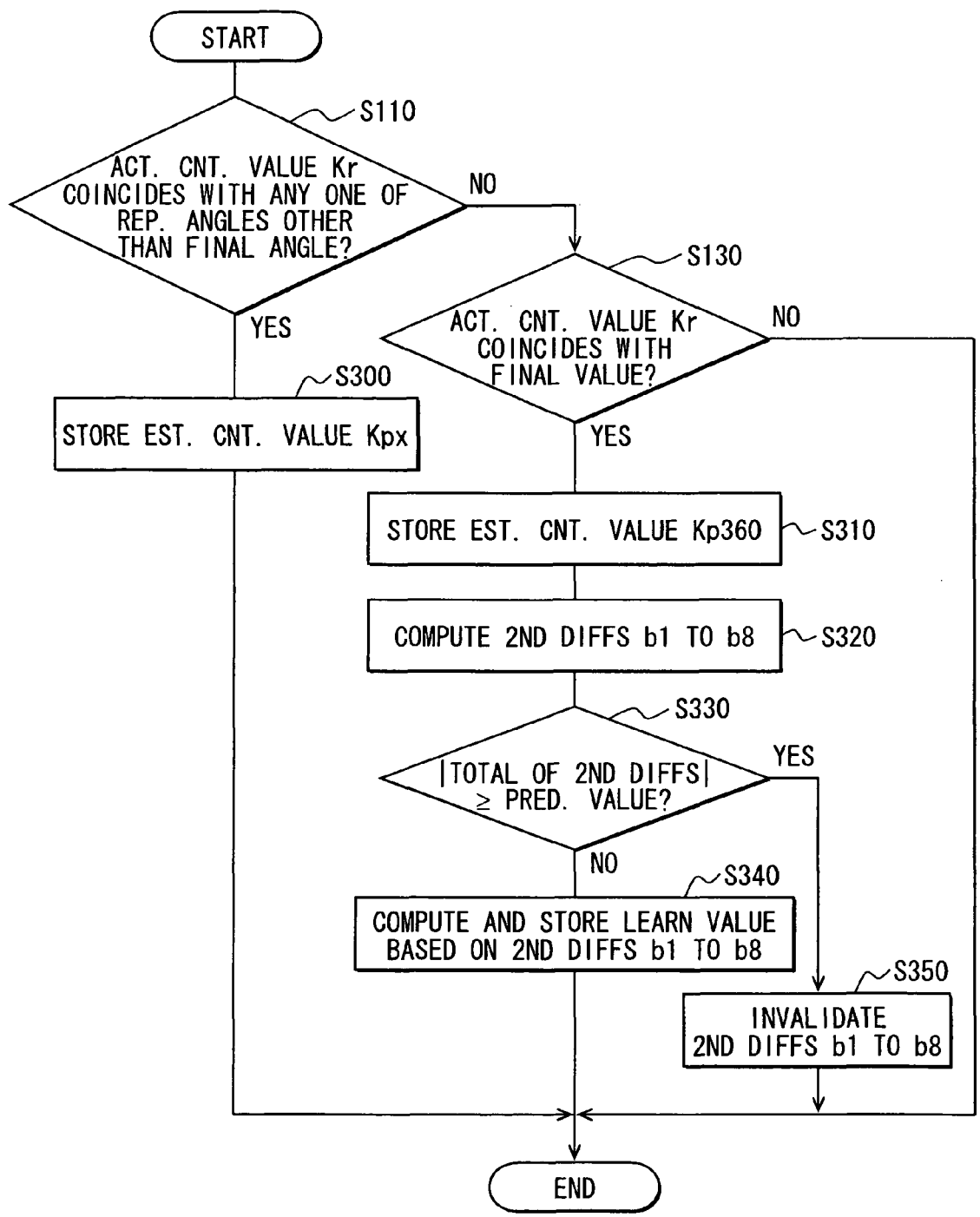
FIG. 20 is a flow chart illustrating a learning process executed by the difference storing portion according to the first modification of the present disclosure.

In the first embodiment, the first differences a1 to a8 are computed for respective representative angles, and the second differences b1 to b8 are computed based on the first differences a1 to a8. However, the second differences b1 to b8 may be alternatively computed directly based on the estimated count values Kp for the respective representative angles. Also, the adjustment values for adjusting the second differences b1 to b8 may be alternatively computed based on the second differences b1 to b8. A modification will be described with reference to FIGS. 19A, 19B, and 20, in which the second differences b1 to b8 are computed based on the estimated count values Kp, and the adjustment values are determined based on the second differences b1 to b8.

In the present modification, as shown in the first line in the table of FIG. 19A, the representative angles includes eight angles separated by intervals of 45 degrees, such as 45 degrees, 90 degrees, 135 degrees, 180 degrees, 225 degrees, 270 degrees, 315 degrees, 360 degrees. At S110, it is determined whether the actual count value Kr is a value that corresponds to any one of the representative angles (45 degrees, 90 degrees, 135 degrees, 180 degrees, 225 degrees, 270 degrees, 315 degrees) other than final angle (360 degrees). In other words, it is determined whether the actual detected angle indicated by the actual count value Kr is any one of the representative angles other than the final angle. Note that in the present modification, 360 degrees serves as the final angle, which corresponds to an angle when the actual count value Kr indicates the final value (4095) immediately before returning to the initial value (0).

When it is determined at S110 that the actual count value Kr is the value that corresponds to the representative angle other than 360 degrees, control proceeds to S300.

At S300, the value of the "estimated count value Kp" at the time is stored in the memory 45a serving as the storage part of the difference storing portion 45 in association with the corresponding representative angle. Then, the learning process is ended. Note that the estimated count value Kp indicates a value when the actual count value Kr coincides with the representative angle.

More specifically, as shown in the third line of the table in FIG. 19A, the memory 45a includes an estimated count value storage table, in which the estimated count value Kp of each of the eight representative angles of the one cycle (one rotation period) of the resolver 13 is stored in association with the respective representative angle. For example, the estimated count values Kp of the one cycle include the estimated count values Kp45, Kp90, Kp135, Kp180, Kp225, Kp270, Kp315, Kp360 denoted by the number of the representative angles. In a case, where the actual count value Kr changes from 0 to 4095 while the actual detected angle changes from 0 degrees to 360 degrees, the actual count value Kr at the representative angle of 45 degrees indicates 511. Thus, Kp45 is the estimated count value Kp when the representative angle is 45 degrees (or when the actual count value Kr indicates 511). At S300, the obtained estimated count value Kp is stored in a corresponding storage region (corresponding cell) for the estimated count value Kp in the estimated count value storage table (see the third line in the table of FIG. 19A). In the above, the corresponding storage region is related to the representative angle, which the current actual detected angle indicates.

In contrast, when it is determined at S110 that the actual count value Kr is the value different from the representative angle other than 360 degrees, control proceeds to S130, where it is determined whether the actual count value Kr is 4095 that is the final value. In other words, it is determined whether the actual detected angle indicated by the actual count value Kr is 360 degrees.

When the actual count value Kr is not 4095, the learning process is ended. When the actual count value Kr is 4095, control proceeds to S310. At S310, the estimated count value Kp360 at the time when the representative angle is 360 degrees, or when the actual count value Kr is 4095, is stored in the corresponding storage region of the estimated count values Kp in the estimated count value storage table for the representative angle 360 degrees, which the current actual detected angle indicates. Then, control proceeds to S320, where the estimated count values Kp stored in the estimated count value storage table are used for computing the second differences b1 to b8 of the respective representative angle. For example, as shown in FIG. 19A, the second difference b2 at the representative angle of 90 degrees is computed by the following equation.

$$b2 = (Kp90 - Kp45) - (Kr90 - Kr45)$$

Thus, the increase amount (Kr90−Kr45) of the actual count value Kr in the angular section of 45 degrees (from 45 to 90 degrees) is subtracted from the increase amount (Kp90−Kp45) of the estimated count value Kp in the angular section of 45 degrees. The above increase amount within the angular section of 45 degrees will be detailed below. The value of the estimated count value Kp45 for the representative angle of 45 degrees is subtracted from the value of the estimated count value Kp90 for the representative angle of 90 degrees to compute the increase amount (Kp90−Kp45) of the estimated count value. Also, the value of the actual count value Kr45 for the representative angle of 45 degrees is subtracted from the value of the actual count value Kr90 for the representative angle of 90 degrees to compute the increase mount (Kr90−Kr45) of the actual count value. It should be noted that when the representative angles are separated by the regular intervals, the actual count value increase amounts of the representative angles are constant (same with each other). Specifically, the actual count value increase amount for the representative angle of 90 degrees is 512 computed by subtracting the actual count value Kr45 (=511) from the actual count value Kr90 (=1023), and the actual count value increase amount for the representative angle of 135 degrees is also 512. Thus, the actual count value increase amount corresponds to a value that is computed by dividing a value of (the maximum value of the actual count value +1) by the number of the representative angles (for example, (4095+1)/8=512). As a result, the second difference for the certain representative angle is computed by subtracting (a) the previous estimated count value at the preceding representative angle and (b) the above increase amount constant (=512) of the actual count value from the current estimated count value for the representative angle.

It should be noted that in a case of computing the second difference b1 for the first representative angle (or the minimum representative angle), such as the representative angle of 45 degrees, the second difference b1 is obtainable by subtracting the actual count value Kr45 (=511) from the estimated count value Kp45.

It should be noted that the computation method of the second differences described with reference to FIG. 19A produces the second differences identical with the second differences obtained through the computation method shown in FIG. 8A.

Then, it is determined at S330 whether the absolute value of the total sum of the second differences b1 to b8 computed at S320 is equal to or greater than the predetermined value. When the absolute value is not equal to or greater than the predetermined value, control proceeds to S340. Note that in the present modification, for example, the predetermined value used in the determination at S330 is a value (=4096× 10/360) that corresponds to 10 degrees.

At S340, the learning values used for obtaining the angle data φ, which is the corrected actual count value Kr, are computed based on the second differences b1 to b8 stored in the second difference storage table during the current one cycle, and the computed learning values are stored in the memory 45a.

At S340, firstly, adjustment values for adjusting the second differences b1 to b8 stored in the second difference storage table at S320 in order to compute the learning values are determined based on the distribution rule shown in FIG. 9 in accordance with the total sum of the second differences b1 to b8 (b1+b2+b3+b4+b5+b6+b7+b8). It should be noted that the total value of the second differences b1 to b8 (=b1+b2+b3+b4+b5+b6+b7+b8) is equal to the first difference a8 shown in FIG. 8A. Thereby, in the determination of the adjustment value c1 to c8 by using the distribution rule of FIG. 9, the first difference a8 in FIG. 9 used in the above embodiments is replaced by the total value of the second differences b1 to b8 in the present modification.

Furthermore, similar to the first embodiment, the adjustment value cx stored in the adjustment value storage table for each angular section is subtracted from the corresponding second difference bx (x indicates an integer from 1 to 8) stored in the second difference storage table in order to compute the learning value dx (=bx−cx) of the angular section. Then, the computed learning values d1 to d8 for the respective angular sections are stored in the learning value storage table of the memory 45a as shown in the seventh line of the table in FIG. 19A.

Thereby, for example, if the estimated count values are the same with the values in the third line in the table of FIG. 19B, the second differences b1 to b8 for the respective angular sections correspond to the values shown in the fourth lines in FIG. 19B, and thereby the first difference a8 at the actual detected angles of 360 degrees becomes the value shown in the fifth line in FIG. 19B. Thus, the adjustment values c1 to c8 for the second differences b1 to b8 become the values shown in the sixth line in FIG. 19B. More specifically, because a8 (total sum of the second differences b1 to b8) is equal to +2, the adjustment values c3 and c6 are set to +1, and other adjustment values are set to 0 based on the rule in the third line in FIG. 9. Furthermore, the learning values d1 to d8 for the respective angular sections become the values shown in the seventh line in FIG. 19B.

When the process of S340 is completed, the learning process is ended.

In contrast, when it is determined at S330 that the absolute value of the total value of the second differences b1 to b8 computed at S320 is equal to or greater than the predetermined value, control proceeds to S350, the second differences b1 to b8 stored in the second difference storage table during the current one cycle are invalidated. In practice, the execution of the process in S340 is prohibited such that the update of the learning values d1 to d8 by using the second differences b1 to b8 of the current one cycle is prohibited. Then, the learning process is ended. Thus, the second differences b1 to b8 are obtainable based on the estimated count values Kp of the respective representative angles. Also, it is possible to determine the adjustment values based on the total value of the second differences b1 to b8. It should be noted that the second differences in the third line in FIG. 8B are equal to the second differences in the fourth line in FIG. 19B. Also, the first difference a8 in FIG. 8B is equal to the total sum of the second differences b1 to b8 shown in FIG. 19B. As a result, the adjustment values shown in the fourth line in FIG. 8B are equal to the adjustment values shown in the sixth lines in FIG. 19B. Also, the learning values in the fifth line in FIG. 8B are equal to the learning values show in the seventh line in FIG. 19B.

Second Modification

In the second modification, the second differences b1 to b8 are computed based on the estimated count values Kp of the representative angles, and the adjustment values are determined based on the first difference a8. In the present modification, the advantages similar to the above embodiments and modification are achievable. For example, the computation methods shown in FIGS. 8A and 8B, FIGS. 19A and 19B may be combined as required.

Figure 21:
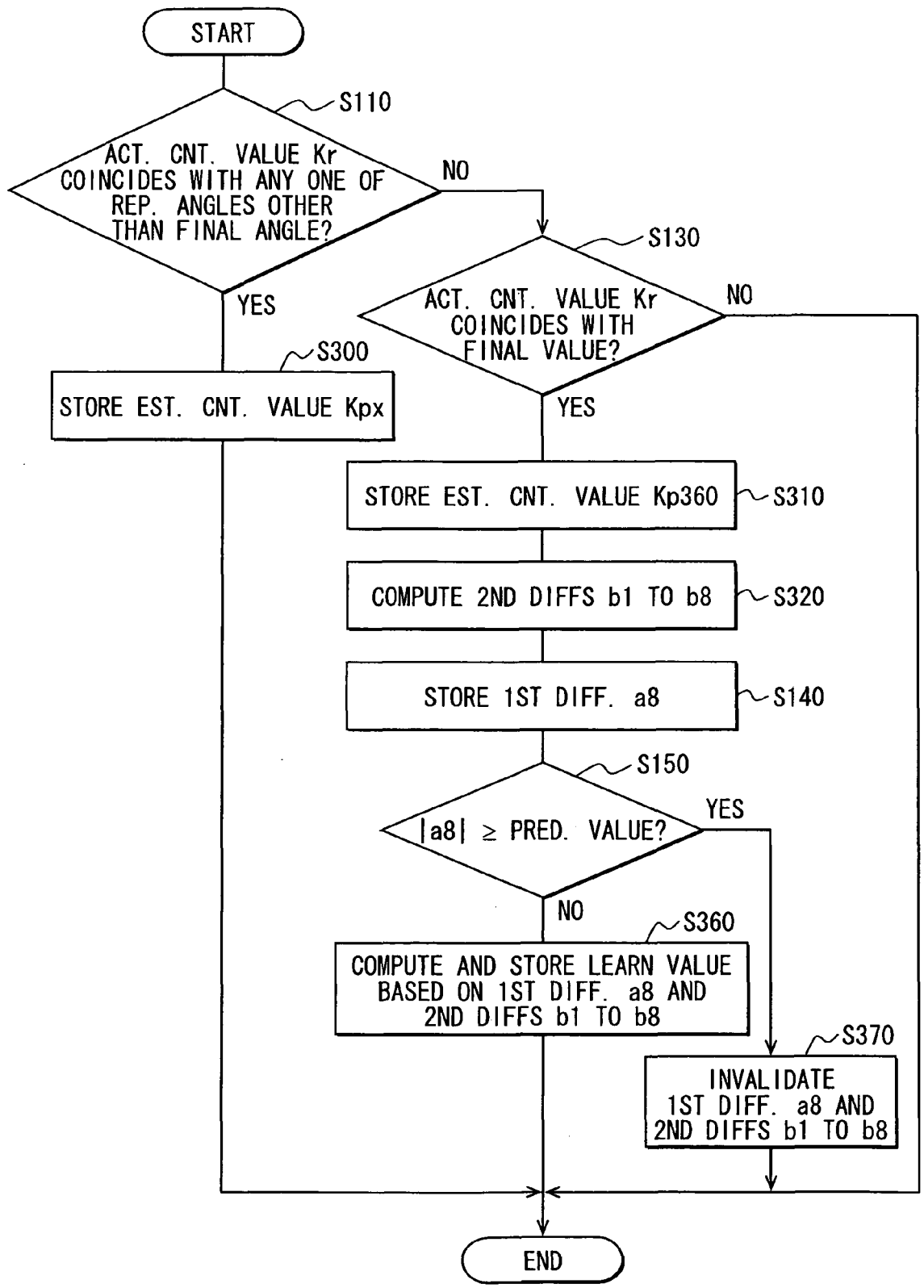
FIG. 21 is a flow chart illustrating a learning process executed by the difference storing portion according to the second modification of the present disclosure.

The process of the present modification will be described with reference to FIG. 21. In FIG. 21, steps of S110, S300, S130, S310, and S320 are similar to those in FIG. 20. Thus, the processes at and after S320 are different from that in FIG. 20.

When the process at S320 is finished, the second differences b1 to b8 have been stored in the second difference table. Thus, control proceeds to S140, where the first difference a8 is computed by subtracting the actual count value Kr from, the estimated count value Kp, and the computed first difference a8 is stored in the predetermined storage region of the memory. In other words, the estimated count value Kp360 at the time is detected when the actual detected angle is 360 degrees (or when the actual count value Kr is 4095), and the actual count value Kr360 is subtracted from the detected estimated count value Kp360 to compute the first difference a8.

Thus, the first difference a8 indicates the advancing amount of the estimated count value Kp (estimated angle information) relative to the actual count value Kr (actual detected angle information) when the actual count value Kr is the final value that corresponds to 360 degrees.

Then, control proceeds to S150, where it is determined whether the absolute value of the first difference a8 at 360 degrees currently computed at S140 is equal to or greater than the predetermined value similar to S150 in FIG. 7. When the absolute value of the first difference a8 is not equal to or greater than the predetermined value, control proceeds to S360. Note that in the present modification, the predetermined value used in the determination at S150 is a value (=4096×10/360) that corresponds to 10 degrees, for example.

At S360, the learning values for obtaining the angle data φ, which is the corrected actual count values Kr, are computed based on the first difference a8 and the second differences b1 to b8 stored in the storage tables during the current one cycle. Then, the learning values are stored in the memory 45a.

At S360, firstly, the adjustment values for adjusting the second differences b1 to b8 stored in the second difference storage table at S320 are determined based on the distribution rule in FIG. 9 in accordance with the first difference a8. Then, similar to the first embodiment, the learning values d1 to d8 of the respective angular sections are determined based on the second differences b1 to b8 and the adjustment values c1 to c8.

In contrast, when it is determined at S150 that the absolute value of the first difference a8 computed at S140 during the current one cycle is equal to or greater than the predetermined value, control proceeds to S370, where the second differences b1 to b8 and the first difference a8 stored in the storage tables during the current one cycle are invalidated.

As shown in FIG. 21, the second differences b1 to b8 are computed based on the estimated count values Kp of the respective representative angles, and the adjustment values are determined based on the first difference a8. In the above case, the total value of the second differences shown in the fifth line of the tables in FIG. 19A and FIG. 19B is replaced by the first difference a8. The learning values d1 to d8 obtained through the process shown in FIG. 21 are identical with the learning values shown in the tables of FIG. 8B and FIG. 19B.

In the above embodiments and the modifications, the unit rotation angle information of an error correction target received by the error correcting portion 17 corresponds to pulse signals, such as the A-phase signal PSa and the B-phase signal PSb from the RD converting portion 16. Then, the error caused by manufacturing variation of the resolver 13 is corrected based on each of the A-phase signal PSa and the B-phase signal PSb. In the above embodiments and the modifications, in the error correcting portion 17, the actual count value Kr corresponds to the angle data that serves as the actual detected angle information of the error correction target, which information is computed based on the unit rotation angle information. Thus, the error correcting portion 17 may directly receive the actual detected angle information, of the error correction target instead of the unit rotation angle information.

If the error correcting portion 17 receives the angle data that indicates the rotation angle, (or if the error correcting portion 17 directly receives the actual count value Kr), the error correcting portion 17 does not require the exclusive-OR computing portion 41 and the actual pulse counter 42. Also, in the above case, the timing, at which the error correcting portion 17 receives certain angle data that indicates the initial value (in general, 0) or a starting point of the angle detection, corresponds to the output timing of the Z-phase signal PSz. In other words, the initial value of the angle data corresponds to the reference angle information.

Also, rotation detecting means is not limited to the resolver 13 and the RD converting portion 16. For example, rotation detecting means may alternatively be a known incremental encoder a known absolute encoder. Also, the detection means may alternatively be a sensor including a vertical Hall element and a magnetic resistance element (MRE) shown in JP-A-2008-185406 and US-A-2009-0295375, which are incorporated by reference in this embodiment.

Figure 22A:
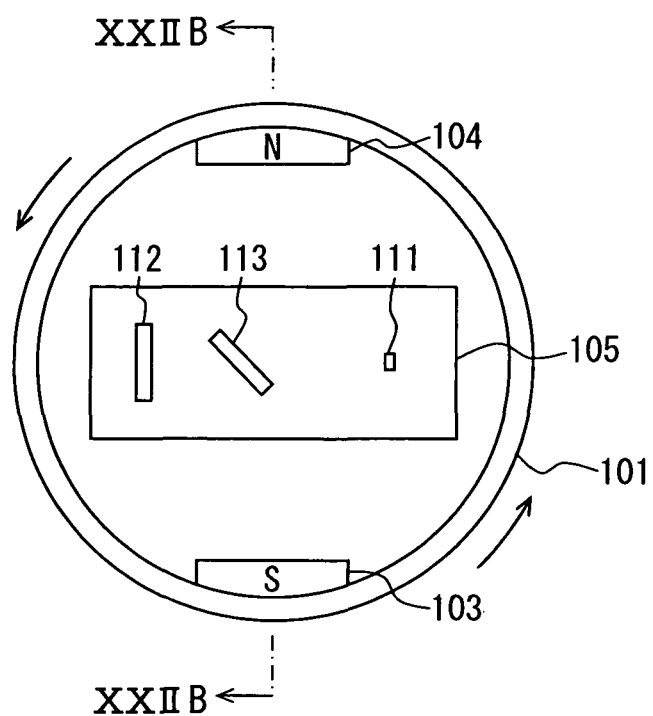
FIG. 22A is diagram illustrating a rotation sensor having a Hall element and magnetic resistance elements.
Figure 22B:
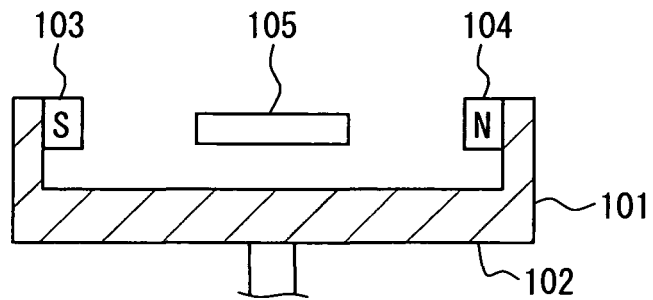
FIG. 22B is a cross sectional view of the rotation sensor taken along line XXIIB-XXIIB of FIG. 22A.

The alternative rotation detecting means made of a vertical Hall element 111 and magnetic resistance elements 112, 113 will be described with reference to FIG. 22A and FIG. 22B. FIG. 22A is diagram illustrating a rotation sensor having the Hall element 111 and the magnetic resistance elements 112, 113, and FIG. 22B is a cross sectional view of the rotation sensor taken along line XXIIB-XXIIB of FIG. 22A. A magnet rotor 101 of the rotation detecting means includes a rotor body 102 having a cylindrical cup shape. The rotor body 102 receives therein an S-pole permanent magnet 103 and an N-pole permanent magnet 104. A semiconductor chip 105 is provided between the S-pole permanent magnet 103 and the N-pole permanent magnet 104 within the rotor body 102. Upon the rotation of the magnet rotor 101, the S-pole permanent magnet 103 and the N-pole permanent magnet 104 rotate about the semiconductor chip 105 in a state, where the S-pole permanent magnet 103 is opposed to the N-pole permanent magnet 104.

The semiconductor chip 105 is provided with the vertical Hall element 111, and the semiconductor chip 105 detects a magnetic field that is parallel to a surface of the semiconductor chip 105. More specifically, the semiconductor chip 105 detects the magnetic field based on Hall effect generated by the rotation of the S-pole permanent magnet 103 and the N-pole permanent magnet 104. Also, the semiconductor chip 105 is provided with the magnetic resistance elements 112, 113 formed thereon, and the magnetic resistance elements 112, 113 has a resistance value changeable based on the magnetic field in parallel with the surface of the semiconductor chip 105.

In the above configuration, the output signal of the vertical Hall element 111 and the output signals of the magnetic resistance elements 112, 113 are used for detection of the rotation angle.

Also, in the above embodiments, the rotation angle detecting portion 35 is provided separately from the microcomputer 37. However, the error correcting portion 17 of the rotation angle detecting portion 35 may be alternatively included in the microcomputer 37, for example. Also, both of the error correcting portion 17 and the RD converting portion 16 (or the entirety of the rotation angle detecting portion 35) may be alternatively included in the microcomputer 37.

Also, in the above embodiments, the present disclosure is applied to the electric vehicle. However, application of the present disclosure to the electric vehicle is merely one example, and thereby the present disclosure is applicable to any vehicle having a motor for a drive power source, such as a hybrid vehicle or an electric train (railway vehicle), for example. The hybrid vehicle typically has an internal combustion engine and a motor both for the drive power source, and the electric train has a motor for the drive power source.

Also, in the second embodiment, the adjustment value cx (x is an integer from 1 to 8) and the acceleration adjustment value ex are obtained separately from each other. However, alternatively, the value that corresponds to "−cx+ex" in equation 3 may be obtained as an alternative adjustment value from both of the first difference a8 and the time change rate RATE or solely from the time change rate RATE by using another map. Thus, the alternative adjustment value (=−cx+ex) is obtained based on the map, and is added to the second difference bx to compute the learning value dx.

In the above embodiments, the resolution of the RD converting portion 16 (resolution for the angle detection) is 12 bits or 11 bits. However, the resolution is not limited to 11 bits or 12 bits. Alternatively, the resolution is may be any bits of integer, such as 4 bits, 5 bits, 6 bits, 7 bits, 8 bits, 9 bits, 10 bits, 13 bits, 14 bits, 15 bits, 16 bits, 17 bits, 18 bits, 19 bits, 20 bits, 21 bits, 22 bits, 23 bits, 24 bits, 25 bits, 26 bits, 27 bits, 28 bits, 29 bits, 30 bits, 31 bits, 32 bits, 64 bits. Also, the above resolution may be combined with the integer angular ratio. For example, the resolver 13 having the angular ratio of 3 and the RD converting portion 16 having the resolution of 16 bits may be combined together.

In the above embodiments, as the best mode, the estimated pulse width is computed as a time computed by dividing, by the resolution of the resolver 13, an actual one cycle duration required for the resolver 13 to make one rotation in the preceding cycle. However, alternatively, the estimated pulse width may be computed in a different method. For example, the duration of two cycles between (a) the current edge rising timing and (b) the two preceding edge rising timing of the pulse of the Z-phase signal are measured, and the measured duration of the two cycles may alternatively be used for the computation of the estimated pulse width. In other words, the estimated pulse width may be computed based on the duration of "n" cycles (n is a positive integer including one).

In the embodiment, the rule of determination of the adjustment value is described with reference to FIG. 9. However, the rule for determining the adjustment value is not limited to the table in FIG. 9. However, any rule may be applied provided that the first difference at the angular section of the final angle is distributed as uniformly as possible. Specifically, when the value of the first difference for the angular section having the final angle is less than the number of angular sections (the angular section number), the rule of FIG. 9 is not required provided that the adjustment value of each angular section is set 1 or 0. For example, the adjustment value may be provided, with high priority, to the angular section including the angle that corresponds to the quotient computed through the division of the maximum representative angle (or the final angle) by n. In the above example, n is a positive integer equal to or greater than 1. Furthermore, n corresponds to all of the positive integers equal to or less than the absolute value of the first difference when the absolute value of the first difference computed at the final angle is equal to or less than the angular section number. In contrast, when the absolute value of the first difference computed at the final angle is larger than the angular section number, ns for the cases, in which the absolute value of the first difference computed at the final angle is equal to or less than the angular section number, are combined to determine the distribution of the first difference.

More specifically, the example case, where the angular section number is 3, will be described. In the above example case, when the absolute value of the first difference computed at the final angle is 1, n=1. When the absolute value of first difference is 2, n=1 and 2. When the absolute value of first difference is 3, n=1, 2, and 3. When the absolute value of first difference is 4, n for the case for the absolute value of first difference of 1 and n for the other case for the absolute value of first difference of 3 are combined together to determine the distribution.

One explanatory example will be described below with specific example. The resolver 13 is rotatable within an angular range of 0 degree to 360 degrees. In the explanatory example, the angular range is equally divided into three sections, such as a section having an angular range of 1 to 120 degrees, a section having an angular range of 121 to 240 degrees, and a section having an angular range of 241 to 360 degrees. In the above case, if the first difference computed at 360 degrees (final angle) is +1, the computation of 360/1 provides the quotient of 360. Thus the adjustment value of the angular section of 241 to 360 degrees, which includes 360 degrees (the quotient), is set to +1, and the adjustment values of the other angular sections are set to 0. When the first difference computed at the final angle is +2, the quotient of 360 is obtained by the computation of 360/1 for the case of n=1, the quotient of 180 is obtained by the computation of 360/2 for the case of n=2. Thus, the adjustment value for the angular section of 121 to 240 degrees, which includes the quotient of 180 degrees, is set to +1. Also, the adjustment value for the angular section of 241 to 360 degrees, which includes the quotient of 360 degrees, is set to +1. And the adjustment value of another angular section is set to 0. When the first difference computed at the final angle is +3, the quotient of 360 is obtained by the computation of 360/1 for the case of n=1. Also, the quotient of 180 is obtained by the computation of 360/2 for the case of n=2. Furthermore, the quotient of 120 is obtained by the computation of 360/3 for the case of n=3. Thus, the adjustment values of the angular sections of 1 to 120 degrees, 121 to 240 degrees, and 241 to 360 degrees are all set to +1. In another example, when the first difference computed at the final angle is +4, the absolute value of the first difference (+4) computed at the final angle exceeds the angular section number (+3). Thus, the adjustment value for the case, where the first difference at the final angle is +3, and the adjustment value for the other case, where the first difference at the final angle is +1, are combined together. Thus, the adjustment value for the angular section of 241 to 360 degrees that includes 360 degrees +2, and the adjustment values for the other angular sections are set to +1.

In the above embodiment, the RD converting portion 16 is provided within the ECU 7. However, the RD converting portion 16 may be provided to the resolver 13 instead of being provided to the ECU 7. Also, the RD converting portion 16 may be provided outside the ECU 7 separately from the resolver 13. In the above case, the ECU 7 receives three signals, such as the Z-phase signal, the A-phase signal PSa, and the B-phase signal PSb.

In the above embodiment, the exclusive-OR computing portion 41 and the actual pulse counter 42 are provided within the ECU 7. However, both of the exclusive-OR computing portion 41 and the actual pulse counter 42 may be alternatively provided to the resolver 13 outside the ECU 7. Alternatively, only the exclusive-OR computing portion 41 is provided to the resolver 13. Further alternatively, the exclusive-OR computing portion 41 may be provided separately from both of the ECU 7 and the resolver 13. When the exclusive-OR computing portion 41 is provided to the resolver 13 outside the ECU 7, the ECU 7 is configured to directly receive the actual pulse Pr. If both of the exclusive-OR computing portion 41 and the actual pulse counter 42 are provided to the resolver 13 outside the ECU 7, the ECU 7 is configured to directly receive the actual count value.

The function of the error correcting portion 17 may be internally achieved by the microcomputer 37. Alternatively, the function of the error correcting portion 17 may be achieved by a microcomputer, which is provided separately from the microcomputer 37, or by a circuit, which is provided separately from the microcomputer 37. Also, as above, the part of the function of the error correcting portion 17 may be provided to the resolver 13. Alternatively, the part of the function of the error correcting portion 17 may be provided to a microcomputer different from the microcomputer 37, or to an IC different from the microcomputer 37. More specifically, the corrected count portion 47 may be achieved by the microcomputer 37, or by the other microcomputer other than the microcomputer 37, or by an IC. The correction amount computing portion 46 may be achieved by the microcomputer 37, or by the other microcomputer other than the microcomputer 37, or by an IC. The difference storing portion 45 may be achieved by the microcomputer 37, or by the other microcomputer other than the microcomputer 37, or by an IC. The actual pulse counter 42 may be achieved by the microcomputer 37, or by the other microcomputer other than the microcomputer 37, or by an IC. The estimated pulse counter 44 may be achieved by the microcomputer 37, or by the other microcomputer other than the microcomputer 37, or by an IC. The exclusive-OR computing portion 41 may be achieved by the microcomputer 37, or by the other microcomputer other than the microcomputer 37, or by an IC. The estimated angle pulse signal generating portion 43 may be achieved by the microcomputer 37, or by the other microcomputer other than the microcomputer 37, or by an IC. Also, when the above functions are achieved by the other microcomputer other than the microcomputer 37, or by an IC, the other microcomputer or the IC may be provided within ECU 7. Also, the other microcomputer or the IC may be provided to the resolver 13 instead of being within the ECU 7, or may be provided separately from the ECU 7 and the resolver 13.

Executive instructions (programs) for the procedures executed by the corrected count portion 47, the correction amount computing portion 46, the difference storing portion 45, the actual pulse counter 42, the estimated pulse counter 44, the exclusive-OR computing portion 41, and the estimated angle pulse signal generating portion 43 may be stored within a storage medium of the ECU 37. In the above case, the function of the error correcting portion 17 may be executable by the microcomputer 37 or by a microcomputer other than the microcomputer 37 based on the executive instructions.

Also, if the microcomputer 37 includes a processor and a circuit, which is separate from the processor, and which includes a discrete device, such as a transistor, a diode, the separate circuit may execute the functions of the corrected count portion 47, the correction amount computing portion 46, the difference storing portion 45, the actual pulse counter 42, the estimated pulse counter 44, the exclusive-OR computing portion 41, and the estimated angle pulse signal generating portion 43. It should be noted that when the function of the error correcting portion 17 is executed by the circuit separate from the processor as above, the processor is effectively prohibited from receiving the load in the execution of the function of the error correcting portion 17.

In the above embodiment, the first difference storage table, the second difference storage table, the adjustment value storage table, and the learning value storage table are stored in the memory 45a. However, the first difference storage table, the second difference storage table, the adjustment value storage table, and the learning value storage table may be individually and separately stored in the corresponding memory. Also, some of the first difference storage table, the second difference storage table, the adjustment value storage table, and the learning value storage table may be stored in a single memory. The memory 45a may be provided to the error correcting portion 17 as shown in FIG. 3 provided that the memory 45a is provided within the ECU 7. Alternatively, the memory 45a may be solely provided within the microcomputer 37.

The exclusive-OR computing portion 41 and the actual pulse counter 42 corresponds to actual detected angle computing means. The estimated angle pulse signal generating portion 43 and the estimated pulse counter 44 corresponds to estimated angle computing means. The difference storing portion 45 corresponds to a first difference computing device, a second difference computing device, and an adjusting device. Also, the difference storing portion 45 may correspond to an advance rate difference computing device (or means for an advance rate difference). The estimated angle pulse signal generating portion 43 corresponds to an estimated pulse generator. Also, the difference storing portion 45 corresponds to first difference computing means, second difference computing means, and learning value computing means. The correction amount computing portion 46 and the corrected count portion 47 corresponds to an output processing device. The correcting means 17 corresponds to an error correcting device. The estimated angle pulse signal generating portion 43 corresponds to means for measuring an interval T and means for computing an estimated time $\Delta T$. The estimated pulse counter 44 corresponds to a counter that computes an estimated angle of rotation of the motor 1 based on the reference angle information and the estimated pulse. The exclusive-OR computing portion 41 and the actual pulse counter 42 corresponds to means for outputting actual detected angle information Kr when the motor 1 rotates a constant unit. The corrected count portion 47 corresponds to means for setting a value of the corrected angle information to the initial value when the reference angle information is outputted, and also corresponds to means for increasing the value of the corrected angle information based on a certain value, which corresponds to the unit angle, when the actual detected angle information Kr is outputted.

Note that, as above, because the first difference, the second difference, the first adjustment value, and the second adjustment value may be positive and negative, the second difference may alternatively indicates "the shortage amount of the increase amount of the estimated angle relative to the increase amount of the actual detected angle" instead of "the exceeding amount of the increase amount of the estimated angle relative to the increase amount of the actual detected angle". Also, in the above alternative case, in the correcting process, "the increase amount of the corrected angle information $\phi$ may be decreased by the corresponding adjusted second difference" instead of that "the increase amount of the corrected angle information $\phi$ may be increased by the corresponding adjusted second difference".

What is claimed:

1. A drive motor control apparatus for a vehicle, wherein the vehicle has:
    a motor that provides a drive power of the vehicle; and
    a rotation detecting unit for outputting reference angle information every time the motor rotates a reference angle, the rotation detecting unit outputting actual detected angle information every time the motor rotates a constant unit angle that is smaller than the reference angle, the reference angle information indicating rotation of the motor by the reference angle, the reference angle indicating an angle computed by dividing 360 degrees by a positive integer n, the actual detected angle information indicating an actual detected angle of rotation of the motor measured based on output timing, at which the reference angle information is outputted, wherein the drive motor control apparatus controls energization of the motor by using the reference angle information and the actual detected angle information, the drive motor control apparatus comprising:

a correcting unit for correcting an error of the actual detected angle information in order to output corrected angle information that indicates a corrected angle of rotation of the motor measured based on the output timing of the reference angle information, the correcting unit being configured to control the energization of the motor based on the corrected angle information, wherein the correcting unit includes:

a time estimating unit for measuring duration of one cycle of the reference angle information every time the reference angle information is outputted, the duration being measured between a previous time, at which the reference angle information is previously outputted, and a current time, at which the reference angle information is currently outputted, the time estimating unit computing an estimated time, which is required for the motor to rotate the unit angle in subsequent rotation of the motor, based on the duration;

an angle estimating unit for computing an estimated angle of rotation of the motor, which is measured based on the output timing of the reference angle information, every time the estimated time elapses under an assumption that the motor rotates the unit angle while the estimated time elapses, the angle estimating unit outputting estimated angle information that indicates the estimated angle;

a first difference computing unit for computing one of a plurality of first differences of a plurality of representative angles every time the actual detected angle indicated by the actual detected angle information becomes a corresponding one of the plurality of representative angles during the one cycle of the reference angle information, the plurality of representative angles including a final angle that corresponds to a final value of the actual detected angle, the one of the plurality of first differences indicating an advancing amount of the estimated angle relative to the actual detected angle;

a second difference computing unit for computing a plurality of second differences of a plurality of angular sections based on the plurality of first differences of the plurality of representative angles of the one cycle, one of the plurality of angular sections being defined between an initial value of the actual detected angle at the output timing of the reference angle information and a minimum representative angle of the plurality of representative angles, the other one of the plurality of angular sections being defined between adjacent ones of the plurality of representative angles, each of the plurality of second differences indicates an exceeding amount of an increase amount of the estimated angle relative to an increase amount of the actual detected angle within a corresponding one of the plurality of angular sections, the second difference computing unit storing each of the plurality of second differences of the plurality of angular sections in a storage part in association with the corresponding one of the plurality of angular sections;

an adjusting unit for adjusting the plurality of second differences of the plurality of angular sections of the one cycle, which is stored in the storage part, in accordance with a degree of acceleration and deceleration of the motor; and an output processing unit for executing:

an initialization process for setting a value of the corrected angle information to the initial value when the reference angle information is outputted;

an output updating process for increasing the value of the corrected angle information by a certain value, which corresponds to the unit angle, based on the output timing of the reference angle information every time the actual detected angle information is outputted; and a correcting process for changing the certain value used in the output updating process such that an increase amount of the value of the corrected angle information, which is increased while the actual detected angle indicated by the actual detected angle information changes within each of the plurality of angular sections, is increased by a corresponding one of the plurality of second differences, which is adjusted by the adjusting unit.

2. The drive motor control apparatus according to claim 1, wherein:

the adjusting unit includes a first adjustment value determining unit for determining a plurality of first adjustment values for adjusting the plurality of second differences, which is stored in the storage part by the second difference computing unit, based on one of the plurality of first differences computed at the final angle by the first difference computing unit during the one cycle, during which the plurality of second differences is computed, the first adjustment value determining unit determining the plurality of first adjustment values such that a total sum of the plurality of first adjustment values coincides with the one of the plurality of first differences computed at the final angle; and the adjusting unit adjusts the plurality of second differences of the one cycle stored in the storage part by the second difference computing unit such that each of the plurality of second differences is reduced by a corresponding one of the plurality of first adjustment values.

3. The drive motor control apparatus according to claim 2, wherein:

the adjusting unit includes a second adjustment value determining unit for detecting the degree of the acceleration and deceleration of the motor based on the duration of the one cycle and based on the other duration of a preceding one cycle measured between a further previous time, at which the reference angle information is outputted, and the previous time;

the second adjustment value determining unit determines a plurality of second adjustment values for adjusting the plurality of second differences of the one cycle, which is stored in the storage part by the second difference computing unit, in accordance with the detected degree of the acceleration and deceleration;

when the detected degree of the acceleration and deceleration indicates acceleration, the second adjustment value determining unit determines each of the plurality of second adjustment values such that the following conditions are satisfied:

a total sum of the plurality of second adjustment values is 0; and a first one of the plurality of second adjustment values of a first one of the plurality of representative angles indicates a value larger than a value of a second one of the plurality of second adjustment values of a second one of the plurality of representative angles, the first one of the plurality of representative angles being larger than the second one of the plurality of representative angles;

when the detected degree of the acceleration and deceleration indicates deceleration, the second adjustment value determining unit determines each of the plurality of second adjustment values such that the following conditions are satisfied:

the total sum of the plurality of second adjustment values is 0; and the first one of the plurality of second adjustment values indicates the value smaller than the value of the second one of the plurality of second adjustment values;

the second adjustment value determining unit determines each of the plurality of second adjustment values such that a total sum of an absolute value of each of the plurality of second adjustment values is increased with an increase of the detected degree acceleration and deceleration; and the adjusting unit adjusts the plurality of second differences of the one cycle stored in the storage part by the second difference computing unit such that each of the plurality of second differences is reduced by a corresponding one of the plurality of first adjustment values and is increased by a corresponding one of the plurality of second adjustment values.

4. The drive motor control apparatus according to claim 2, wherein:

the first adjustment value determining unit divides the one of the plurality of first differences computed at the final angle in N number of values when an absolute value of the one of the plurality of first differences computed at the final angle is greater than a value that corresponds to the unit angle; and the first adjustment value determining unit causes each of the N number of values to be included by the plurality of first adjustment values, N being an integer equal to or greater than 2.

5. The drive motor control apparatus according to claim 1, further comprising:

an update prohibiting unit for invalidating the plurality of first differences, which is computed by the first difference computing unit during the one cycle if an absolute value of one of the plurality of first differences, which is computed by the first difference computing unit when the actual detected angle becomes the final angle, is equal to or greater than a predetermined value, in order to prohibit update of the plurality of second differences of the plurality of angular sections, which is stored in the storage part and used in the correcting process by the output processing unit.

6. The drive motor control apparatus according to claim 1, wherein:

the time estimating unit subtracts the other duration of a preceding one cycle, which precedes the one cycle, from the duration of the one cycle;

the time estimating unit adds the subtraction result to the duration to obtain an estimated value;

the time estimating unit computes the estimated time, which is required for the motor to rotate the unit angle, based on the estimated value.

7. The drive motor control apparatus according to claim 1, wherein:

the degree of the acceleration and deceleration of the motor corresponds to a total sum of the plurality of second differences of the one cycle stored in the storage part; and the adjusting unit adjusts the plurality of second differences such that the total sum of the plurality of second differences becomes 0.

8. A motor control system for a vehicle comprising:

a motor that provides a drive power;

a rotation sensor configured to output reference angle information every time the motor rotates a reference angle, the rotation sensor being configured to output actual detected angle information every time the motor rotates a constant unit angle that is smaller than the reference angle, the actual detected angle information indicating an actual detected angle of rotation of the motor measured based on output timing, at which the reference angle information is outputted; and a controller coupled to the rotation sensor and the motor, the controller receiving the actual detected angle information and the reference angle information from the rotation sensor, the controller outputting a control command of controlling energization to the motor, wherein the controller includes:

an estimated pulse generator that is coupled to the rotation sensor, the estimated pulse generator measuring duration of one cycle of the reference angle information every time the reference angle information is outputted, the duration being measured between a previous time, at which the referenced angle information is previously outputted, and a current time, at which the reference angle information is currently outputted, the estimated pulse generator computing an estimated time, which is required for the motor to rotate the unit angle in subsequent rotation of the motor, based on the duration, the estimated pulse generator generating an estimated pulse based on the estimated time;

a counter coupled to the rotation sensor and the estimated pulse generator, the counter computing an estimated angle of rotation of the motor, which is measured based on the output timing of the reference angle information, by counting the estimated pulse every time the counter receives the estimated pulse under an assumption that the motor rotates the unit angle while the estimated time elapses, the counter outputting estimated angle information that indicates the estimated angle;

a memory that stores therein a plurality of first differences of a plurality of representative angles, one of the plurality of first differences of the plurality of representative angles being stored every time the actual detected angle indicated by the actual detected angle information becomes a corresponding one of the plurality of representative angles during the one cycle of the reference angle information, the plurality of representative angles including a final angle that corresponds to a final value of the actual detected angle, the one of the plurality of first differences indicating an advance amount of the estimated angle relative to the actual detected angle, wherein:

the memory further stores therein a plurality of second differences of a plurality of angular sections, the plurality of second differences being computed based on the plurality of first differences of the plurality of representative angles stored in the memory, one of the plurality of angular sections being defined between an initial value of the actual detected angle at the output timing of the reference angle information and a minimum representative angle of the plurality of representative angles, the other one the plurality of angular sections being defined between adjacent ones of the plurality of representative angles, each of the plurality of second differences indicates an exceeding amount of an increase amount of the estimated angle relative to an increase amount of the actual detected angle within a corresponding one of the plurality of angular sections; and the memory further stores therein a plurality of learning values of the plurality of angular sections, the plurality of learning values is computed by adjusting the plurality of second differences stored in the memory in accordance with one of the plurality of first differences computed at the final angle; and the controller outputs:
an initialization command for setting a value of corrected angle information, which indicates a corrected angle of rotation of the motor, to the initial value when the reference angle information is outputted;

an output updating command for increasing the value of the corrected angle information by a certain value, which corresponds to the unit angle, based on the output timing of the reference angle information every time the actual detected angle information is outputted;

a correcting command for increasing an increase amount of the value of the corrected angle information, which is increased while the actual detected angle changes within each of the plurality of angular sections, by a corresponding one of the plurality of learning values of the plurality of angular sections stored in the memory; and the control command, which is computed based on the corrected angle information, to the motor.

9. The motor control system according to claim 8, wherein:
the reference angle is a value made by dividing 360 degrees by an integer; and
the reference angle corresponds to a mechanical angle of rotation of the motor.

10. The motor control system according to claim 8, wherein:
the rotation sensor includes a resolver and a resolver digital converter.

11. The motor control system according to claim 8, wherein:
the rotation sensor includes a Hall element and a magnetic resistance element.

12. The motor control system according to claim 8, wherein:
the plurality of representative angles is regularly separate from each other.

13. The motor control system according to claim 8, wherein:
the plurality of representative angles is irregularly separate from each other.

14. A motor control system for a vehicle comprising:
a motor that provides a drive power;
a rotation sensor configured to output reference angle information every time the motor rotates a reference angle, the rotation sensor being configured to output actual detected angle information every time the motor rotates a constant unit angle that is smaller than the reference angle, the actual detected angle information indicating an actual detected angle of rotation of the motor measured based on output timing, at which the reference angle information is outputted; and a controller coupled to the motor and the rotation sensor, the controller having therein a memory, wherein:
the controller is configured to measure duration of one cycle of the reference angle information every time the reference angle information is outputted, the duration being measured between a previous time, at which the reference angle information is previously outputted, and a current time, at which the reference angle information is currently outputted, the controller computing an estimated time, which is required for the motor to rotate the unit angle in subsequent rotation of the motor, based on the duration;

the controller is configured to compute estimated angle information every time the estimated time elapses under an assumption that the motor rotates the unit angle while the estimated time elapses, the estimated angle information indicating an estimated angle of rotation of the motor measured based on the output timing of the reference angle information;

the controller is configured to compute one of a plurality of first differences of a plurality of representative angles every time the actual detected angle indicated by the actual detected angle information becomes a corresponding one of the plurality of representative angles during the one cycle of the reference angle information, the one of the plurality of first differences indicating a difference between the estimated angle and the actual detected angle;

the controller is configured to compute a plurality of second differences of a plurality of angular sections based on the plurality of first differences of the plurality of representative angles, one of the plurality of angular sections being defined between an initial value of the actual detected angle at the output timing of the reference angle information and a minimum representative angle of the plurality of representative angles, the other one of the plurality of angular sections being defined between adjacent ones of the plurality of representative angles, each of the plurality of second differences indicating a difference between an increase amount of the actual detected angle and an increase amount of the estimated angle within a corresponding one of the plurality of angular sections;

the controller is configured to store each of the plurality of second differences in the memory in association with the corresponding one of the plurality of angular sections;

the controller is configured to compute a plurality of learning values by adjusting the plurality of second differences in accordance with a degree of acceleration and deceleration of the motor;

the controller is configured to initialize a value of the corrected angle information, which indicates a corrected angle of rotation of the motor, when the controller receives the reference angle information;

the controller is configured to increase the value of the corrected angle information by a value corresponding to the unit angle every time the actual detected angle information is outputted;

the controller is configured to increase an increase amount of the value of the corrected angle information within each of the plurality of angular sections by a value indicated by a corresponding one the plurality of learning values;

the controller is configured to control the motor based on the corrected angle information.

15. The motor control system according to claim 14, wherein:
the reference angle is a value made by dividing 360 degrees by an integer; and
the reference angle corresponds to a mechanical angle of rotation of the motor.

16. The motor control system according to claim 14, wherein:
the rotation sensor includes a resolver and a resolver digital converter.

17. The motor control system according to claim 14, wherein:
the rotation sensor includes a Hall element and a magnetic resistance element.

18. The motor control system according to claim 14, wherein:
the plurality of representative angles is regularly separate from each other.

19. The motor control system according to claim 14, wherein:
the plurality of representative angles is irregularly separate from each other.

20. The motor control system according to claim 14, wherein:
the degree of the acceleration and deceleration of the motor corresponds to one of the plurality of first differences computed at the final angle; and
the controller adjusts the plurality of second differences of the one cycle based on the one of the plurality of first differences computed at the final angle.

21. The motor control system according to claim 14, wherein:
the degree of the acceleration and deceleration of the motor corresponds to a total sum of the plurality of second differences of the one cycle;
the controller adjusts the plurality of second differences such that the total sum of the plurality of second differences becomes zero.

22. A non-transitory computer-readable medium having computer-executable instructions for performing a method comprising:
obtaining reference angle information from a rotation sensor every time a motor rotates a reference angle;
obtaining actual detected angle information from the rotation sensor every time the motor rotates a constant unit angle that is smaller than the reference angle, the actual detected angle information indicating an actual detected angle of rotation of the motor measured based on output timing, at which the reference angle information is outputted;
measuring duration of one cycle of the reference angle information every time the reference angle information is outputted, the duration being measured between a previous time, at which the reference angle information is previously outputted, and a current time, at which the reference angle information is currently outputted;
estimating an estimated time, which is required for the motor to rotate the unit angle in subsequent rotation of the motor, based on the duration;
computing estimated angle information every time the estimated time elapses under an assumption that the motor rotates the unit angle while the estimated time elapses, the estimated angle information indicating an estimated angle of rotation of the motor measured based on the output timing of the reference angle information;
computing one of a plurality of first differences every time the actual detected angle indicated by the actual detected angle information becomes a corresponding one of a plurality of representative angles during the one cycle of the reference angle information, the plurality of representative angles including a final angle that corresponds to a final value of the actual detected angle, the one of the plurality of first differences indicating a difference between the estimated angle and the actual detected angle;
computing a plurality of second differences of a plurality of angular sections based on the plurality of first differences of the plurality of representative angles, one of the plurality of angular sections being defined between an initial value of the actual detected angle at the output timing of the reference angle information and a minimum representative angle of the plurality of representative angles, the other one of the plurality of angular sections being defined between adjacent ones of the plurality of representative angles, each of the plurality of second differences indicating a difference between an increase amount of the actual detected angle and an increase amount of the estimated angle within a corresponding one of the plurality of angular sections;
storing each of the plurality of second differences in a storage part in association with the corresponding one of the plurality of angular sections;
adjusting the plurality of second differences stored in the storage part in accordance with a degree of acceleration and deceleration of the motor;
initializing a value of corrected angle information to the initial value when the reference angle information is outputted, the corrected angle information indicating a corrected angle of rotation of the motor;
computing the corrected angle information every time the actual detected angle information is outputted by increasing an increase amount of the value of the corrected angle information, which is increased while the actual detected angle changes within each of the plurality of angular sections, by a value indicated by a corresponding one of the adjusted plurality of second differences stored in the storage part.

23. The non-transitory computer-readable medium according to claim 22, wherein:
the reference angle is a value made by dividing 360 degrees by an integer; and
the reference angle corresponds to a mechanical angle of rotation of the motor.

24. The non-transitory computer-readable medium according to claim 22, wherein:
the rotation sensor includes a resolver and a resolver digital converter.

25. The non-transitory computer-readable medium according to claim 22, wherein:
the rotation sensor includes a Hall element and a magnetic resistance element.

26. The non-transitory computer-readable medium according to claim 22, wherein:
the plurality of representative angles is regularly separate from each other.

27. The non-transitory computer-readable medium according to claim 22, wherein:
the plurality of representative angles is irregularly separate from each other.

28. The non-transitory computer-readable medium according to claim 22, wherein:
the degree of the acceleration and deceleration of the motor corresponds to one of the plurality of first differences computed at the final angle; and the adjusting of the plurality of second differences adjusts the plurality of second differences of the one cycle based on the one of the plurality of first differences computed at the final angle.

29. The non-transitory computer-readable medium according to claim 22, wherein:
the degree of the acceleration and deceleration of the motor corresponds to a total sum of the plurality of second differences of the one cycle;
the adjusting of the plurality of second differences adjusts the plurality of second differences such that the total sum of the plurality of second differences becomes zero.

30. A method for correcting a rotation angle of a motor comprising:
obtaining reference angle information from a rotation sensor every time the motor rotates a reference angle;
obtaining actual detected angle information from the rotation sensor every time the motor rotates a constant unit angle that is smaller than the reference angle, the actual detected angle information indicating an actual detected angle of rotation of the motor measured based on output timing, at which the reference angle information is outputted;
measuring duration of one cycle of the reference angle information every time the reference angle information is outputted, the duration being measured between a previous time, at which the reference angle information is previously outputted, and a current time, at which the reference angle information is currently outputted;
estimating an estimated time, which is required for the motor to rotate the unit angle in subsequent rotation of the motor, based on the duration;
computing estimated angle information every time the estimated time elapses under an assumption that the motor rotates the unit angle while the estimated time elapses, the estimated angle information indicating an estimated angle of rotation of the motor measured based on the output timing of the reference angle information;
computing one of a plurality of first differences every time the actual detected angle indicated by the actual detected angle information becomes a corresponding one of a plurality of representative angles during the one cycle of the reference angle information, the plurality of representative angles including a final angle that corresponds to a final value of the actual detected angle, the one of the plurality of first differences indicating a difference between the estimated angle and the actual detected angle;
computing a plurality of second differences of a plurality of angular sections based on the plurality of first differences of the plurality of representative angles, one of the plurality of angular sections being defined between an initial value of the actual detected angle at the output timing of the reference angle information and a minimum representative angle of the plurality of representative angles, the other one of the plurality of angular sections being defined between adjacent ones of the plurality of representative angles, each of the plurality of second differences indicating a difference between an increase amount of the actual detected angle and an increase amount of the estimated angle within a corresponding one of the plurality of angular sections;
storing each of the plurality of second differences in a storage part in association with the corresponding one of the plurality of angular sections;
adjusting the plurality of second differences stored in the storage part in accordance with a degree of acceleration and deceleration of the motor;
initializing a value of corrected angle information to the initial value when the reference angle information is outputted, the corrected angle information indicating a corrected angle of rotation of the motor;
computing the corrected angle information every time the actual detected angle information is outputted by increasing an increase amount of the value of the corrected angle information, which is increased while the actual detected angle changes within each of the plurality of angular sections, by a value indicated by a corresponding one of the adjusted plurality of second differences stored in the storage part.

31. The method according to claim 30, wherein:
the reference angle is a value made by dividing 360 degrees by an integer; and
the reference angle corresponds to a mechanical angle of rotation of the motor.

32. The method according to claim 30, wherein:
the rotation sensor includes a resolver and a resolver digital converter.

33. The method according to claim 30, wherein:
the rotation sensor includes a Hall element and a magnetic resistance element.

34. The method according to claim 30, wherein:
the plurality of representative angles is regularly separate from each other.

35. The method according to claim 30, wherein:
the plurality of representative angles is irregularly separate from each other.

36. The method according to claim 30, wherein:
the degree of the acceleration and deceleration of the motor corresponds to one of the plurality of first differences computed at the final angle; and
the adjusting of the plurality of second differences adjusts the plurality of second differences of the one cycle based on the one of the plurality of first differences computed at the final angle.

37. The method according to claim 30, wherein:
the degree of the acceleration and deceleration of the motor corresponds to a total sum of the plurality of second differences of the one cycle;
the adjusting of the plurality of second differences adjusts the plurality of second differences such that the total sum of the plurality of second differences becomes zero.

38. A rotation detecting apparatus for detecting rotation of a motor that provides a drive power of a vehicle, the rotation detecting apparatus sending a control signal to an external control unit that controls energization of the motor, the rotation detecting apparatus comprising:
a rotation sensor that outputs reference angle information every time the motor rotates a predetermined reference angle, the rotation sensor outputting actual detected angle information every time the motor rotates a unit angle that is smaller than the reference angle, the actual detected angle information indicating an actual detected angle of rotation of the motor measured based on output timing, at which the reference angle information is outputted; and
an error correcting device configured to correct an error of the actual detected angle information in order to output corrected angle information that indicates a corrected angle of rotation of the motor measured based on the output timing of the reference angle information, wherein:

the error correcting device includes:
an estimated pulse generator configured to measure duration of one cycle of the reference angle information every time the reference angle information is outputted, the duration being measured between a previous time, at which the reference angle information is previously outputted, and a current time, at which the reference angle information is currently outputted, the estimated pulse generator being configured to compute an estimated time, which is required for the motor to rotate the unit angle in subsequent rotation of the motor, based on the duration, the estimated pulse generator being configured to generate an estimated pulse having a pulse width that is equivalent to the estimated time;
an estimated pulse counter configured to count the estimated pulse in order to compute estimated angle information indicating an estimated angle of rotation of the motor measured based on the output timing of the reference angle information, the estimated pulse counter outputting the estimated angle information;
a first difference computing device configured to compute one of a plurality of first differences every time the actual detected angle indicated by the actual detected angle information becomes a corresponding one of a plurality of representative angles during the one cycle of the reference angle information, the plurality of representative angles includes a final angle that corresponds to a final value of the actual detected angle, the one of the plurality of first differences indicating an advancing amount of the estimated angle relative to the actual detected angle;
a second difference computing device configured to compute a plurality of second differences of a plurality of angular sections based on the plurality of first differences computed for the plurality of representative angles of the one cycle, the plurality of angular sections being defined between adjacent ones of a plurality of angles that includes the plurality of representative angles and an angle that corresponds to an initial value of the actual detected angle measured at the output timing of the reference angle information, each of the plurality of second differences indicating a difference between an increase amount of the actual detected angle and an increase amount of the estimated angle within a corresponding one of the plurality of angular sections, the second difference computing device being configured to store each of the plurality of second differences in a storage part in association with the corresponding one of the plurality of angular sections;
an adjusting device configured to compute a plurality of learning values by adjusting the plurality of second differences of the one cycle stored in the storage part in accordance with a degree of acceleration and deceleration of the motor; and an output processing device configured to execute:
an initialization process for setting a value of the corrected angle information to the initial value when the reference angle information is outputted;
an output updating process for increasing the value of the corrected angle information by a certain value, which corresponds to the unit angle, every time the actual detected angle information is outputted; and
a correcting process for changing the certain value used in the output updating process such that an increase amount of the value of the corrected angle information, which is increased while the actual detected angle changes within each of the plurality of angular sections, is increased by an increase amount indicated by a corresponding one of the plurality of learning values.

39. The rotation detecting apparatus according to claim 38, wherein:
the reference angle is a value made by dividing 360 degrees by an integer; and
the reference angle corresponds to a mechanical angle of rotation of the motor.

40. The rotation detecting apparatus according to claim 38, wherein:
the rotation sensor includes a resolver and a resolver digital converter.

41. The rotation detecting apparatus according to claim 38, wherein:
the rotation sensor includes a Hall element and a magnetic resistance element.

42. The rotation detecting apparatus according to claim 38, wherein:
the plurality of representative angles is regularly separate from each other.

43. The rotation detecting apparatus according to claim 38, wherein:
the plurality of representative angles is irregularly separate from each other.

44. The rotation detecting apparatus according to claim 38, wherein:
the degree of the acceleration and deceleration of the motor corresponds to one of the plurality of first differences computed at the final angle; and
the adjusting device adjusts the plurality of second differences of the one cycle based on the one of the plurality of first differences computed at the final angle.

45. The rotation detecting apparatus according to claim 38, wherein:
the degree of the acceleration and deceleration of the motor corresponds to a total sum of the plurality of second differences of the one cycle;
the adjusting device adjusts the plurality of second differences such that the total sum of the plurality of second differences becomes zero.

46. The rotation detecting apparatus according to claim 38, further comprising the external control unit of claim 38.

47. A rotation detecting apparatus for detecting rotation of a motor that provides a drive power of a vehicle, comprising:
an actual detected angle computing unit for computing actual detected angle information based on reference angle information and unit rotation angle information, the actual detected angle computing unit receiving the reference angle information every time the motor rotates a predetermined reference angle, the actual detected angle computing unit receiving the unit rotation angle information every time the motor rotates a unit angle smaller than the reference angle, the unit angle being computed based on a predetermined resolution value, the actual detected angle information indicating an actual detected angle of rotation of the motor measured based on reference timing, at which the reference angle information is received;
an estimated angle computing unit for measuring duration of one cycle of receiving the reference angle information, the estimated angle computing unit computing estimated angle information, which indicates an estimated angle of rotation of the motor, based on the duration and the predetermined resolution value, the estimated angle being measured based on the reference timing of the reference angle information;

a first difference computing unit for computing a first difference every time the duration elapses, the first difference indicating a difference between the estimated angle information and the actual detected angle information;

a second difference computing unit for computing a plurality of second differences of the one cycle, each of the plurality of second differences indicating a difference between an increase amount of the estimated angle information and an increase amount of the actual detected angle information within a corresponding one of a plurality of angular sections defined in the one cycle;

a learning value computing unit for computing a plurality of learning values by adjusting the plurality of second differences of the one cycle in accordance with the first difference, the learning value computing unit storing the plurality of learning values in a storage part in association with the plurality of angular sections; and a correcting unit for correcting the actual detected angle information such that a change amount of the actual detected angle information, which is changed while the actual detected angle indicated by the actual detected angle information changes within each of the plurality of angular sections, is further changed by an amount indicated by a corresponding one of the plurality of learning values, the correcting unit outputting the corrected actual detected angle information as corrected angle information that indicates a corrected rotation angle of the motor.

48. The rotation detecting apparatus according to claim 47, wherein:
the reference angle is a value made by dividing 360 degrees by an integer; and
the reference angle corresponds to a mechanical angle of rotation of the motor.

49. The rotation detecting apparatus according to claim 47, further comprising:
a rotation sensor that detects rotation of the motor, wherein:
the rotation sensor outputs the reference angle information to the actual detected angle computing unit every time the motor rotates the predetermined reference angle; and
the rotation sensor outputs the unit rotation angle information to the actual detected angle computing unit every time the motor rotates the unit angle.

50. The rotation detecting apparatus according to claim 49, wherein:
the rotation sensor includes a resolver and a resolver digital converter.

51. The rotation detecting apparatus according to claim 49, wherein:
the rotation sensor includes a Hall element and a magnetic resistance element.

52. The rotation detecting apparatus according to claim 47, wherein:
the duration of the one cycle, at which the reference angle information is outputted, is a first cycle duration;
a duration of a preceding one cycle, at which the reference angle information is outputted, is a second cycle duration;
the learning value computing unit computes a time change rate of the motor based on the first cycle duration and the second cycle duration, the time change rate being indicative of a rate of change of the duration over a period of time;
the learning value computing unit adjusts the plurality of second differences in accordance with the computed time change rate in order to compute the plurality of learning values.

53. The rotation detecting apparatus according to claim 52, wherein:
the time change rate is computed by dividing a difference between the first cycle duration and the second cycle duration by the first cycle duration.

54. A drive motor control apparatus for a vehicle, wherein the vehicle has:
a motor for providing a drive power of the vehicle;
means for outputting reference angle information when the motor rotates a reference angle; and
means for outputting actual detected angle information when the motor rotates a constant unit angle that is smaller than the reference angle,
the actual detected angle information indicating an actual detected angle of rotation of the motor measured from when the reference angle information is outputted, the drive motor control apparatus comprising:
means for correcting an error of the actual detected angle information in order to output corrected angle information, the means for correcting includes:
means for measuring an interval of the reference angle information;
means for computing an estimated time, which is required for the motor to rotate the unit angle in subsequent rotation of the motor, based on the interval of the reference angle information;
means for computing an estimated angle of rotation of the motor, which is measured from when the reference angle information is outputted, based on the estimated time;
means for computing an advance rate difference, which indicates an exceeding amount of an increase amount of the estimated angle relative to an increase amount of the actual detected angle within a certain angular section;
means for adjusting the advance rate difference in accordance with a degree of acceleration and deceleration of the motor;
means for setting a value of the corrected angle information to the initial value when the reference angle information is outputted;
means for increasing the value of the corrected angle information based on a certain value, which corresponds to the unit angle, when the actual detected angle information is outputted; and
means for changing the certain value based on the advance rate difference.

55. A motor control system for a vehicle power train comprising:
a motor connected to the vehicle drive power train;
a rotation sensor configured to output reference angle information when the motor rotates a reference angle, the rotation sensor also being configured to output actual detected angle information when the motor rotates a constant unit angle that is smaller than the reference angle, the actual detected angle information indicating an actual detected angle of rotation of the motor measured from when the reference angle information is outputted; and
a controller coupled to the rotation sensor and the motor, the controller receiving the actual detected angle information and the reference angle information from the rotation sensor, the controller outputting a control command of controlling energization to the motor, wherein the controller includes:
an estimated pulse generator that is coupled to the rotation sensor, the estimated pulse generator measuring an interval of the reference angle information, the estimated pulse generator computing an estimated time, which is required for the motor to rotate the unit angle in subsequent rotation of the motor, based on the interval, the estimated pulse generator generating an estimated pulse based on the estimated time;

a counter coupled to the rotation sensor and the estimated pulse generator, the counter computing an estimated angle of rotation of the motor based on the reference angle information and the estimated pulse;

a memory that stores therein an advance rate difference indicating an exceeding amount of an increase amount of the estimated angle relative to an increase amount of the actual detected angle within a certain angular section;

a learning value computed by adjusting the advance rate difference in accordance with a degree of acceleration and deceleration of the motor;

an initialization command for letting the controller set a value of corrected angle information, which indicates a corrected angle of rotation of the motor, to the initial value when the reference angle information is outputted;

an output updating command for letting the controller increase the value of the corrected angle information based on a certain value, which corresponds to the unit angle, when the actual detected angle information is outputted;

a correcting command for letting the controller increase an increase amount of the value of the corrected angle information based on the learning value; and a control command computing command for letting the controller output the control command, which is computed based on the corrected angle information, to control the motor.

56. A motor control system for a vehicle component comprising:

a motor connected to the vehicle component;

a rotation sensor configured to output reference angle information when the motor rotates a reference angle, the rotation sensor also being configured to output actual detected angle information when the motor rotates a constant unit angle that is smaller than the reference angle, the actual detected angle information indicating an actual detected angle of rotation of the motor measured from when the reference angle information is outputted; and a controller coupled to the motor and the rotation sensor, the controller having therein a memory, wherein:

the controller is configured to measure an interval of the reference angle information, the controller is also configured to compute an estimated time, which is required for the motor to rotate the unit angle in subsequent rotation of the motor, based on the interval;

the controller is also configured to compute an estimated angle of rotation of the motor, from when the reference angle information is outputted, based on the estimated time;

the controller is also configured to compute an advance rate difference indicating a difference between an increase amount of the actual detected angle and an increase amount of the estimated angle within a certain angular section;

the controller is also configured to store the advance rate difference in the memory;

the controller is also configured to compute a learning value computed by adjusting the advance rate difference in accordance with a degree of acceleration and deceleration of the motor;

the controller is also configured to initialize a value of the corrected angle information, which indicates a corrected angle of rotation of the motor, when the controller receives the reference angle information;

the controller is also configured to increase the value of the corrected angle information based on a value corresponding to the unit angle when the actual detected angle information is outputted;

the controller is also configured to increase an increase amount of the value of the corrected angle information based on the learning value;

the controller is also configured to control the motor based on the corrected angle information.

57. A non-transitory computer-readable medium having computer-executable instructions for performing a method comprising:

obtaining reference angle information from a rotation sensor when a motor rotates a reference angle;

obtaining actual detected angle information from the rotation sensor when the motor rotates a constant unit angle that is smaller than the reference angle, the actual detected angle information indicating an actual detected angle of rotation of the motor measured from when the reference angle information is outputted;

measuring an interval of the reference angle information;

estimating an estimated time, which is required for the motor to rotate the unit angle in subsequent rotation of the motor, based on the interval;

computing estimated angle information when the estimated time elapses the estimated angle information indicating an estimated angle of rotation of the motor measured from when the reference angle information is outputted;

computing an advance rate difference indicating a difference between an increase amount of the actual detected angle and an increase amount of the estimated angle within a certain angular section;

storing the advance rate difference in a storage part;

adjusting the advance rate difference in accordance with a degree of acceleration and deceleration of the motor;

initializing a value of corrected angle information to the initial value when the reference angle information is outputted, the corrected angle information indicating a corrected angle of rotation of the motor;

computing the corrected angle information when the actual detected angle information is outputted, by increasing an increase amount of the value of the corrected angle information, which is increased while the actual detected angle changes within the angular section, by a value related to the adjusted advance rate difference.

58. A method for correcting a rotation angle of a motor comprising:

obtaining reference angle information from a rotation sensor when the motor rotates a reference angle;

obtaining actual detected angle information from the rotation sensor when the motor rotates a constant unit angle that is smaller than the reference angle, the actual detected angle information indicating an actual detected angle of rotation of the motor measured from when the reference angle information is outputted;

measuring an interval of the reference angle information;

estimating an estimated time, which is required for the motor to rotate the unit angle in subsequent rotation of the motor, based on the interval;

computing estimated angle information when the estimated time elapses, the estimated angle information indicating an estimated angle of rotation of the motor measured from when the reference angle information is outputted;

computing an advance rate difference indicating a difference between an increase amount of the actual detected angle and an increase amount of the estimated angle within a certain angular section;

storing each of the advance rate difference in a storage part;

adjusting the advance rate difference in accordance with a degree of acceleration and deceleration of the motor;

initializing a value of corrected angle information to the initial value when the reference angle information is outputted, the corrected angle information indicating a corrected angle of rotation of the motor;

computing the corrected angle information when the actual detected angle information is outputted by increasing an increase amount of the value of the corrected angle information, based on the adjusted advance rate difference.

59. A rotation detecting apparatus for detecting rotation of a motor that provides a drive power of a vehicle, the rotation detecting apparatus sending a control signal to an external control unit that controls energization of the motor, the rotation detecting apparatus comprising:

a rotation sensor that outputs reference angle information when the motor rotates a reference angle, the rotation sensor also outputting actual detected angle information when the motor rotates a unit angle that is smaller than the reference angle, the actual detected angle information indicating an actual detected angle of rotation of the motor measured from when the reference angle information is outputted; and an error correcting device configured to correct an error of the actual detected angle information in order to output corrected angle information that indicates a corrected angle of rotation of the motor measured based on the reference angle, wherein:

the error correcting device includes:

an estimated pulse generator configured to measure an interval of the reference angle information, the estimated pulse generator being configured to compute an estimated time, which is required for the motor to rotate the unit angle in subsequent rotation of the motor, based on the interval, the estimated pulse generator being also configured to generate an estimated pulse having a pulse width that is equivalent to the estimated time;

an estimated pulse counter configured to count the estimated pulse in order to compute estimated angle information indicating an estimated angle of rotation of the motor measured from when the reference angle information is outputted, the estimated pulse counter outputting the estimated angle information;

an advance rate difference computing device configured to compute an advance rate difference, the advance rate difference indicating a difference between an increase amount of the actual detected angle and an increase amount of the estimated angle within a certain angular section, the advance rate difference computing device is configured to store each of the advance rate difference in a storage part;

an adjusting device configured to compute a learning value by adjusting the advance rate difference in accordance with a degree of acceleration and deceleration of the motor; and an output processing device configured to execute:

an initialization process for setting a value of the corrected angle information to the initial value when the reference angle information is outputted;

an output updating process for increasing the value of the corrected angle information by a certain value, which corresponds to the unit angle, when the actual detected angle information is outputted; and a correcting process for changing the certain value based on the learning value.

* * * * *